(12) United States Patent
Takahashi

(10) Patent No.: US 8,009,311 B2
(45) Date of Patent: Aug. 30, 2011

(54) OUTPUT SYSTEM, NETWORK DEVICE, DEVICE USING APPARATUS, OUTPUT CONTROL PROGRAM AND OUTPUT REQUEST PROGRAM, AND OUTPUT METHOD

(75) Inventor: Yusuke Takahashi, Suwa (JP)

(73) Assignee: Seiko Epson Corporation (JP)

( * ) Notice: Subject to any disclaimer, the term of this patent is extended or adjusted under 35 U.S.C. 154(b) by 1117 days.

(21) Appl. No.: 11/666,261

(22) PCT Filed: Nov. 1, 2005

(86) PCT No.: PCT/JP2005/020406
§ 371 (c)(1),
(2), (4) Date: Jun. 8, 2007

(87) PCT Pub. No.: WO2006/049292
PCT Pub. Date: May 11, 2006

(65) Prior Publication Data
US 2008/0068642 A1     Mar. 20, 2008

(30) Foreign Application Priority Data

Nov. 1, 2004   (JP) ................................ 2004-317563
Nov. 22, 2004  (JP) ................................ 2004-336991

(51) Int. Cl.
*G06F 3/12*    (2006.01)
(52) U.S. Cl. ............... 358/1.15; 358/1.13; 358/1.14; 709/203; 709/216; 709/224; 709/232
(58) Field of Classification Search ........ 358/1.13–1.15; 709/203, 216, 224, 232
See application file for complete search history.

(56) References Cited

U.S. PATENT DOCUMENTS 7,095,518 B1 * 8/2006 Keeney et al. ............... 358/1.15
2003/0002066 A1 * 1/2003 Miyano ........................ 358/1.14

FOREIGN PATENT DOCUMENTS

| JP | 04-364971 A | 12/1992 |
| JP | 09-128171 A | 5/1997 |
| JP | 10-275063 A | 10/1998 |

(Continued)

OTHER PUBLICATIONS

International Search Report for PCT/JP2005/020406, dated Dec. 15, 2005 ISA/JP.
Written Opinion of the ISA for PCT/JP2005/020406.

*Primary Examiner* — Chan S Park
*Assistant Examiner* — Juan Guillermety
(74) *Attorney, Agent, or Firm* — Harness, Dickey & Pierce, P.L.C.

(57) ABSTRACT

A host terminal transmits print request information including an IP address to a network printer and provides the network printer with print data in storage in response to an acquisition request. When the print request information is received, the network printer saves the received print request information in storage. When authentication information is received together with a print request, the network printer judges eligibility for using print data on the basis of the authentication information received. When it is judged that a user is eligible to use the print data, the network printer acquires the print data form the host terminal and performs printing. When print request information is not present in the storage, the network printer acquires print request information from other network printers.

6 Claims, 25 Drawing Sheets

FOREIGN PATENT DOCUMENTS

| | | |
|---|---|---|
| JP | 2001-209505 A | 8/2001 |
| JP | 2001-222390 A | 8/2001 |
| JP | 2001-306273 A | 11/2001 |
| JP | 2002-049477 A | 2/2002 |
| JP | 2002-189578 A | 7/2002 |
| JP | 2002-215362 A | 8/2002 |
| JP | 2002-229760 A | 8/2002 |
| JP | 2003-140875 A | 5/2003 |

* cited by examiner

502 — USER INFORMATION : EPS
504 — IP ADDRESS : 192.168.1.5
506 — PRINTING DATE AND TIME : 2004/08/18 15:05
508 — PRINT SETTING : . . . . . . . . . . . . .

| PRINTER NAME | IP ADDRESS | PORT NUMBER | ENCRYPTION KEY |
|---|---|---|---|
| PRINTER_A | 192.168.1.11 | 19053 | A_TYPE |
| PRINTER_B | 192.168.1.12 | 19032 | B_TYPE |
| PRINTER_C | 192.168.1.13 | 17562 | C_TYPE |

| PRINTER NAME | IP ADDRESS | PORT NUMBER | DECRYPTION KEY |
|---|---|---|---|
| PRINTER_A | 192.168.1.11 | 19053 | A_TYPE |
| PRINTER_B | 192.168.1.12 | 19032 | B_TYPE |
| PRINTER_C | 192.168.1.13 | 17562 | C_TYPE |

| IDENTIFIER | PORT NUMBER |
|---|---|
| 1 | 23456 |
| 2 | 42349 |
| 3 | 33458 |

FIG.18

Administrating Command : Printer List Setting
INSERT printer-list VALUES ("PRINTER_D", "192.168.1.14", "18368", "D_TYPE")

| JOB ID | USER INFORMATION | NUMBER OF PROCESSED PAGES | PROGRESS STATE |
|---|---|---|---|
| 000016 | BBB | 0/2 | PRINTING |
| 000018 | BBB | 0/4 | STANDBY |
| 000019 | DDD | 5/20 | STANDBY |
|  |  |  |  |

| | | |
|---|---|---|
| 512 | JOB ID | : 000016 |
| 514 | USER INFORMATION | : BBB |
| 516 | IP ADDRESS | : 192.168.1.12 |
| 518 | PRINTING DATE AND TIME | : 2004/08/18  15:05 |
| 520 | PRINT SETTING | : · · · · · · · · · |

| JOB ID | IP ADDRESS | USER INFORMATION | NUMBER OF PROCESSED PAGES | PROGRESS STATE |
|---|---|---|---|---|
| 000015 | 192.168.1.11 | AAA | 5/15 | STANDBY |
| 000016 | 192.168.1.12 | BBB | 0/2 | PRINTING |
| 000017 | 192.168.1.13 | CCC | 0/6 | MONITORING |
| 000018 | 192.168.1.12 | BBB | 0/4 | STANDBY |
| | | | | |
| | | | | |

OUTPUT SYSTEM, NETWORK DEVICE, DEVICE USING APPARATUS, OUTPUT CONTROL PROGRAM AND OUTPUT REQUEST PROGRAM, AND OUTPUT METHOD

TECHNICAL FIELD

The present invention relates to a system, a device, a program, and a method for performing output such as printing on the basis of output data and a device using apparatus and an output request program to which the system is applicable. In particular, the invention relates to an output system, a network device, a device using apparatus, an output control program and an output request program, and an output method that can improve a degree of freedom of changing an output destination and improve security for output data.

BACKGROUND ART

In performing printing with a network printer that is an example of a network device, when a host terminal of a user is present in a location apart from the network printer, it, is likely that a content of a print is seen by others until the user reaches the network printer. This causes a problem when the user prints a confidential document that the user does not desire to be seen by others. Therefore, it is demanded to provide a security function in the network printer.

Conventionally, as a technique for improving security for the network printer, for example, a printing apparatus disclosed in a patent document 1 and an image output apparatus described in a patent document 2 are known.

In the invention described in the patent document 1, first, the printing apparatus judges whether a print job received from a host terminal is a normal print job or a spool print job. When it is judged that the print job is a spool print job, the printing apparatus expands the print job into output data and stores the output data expanded in a storage together with job designation information. Then, when a user inputs job designation information, the printing apparatus specifies a print job, which should be performed, from plural print jobs stored in the storage on the basis of the job designation information inputted. The printing apparatus reads out output data of the print job specified and performs printing.

In the invention described in the patent document 2, first, a host terminal transmits an authentication code to a printer server together with print data. The printer server generates data for collation from the print data received, encrypts the received print data with the authentication code to generate storage data, and stores the storage data and the data for collation in a storage in association with each other. When a user selects the storage data with a UI unit and inputs the authentication code, the printer server decrypts the storage data with the authentication code as a key and judges whether the storage data could be decrypted correctly with reference to the data for collation. If the storage data could be decrypted correctly, the printer server causes a print engine to print a result of the decryption.

However, in the inventions described in the patent documents 1 and 2, there is a problem in that, when the user wishes to change a print destination after the host terminal transmits a print job or print data, the user has to delete the print job or the print data and then perform the transmission again, which requires time and labor. Thus, a print system described in a patent document 3 is proposed as a technique that allows a user to arbitrarily change a print destination even after a print job or print data is transmitted.

In an invention described in the patent document 3, a host terminal transmits print data and a password to a printer server. A network printer transmits a password and a job number inputted to an image input apparatus to the printer server. The printer server transmits, after performing authentication, the print data to the network printer to cause the network printer to print an image.

In an invention described in a patent document 4, a print job received from a host terminal at a request source of the print job is transferred to a network printer serving as a transfer destination set in advance. When an NW board of the network printer detects PDL analysis abnormality or occurrence of jam or the like in a printing engine unit through communication with a PDL board, the NW board instructs the network printer serving as the transfer destination to start page analysis processing for the print job.

[Patent Document 1] JP-A-4-364971
[Patent Document 2] JP-A-2001-306273
[Patent Document 3] JP-A-2003-140875
[Patent Document 4] JP-A-2002-189578

In the invention of the patent document 3, print data is held by the printer server on a network. Thus, there is a problem in that the print data is likely to be stolen because of illegal access or the like while the printer server holds the print data.

If the inventions described in the patent documents 1 and 2 are applied to the invention described in the patent document 4, it is possible to perform confidential printing while improving a degree of freedom of changing a print destination.

However, in such a combination, as in the invention of the patent document 3, print data is held by each printing apparatus that is likely to execute print processing on a network. Thus, there is a problem in that the print data is likely to be stolen because of illegal access or the like until printing is started after the printing apparatus or the like holds the print data.

Such a problem is anticipated not only in the case in which printing is performed by a network printer but also in the case in which, for example, a display device such as a projector or an LCD (Liquid Crystal Display) is connected to a network and display is performed by the display device. In other words, when an image or the like is displayed using the projector, the LCD, or the like, even if image data (video data) or the like is held in a server or the like and taken out and displayed when necessary, data is likely to be stolen because of illegal access or the like while the data is held in the server or the like.

Thus, the invention has been devised in view of such unsolved problems inherent in the conventional techniques and it is an object of the invention to provide an output system, a network device, a device using apparatus, an output control program and an output request program, and an output method that can improve a degree of freedom of changing an output destination and improve security for output data.

DISCLOSURE OF THE INVENTION

[Form 1] In order to attain the object described above, an output system in a form 1 is an output system in which a first network device and a second network device, which perform output on the basis of output data, and a device using apparatus, which uses the network devices, are connected so as to be capable of communicating with each other and the network devices obtain authentication to perform the output, the output system characterized in that the device using apparatus includes: output data storing means that stores the output data; output-request-information transmitting means that transmits output request information, which includes acquisition source information concerning an acquisition source of the output data, to the first network device; and output data providing means that provides output data in the output data storing means, the first network device includes: output-request-information storing means; output-request-information receiving means that receives the output request information; output-request-information saving means that saves the output request information received by the output-request-information receiving means in the output-request-information storing means; first authentication information acquiring means that acquires authentication information; first output data authenticating and acquiring means that acquires, when it is judged on the basis of the authentication information acquired by the first authentication information acquiring means that a user is eligible to use the output data, the output data from the device using apparatus on the basis of acquisition source information included in the output request information in the output-request-information storing means; first output means that performs output on the basis of the output data acquired by the first output data authenticating and acquiring means; and output-request-information providing means that provides output request information in the output-request-information storing means, and the second network device includes: second authentication information acquiring means that acquires the authentication information; output-request-information acquiring means that acquires the output request information from the first network device; second output data authenticating and acquiring means that acquires, when it is judged on the basis of the authentication information acquired by the second authentication information acquiring means that the user is eligible to use the output data, the output data from the device using apparatus on the basis of the acquisition source information included in the output request information acquired by the output-request-information acquiring means; and second output means that performs output on the basis of the output data acquired by the second output data authenticating and acquiring means.

With such a constitution, in the device using apparatus, output request information is transmitted to the first network device by the output-request-information transmitting means.

In the first network device, when output request information is received by the output-request-information receiving means, the output request information received is saved in the output-request-information storing means by the output-request-information saving means.

First, when the user wishes to cause the first network device to perform output, the user gives authentication information to the first authentication information acquiring means.

In the first network device, when the authentication information is acquired by the first authentication information acquiring means, eligibility for using output data is judged by the first output data authenticating and acquiring means on the basis of the authentication information acquired. As a result, when it is judged that the user is eligible to use the output data, the output data is acquired from the device using apparatus by the first output data authenticating and acquiring means on the basis of acquisition source information included in output request information in the output-request-information storing means.

In the device using apparatus, output data in the output data storing means is provided to the first network device by the output data providing means.

In the first network device, when output data is acquired, output is performed by the first output means on the basis of the output data acquired.

On the other hand, when the user wishes to cause the second network device to perform output rather than the first network device, the user gives authentication information to the second authentication information acquiring means.

In the second network device, output request information is acquired from the first network device by the output-request-information acquiring means. When the authentication information is acquired by the second authentication information acquiring means, eligibility for using output data is judged by the second output data authenticating and acquiring means on the basis of the authentication information acquired. As a result, when it is judged that the user is eligible to use the output data, the output data is acquired from the device using apparatus by the second output data authenticating and acquiring means on the basis of acquisition source information included in the output request information acquired.

In the device using apparatus, output data in the output data storing means is provided to the second network device by the output data providing means.

In the second network device, when output data is acquired, output is performed by the second output means on the basis of the output data acquired.

This makes it possible to perform output in any one of the first network device and the second network device even after output request information is transmitted from the device using apparatus. Thus, there is an advantage that it is possible to improve a degree of freedom of changing a network device serving as an output destination.

The network device can acquire output data on the basis of acquisition source information included in the output request information. Thus, it is possible to accumulate output data in an arbitrary acquisition source rather than a specific acquisition source such as a server. Therefore, since a specific apparatus such as a server does not have to be provided, there is also ah advantage that it is possible to simplify a system configuration compared with that in the past. In addition, since output data never concentrates on a specific apparatus, there is also an advantage that it is possible to reduce the likelihood that output is not performed compared with that in the past.

The device using apparatus that uses the network device means a device using apparatus that is capable of using both the first network device and the second network device. The same applies to an output method in a form 37 in the following description.

The network device, which has obtained authentication, is the first network device or the second network device that has obtained authentication. The same applies to the output method in the form 37 in the following description.

The authentication information acquiring means may take any constitution as long as the authentication information acquiring means acquires authentication information. For example, authentication information may be inputted to the authentication information acquiring means from an input device or the like. The authentication information acquiring means may obtain or receive authentication information from an external apparatus or the like. The authentication information acquiring means may read out authentication information from a storage, a storage medium, or the like. Therefore, acquisition includes at least input, obtainment, reception, and readout. The same applies to network devices in forms 9 and 15 in the following description.

The output data authenticating and acquiring means may take any constitution as long as the output data authenticating and acquiring means judges eligibility for using output data on the basis of at least authentication information. For example, the output data authenticating and acquiring means may judge eligibility for using output data on the basis of only authentication information. The output data authenticating and acquiring means may judge eligibility for using output data on the basis of authentication information and other information. In the latter case, the other information may be registered in the network device in advance or information received from the device using apparatus, other network devices, and other apparatuses may be used as the other information. It is also possible that the judgment itself on eligibility for using output data is performed in other network devices and other apparatuses and the output data authenticating and acquiring means acquires a result of the judgment and judges eligibility for using output data on the basis of the result of the judgment acquired. If it is judged in such judgment processing that a user is eligible to use output data, this is equal to obtaining authentication. The same applies to the network devices in the forms 9 and 15 in the following description.

The output-request-information acquiring means may take any constitution as long as the output-request-information acquiring means acquires output request information. For example, the output request-information acquiring means may acquire output request information before acquiring authentication information. The output-request-information acquiring means may acquire output request information after acquiring authentication information. The same applies to the network device in the form 15 in the following description.

The output means may take any constitution as long as the output means performs output on the basis of output data. The output means includes, for example, printing means that performs printing on the basis of print data, display means that performs display on the basis of display data, or sound output means that outputs sound on the basis of sound data. For example, a projector and an LCD correspond to the display means. The same applies to the network devices in the forms 9 and 15 in the following description.

The output means may take a constitution for outputting output data itself to other network devices. Such a constitution includes, for example, a constitution for outputting print data to a printing device connected through network such as a network printer, outputting display data to display devices such as a projector and an LCD connected through a network, or outputting sound data to an acoustic device connected through a network. The same applies to the network devices in the forms 9 and 15 in the following description.

The output-request-information transmitting means may take any constitution as long as the output-request-information transmitting means transmits output request information to the first network device. For example, the output-request-information transmitting means may actively transmit output request information. The output-request-information transmitting means may transmit output request information in response to a request from the first network device, the second network device, or other apparatuses. The same applies to a device using apparatus in a form 21 in the following description.

The output data providing means may take any constitution as long as the output data providing means provides the network device with output request information. For example, when the device using apparatus and the network device are connected via a network such as a LAN (including a wireless LAN), a WAN, or the Internet, output request information is transmitted from the device using apparatus to the network device via the network to be provided to the network device. For example, when the device using apparatus and the network device are directly connected via a cable such as a USB cable, output request information is transmitted from the device using apparatus to the network device via the cable to be provided to the network device. The same applies to the device using apparatus in the form 21 in the following description.

The output data storing means stores output data with every means and at every time. The output data storing means may have output data stored therein in advance. The output data storing means may store output data according to input or the like from the outside at the time of operation of the system without storing the output data in advance. The same applies to the device using apparatus in the form 21 in the following description.

The output-request-information providing means may take any constitution as long as the output-request-information providing means provides the second network device with output request information. For example, when the first network device and the second network device are connected via a network such as a LAN (including a wireless LAN), a WAN, or the Internet, output request information is transmitted from the first network device to the second network device via the network to be provided to the second network device. For example, when the first network device and the second network device are directly connected via a cable such as a USB cable, output request information is transmitted from the first network device to the second network device via the cable to be provided to the second network device. The same applies to the network devices in the forms 9 and 15 in the following description.

The output-request-information storing means stores output request information with every means and at every time. The output-request-information storing means may have output request information stored therein in advance. The output-request-information storing means may store output request information according to input or the like from the outside at the time of operation of the system without storing the output request information in advance. The same applies to the network device in the form 9 in the following description.

[Form 2] An output system in a form 2 is characterized in that, in the output system in the form 1, the output request information and the authentication information include at least one of identification information for identifying a user, identification information for identifying the device using apparatus, and identification information for identifying the output data, the first output data authenticating and acquiring means judges eligibility for using the output data on the basis of the identification information included in the output request information in the output-request-information storing means and the identification information included in the authentication information acquired by the first authentication information acquiring means, and the second output data authenticating and acquiring means judges eligibility for using the output data on the basis of the identification information included in the output request information acquired by the output-request-information acquiring means and the identification information included in the authentication information acquired by the second authentication information acquiring means.

With such a constitution, in the first network device, eligibility for using output data is judged by the first output data authenticating and acquiring means on the basis of identification information included in output request information in the output-request-information storing means and identification information included in authentication information acquired.

In the second network device, eligibility for using output data is judged by the second output data authenticating and acquiring means on the basis of identification information included in output request information acquired and identification information included in authentication information acquired.

Consequently, since authentication is performed on the basis of identification information included in output request information, it is possible to vary authentication information for each user, for each device using apparatus, or for each output data. Therefore, there is an advantage that it is possible to improve security.

[Form 3] An output system in a form 3 is characterized in that, in the output system in the form 1 or 2, the second network device has acquisition source information storing means that stores acquisition source information in which an acquisition source of the output request information is registered, and the output-request-information acquiring means acquires the output request information from the first network device registered in the acquisition source information as an acquisition source.

With such a constitution, in the second network device, output request information is acquired from the first network device, which is registered in acquisition source information as an acquisition source, by the output-request-information acquiring means.

Consequently, there is an advantage that it is possible to reduce an amount of traffic on a network compared with a constitution in which output request information is acquired by searching through the first network device with broadcast or multicast.

The acquisition source information storing means stores acquisition source information with every means and at every time. The acquisition source information storing means may have acquisition source information stored therein in advance. The acquisition source information storing mean may store acquisition source information according to input or the like from the outside at the time of operation of the system without storing the acquisition source information in advance. Alternatively, the acquisition source information storing means may refer to acquisition source information stored on the outside and temporarily hold the acquisition source information. The same applies to a network device in a form 17 in the following description.

[Form 4] An output system in a form 4 is characterized in that, in the output system in the form 3, in the acquisition source information, an acquisition source and an acquisition procedure for the output request information are registered in association with each other, the output-request-information acquiring means acquires the output request information from the first network device on the basis of the acquisition source information in accordance with an acquisition procedure corresponding to the first network device, and the output-request-information providing means provides the output request information in accordance with an acquisition procedure set in the first network device.

With such a constitution, in the second network device, output request information is acquired from the first network device by the output-request-information acquiring means on the basis of acquisition source information in accordance with an acquisition procedure corresponding to the first network device.

In the first network device, output request information is provided by the output-request-information providing means in accordance with an acquisition procedure set in the first network device.

Consequently, it is impossible to acquire output request information from the first network device unless the output request information is acquired in accordance with the acquisition procedure set in the first network device. This makes it possible to reduce the likelihood that output request information is stolen from the first network device because of illegal access or the like. Therefore, there is an advantage that it is possible to improve security.

[Form 5] An output system in a form 5 is characterized in that, in the output system in the form 4, the first network device includes: acquisition-procedure-information storing means that stores acquisition procedure information indicating the acquisition procedure; acquisition procedure determining means that determines the acquisition procedure; and acquisition-procedure-information updating means that updates the acquisition procedure information in the acquisition-procedure-information storing means on the basis of the acquisition procedure determined by the acquisition procedure determining means, the output-request-information providing means provides output request information, which includes acquisition procedure information indicating the acquisition procedure determined by the acquisition procedure determining means, on the basis of the acquisition procedure information in the acquisition-procedure-information storing means, and the second network device includes acquisition-source-information updating means that updates an acquisition procedure for the acquisition source information on the basis of the acquisition procedure information included in the output request information acquired by the output request information acquiring means.

With such a constitution, in the first network device, an acquisition procedure is determined by the acquisition procedure determining means and output request information, which includes acquisition procedure information indicating the acquisition procedure determined, is provided by the output-request-information providing means on the basis of acquisition procedure information in the acquisition-procedure-information storing means. The acquisition procedure information in the acquisition-procedure-information storing means is updated on the basis of the determined acquisition procedure.

In the second network device, when output request information is acquired, an acquisition procedure for acquisition source information is updated by the acquisition-source-information updating means on the basis of acquisition procedure information included in the output request information acquired.

Consequently, the acquisition procedure is changed every time output request information is acquired. Thus, it is possible to further reduce the likelihood that output request information is stolen from the first network device because of illegal access or the like. Therefore, there is an advantage that it is possible to further improve security.

The acquisition-procedure-information storing means stores acquisition procedure information with every means and at every time. The acquisition-procedure-information storing means may have acquisition procedure information stored therein in advance. The acquisition-procedure-information storing means may store acquisition procedure information according to input or the like from the outside at the time of operation of the system without storing the acquisition procedure information in advance. The same applies to a network device in a form 12 in the following description.

[Form 6] An output system in a form 6 is characterized in that, in the output system according to any one of the forms 1 to 5, the first network device includes provision-destination-information storing means that stores provision destination information in which a provision destination of the output request information is registered, and the output-request-information providing means provides, when it is judged that the second network device that has requested acquisition of output data is registered in the provision destination information as a provision destination, the second network device with the output request information.

With such a constitution, in the first network device when it is judged that the second network device that has requested acquisition of output data is registered in provision destination information as a provision destination, output request information is provided to the second network device by the output-request-information providing means.

Consequently, in the first network device, output request information is provided only to the second network device registered in provision destination information. Thus, it is possible to reduce the likelihood that output request information is stolen from the first network device because of illegal access or the like. Therefore, there is an advantage that it is possible to improve security.

The provision-destination-information storing means stores provision destination information with every means and at every time. The provision-destination-information storing means may have provision destination information stored therein in advance. The provision-destination-information storing means may store provision destination information according to input or the like from the outside at the time of operation of the system. The same applies to a network device in a form 13 in the following description.

[Form 7] An output system in a form 7 is characterized in that, in the output system in any one of the forms 1 to 6, the device using apparatus includes deletion instruction transmitting means that transmits, when a transmission destination of the output request information and a provision destination of the output data are different, a deletion instruction to the first network device that has become the transmission destination of the output request information, and the first network device includes output-request-information deleting means that deletes output request information in the output-request-information storing means in response to the deletion instruction.

With such a constitution, in the device using apparatus, when a transmission destination of output request information and a provision destination of output data are different, a deletion instruction is transmitted to the first network device, which is the transmission destination of the output request information, by the deletion instruction transmitting means.

In the first network device, when the deletion instruction is received, the output request information in the output-request-information storing means is deleted by the output-request-information deleting means.

Consequently, even if output is requested in the first network device after output is completed in the second network device, output request information is not present in the first network device. Thus, there is an advantage that it is possible to reduce the likelihood that the first network device attempts acquisition of output data by mistake.

[Form 8] An output system in a form 8 is characterized in that, in the output system in any one of the forms 1 to 6, the second network device includes deletion instruction transmitting means that transmits a deletion instruction to the first network device that has acquired the output request information, and the first network device includes output-request-information deleting means that deletes output request information in the output-request-information storing means in response to the deletion instruction.

With such a constitution, in the second network device, a deletion instruction is transmitted to the first network device, which has acquired output request information, by the deletion instruction transmitting means.

In the first network device, when the deletion information is received, the output request information in the output-request-information storing means is deleted by the output-request-information deleting means.

Consequently, even if output is requested in the first network device after output is completed in the second network device, output request information is not present in the first network device. Thus, there is an advantage that it is possible to reduce the likelihood that the first network device attempts acquisition of output data by mistake.

[Form 9] On the other hand, in order to attain the object described above, a network device in a form 9 is a network device that performs output on the basis of output data, characterized by including output-request-information storing means; output-request-information receiving means that receives output request information including acquisition source information concerning an acquisition source of the output data; output-request-information saving means that saves the output request information received by the output-request-information receiving means in the output-request-information storing means; authentication information acquiring means that acquires authentication information; output data authenticating and acquiring means that acquires, when it is judged on the basis of the authentication information acquired by the authentication information acquiring means that a user is eligible to use the output data, the output data from a device using apparatus on the basis of the acquisition source information included in the output request information in the output-request-information storing means; output means that performs output on the basis of the output data acquired by the output data authenticating and acquiring means; and output-request-information providing means that provides the output request information in the output-request-information storing means.

With such a constitution, an action equivalent to that of the first network device in the output system in the form 1 is obtained. Therefore, an advantage equivalent to that of the output system in the form 1 is obtained.

[Form 10] A network device in a form 10 is characterized in that, in the network device in the form 9, the output request information and the authentication information include at least one of identification information for identifying a user, identification information for identifying the device using apparatus, and identification information for identifying the output data, and the output data authenticating and acquiring means judges eligibility for using the output data on the basis of the identification information included in the output request information in the output-request-information storing means and the identification information included in the authentication information acquired by the authentication information acquiring means.

With such a constitution, an action equivalent to that of the first network device in the output system in the form 2 is obtained. Therefore, an advantage equivalent to that of the output system in the form 2 is obtained.

[Form 12] A network device in a form 12 is characterized by including, in the network device in the form 11, acquisition-procedure-information storing means that stores acquisition procedure information indicating the acquisition procedure; acquisition procedure determining means that determines the acquisition procedure; and acquisition-procedure-information updating means that updates the acquisition procedure information in the acquisition-procedure-information storing means on the basis of the acquisition procedure determined by the acquisition procedure determining means, and in that the output-request-information providing means provides output request information, which includes acquisition procedure information indicating the acquisition procedure determined by the acquisition procedure determining means, on the basis of the acquisition procedure information in the acquisition-procedure-information storing means.

With such a constitution, an action equivalent to that of the first network device in the output system in the form 5 is obtained. Therefore; an advantage equivalent to that of the output system in the form 5 is obtained.

[Form 11] A network device in a form 11 is characterized in that, in the network device in any one of the forms 9 and 10, the output-request-information providing means provides the output request information in accordance with an acquisition procedure set in the network device.

With such a constitution, an action equivalent to that of the first network device in the output system in the form 4 is obtained. Therefore, an advantage equivalent to that of the output system in the form 4 is obtained.

[Form 13] A network device in a form 13 is characterized by including, in the network device in any one of the forms 9, 10, and 12, provision-destination-information storing means that stores provision destination information in which a provision destination of the output request information is registered, and in that the output-request-information providing means provides, when it is judged that the network device that has requested acquisition of output data is registered in the provision destination information as a provision destination, the network device with the output request information.

With such a constitution, an action equivalent to that of the first network device in the output system in the form 6 is obtained. Therefore, an advantage equivalent to that of the output system in the form 6 is obtained.

[Form 14] A network device in a form 14 is characterized by including, in the network device in any one of the forms 9, 10, 12, and 13, output-request-information deleting means that deletes output request information in the output-request-information storing means in response to the deletion instruction.

With such a constitution, an action equivalent to that of the first network device in the output system in the form 7 or 8 is obtained. Therefore, an advantage equivalent to that of the output system in the form 7 or 8 is obtained.

[Form 15] A network device in a form 15 is a network device that performs output on the basis of output data, characterized by including: authentication information acquiring means that acquires authentication information; output-request-information acquiring means that acquires output request information, which includes acquisition source information concerning an acquisition source of the output data, from another network device; output data authenticating and acquiring means that acquires, when it is judged on the basis of the authentication information acquired by the authentication information acquiring means that a user is eligible to use the output data, the output data from a device using apparatus on the basis of the acquisition source information included in the output request information acquired by the output-request-information acquiring means; and output means that performs output on the basis of the output data acquired by the output data authenticating and acquiring means.

With such a constitution, an action equivalent to that of the second network device in the output system in the form 1 is obtained. Therefore, an advantage equivalent to that of the output system in the form 1 is obtained.

[Form 16] A network device in a form 16 is characterized in that, in the network device in the form 15, the output request information and the authentication information include at least one of identification information for identifying a user, identification information for identifying the device using apparatus, and identification information for identifying the output data, the output data authenticating and acquiring means judges eligibility for using the output data on the basis of the identification information included in the output request information acquired by the output-request-information acquiring means and the identification information included in the authentication information acquired by the authentication information acquiring means.

With such a constitution, an action equivalent to that of the second network device in the output system in the form 2 is obtained. Therefore, an advantage equivalent to that of the output system in the form 2 is obtained.

[Form 17] A network device in a form 17 is characterized by including, in the network device in any one of the forms 15 and 16, acquisition source information storing means that stores acquisition source information in which an acquisition source of the output request information is registered, and in that the output-request-information acquiring means acquires the output request information from the network device registered in the acquisition source information as an acquisition source.

With such a constitution, an action equivalent to that of the second network device in the output system in the form 3 is obtained. Therefore, an advantage equivalent to that of the output system in the form 3 is obtained.

[Form 18] A network device in a form 18 is characterized in that, in the network device in the form 17, in the acquisition source information, an acquisition source and an acquisition procedure for the output request information are registered in association with each other, and the output-request-information acquiring means acquires the output request information from the another network device on the basis of the acquisition source information in accordance with an acquisition procedure corresponding to the another network device.

With such a constitution, an action equivalent to that of the second network device in the output system in the form 4 is obtained. Therefore, an advantage equivalent to that of the output system in the form 4 is obtained.

[Form 19] A network device in a form 19 is characterized by including, in the network device in the form 18, acquisition-source-information updating means that updates an acquisition procedure for the acquisition source information on the basis of the acquisition procedure information included in the output request information acquired by the output-request-information acquiring means.

With such a constitution, an action equivalent to that of the second network device in the output system in the form 5 is obtained. Therefore, an advantage equivalent to that of the output system in the form 5 is obtained.

[Form 20] A network device in a form 20 is characterized by including, in the network device in any one of the forms 15 to 19, deletion instruction transmitting means that transmits a deletion instruction to the network device that has acquired the output request information.

With such a constitution, an action equivalent to that of the second network device in the output system in the form 8 is obtained. Therefore, an advantage equivalent to that of the output system in the form 8 is obtained.

[Form 21] On the other hand, in order to attain the object described above, a device using apparatus in a form 21 is a device using apparatus that uses a network device, characterized by including:

output data storing means that stores the output data; output-request-information transmitting means that transmits output request information, which includes acquisition source information concerning an acquisition source of the output data, to the network device; and output data providing means that provides output data in the output data storing means.

With such a constitution, an action equivalent to that of the device using apparatus in the output system in the form 1 is obtained. Therefore, an advantage equivalent to that of the output system in the form 1 is obtained.

[Form 22] A device using apparatus according to a form 22 is characterized by including, in the device using apparatus in the form 21, deletion instruction transmitting means that transmits, when a transmission destination of the output request information and a provision destination of the output data are different, a deletion instruction to the network device that has become the transmission destination of the output request information.

With such a constitution, an action equivalent to that of the device using apparatus in the output system in the form 7 is obtained. Therefore, an advantage equivalent to that of the output system in the form 7 is obtained.

[Form 23] On the other hand, in order to attain the object described above, an output control program in a form 23 is an output control program for performing output on the basis of output data, characterized by including a program for causing a computer to execute processing including: an output-request-information receiving step of receiving output request information including acquisition source information concerning an acquisition source of the output data; an output-request-information saving step of saving the output request information received in the output-request-information receiving step in the output-request-information storing means; an authentication information acquiring step of acquiring authentication information; an output data authenticating and acquiring step of acquiring, when it is judged on the basis of the authentication information acquired in the authentication information acquiring step that a user is eligible to use the output data, the output data from a device using apparatus on the basis of the acquisition source information included in the output request information in the output-request-information storing means; an output step of performing output on the basis of the output data acquired in the output data authenticating and acquiring step; and an output-request-information providing step of providing the output request information in the output-request-information storing means.

With such a constitution, when the program is read by the computer and the computer executes processing in accordance with the program read, an action and an advantage equivalent to those of the network device in the form 9 are obtained.

The authentication information acquiring step may take any form as long as authentication information is acquired. For example, authentication information may be inputted from an input device or the like. Authentication information may be obtained or received from an external apparatus or the like or may be read out from a storage, a storage medium, or the like. Therefore, acquisition includes at least input, obtainment, reception, and readout. The same applies to an output control program in a form 29 and the output method in the form 37 in the following description.

The output data authenticating and acquiring step may take any form as long as eligibility for using output data is judged on the basis of at least authentication information. For example, eligibility for using output data may be judged on the basis of only authentication information. Eligibility, for using output data may be judged on the basis of authentication information and other information. In the latter case, the other, information may be registered in the network device in advance or information received from the device using apparatus, other network devices, and other apparatuses may be used as the other information. The same applies to the output control program in the form 29 and the output method in the form 37 in the following description.

The output step may take any form as long as output is performed on the basis of output data. The output step includes, for example, a printing step of performing printing on the basis of print data, a display step of performing display on the basis of display data, and a sound output step of outputting sound on the basis of sound data. For example, display by a projector or an LCD corresponds to the display step. The same applies to the output control program in the form 29 and the output method in the form 37 in the following description.

[Form 24] An output control program in a form 24 is characterized in that, in the output control program in the form 23, the output request information and the authentication information include at least one of identification information for identifying a user, identification information for identifying the device using apparatus, and identification information for identifying the output data, and in the output data authenticating and acquiring step, eligibility for using the output data is judged on the basis of the identification information included in the output request information in the output-request-information storing means and the identification information included in the authentication information acquired in the authentication information acquiring step.

With such a constitution, when the program is read by the computer and the computer executes processing in accordance with the program read, an action and an advantage equivalent to those of the network device in the form 10 are obtained.

[Form 25] An output control program in a form 25 is characterized in that, in the output control program in any one of the forms 23 and 24, in the output-request-information providing step, the output request information is provided in accordance with an acquisition procedure set in the output control program.

With such a constitution, when the program is read by the computer and the computer executes processing in accordance with the program read, an action and an advantage equivalent to those of the network device in the form 11 are obtained.

[Form 26] An output control program in a form 26 is characterized by including, in the output control program in the form 25, a program for causing the computer to execute processing including: an acquisition procedure determining step of determining the acquisition procedure; and an acquisition-procedure-information updating step of updating acquisition procedure information in acquisition-procedure-information storing means, which stores acquisition procedure information indicating the acquisition procedure, on the basis of the acquisition procedure determined in the acquisition procedure determining step, and in the output-request-information providing step, output request information, which includes the acquisition procedure information indicating the acquisition procedure determined in the acquisition procedure determining step, is provided on the basis of the acquisition procedure information in the acquisition-procedure-information storing means.

With such a constitution, when the program is read by the computer and the computer executes processing in accordance with the program read, an action and an advantage equivalent to those of the network device in the form 12 are obtained.

[Form 27] An output control program in a form 27 is characterized in that, in the output control program in any one of the forms 23, 24, and 26, in the output-request-information providing step, when it is judged that a network device that has requested acquisition of output data is registered in provision destination information, in which a provision destination of the output request information is registered, as a provision destination, the output request information is provided to the network device.

With such a constitution, when the program is read by the computer and the computer executes processing in accordance with the program read, an action and an advantage equivalent to those of the network device in the form 13 are obtained.

[Form 28] An output control program in a form 28 is characterized by including, in the output control program in any one of the forms 23, 24, 26, and 27, a program for causing the computer to execute processing including an output-request-information deleting step of deleting output request information in the output-request-information storing means in response to a deletion instruction.

With such a constitution, when the program is read by the computer and the computer executes processing in accordance with the program read, an action and an advantage equivalent to those of the network device in the form 14 are obtained.

[Form 29] An output control program in a form 29 is an output control program for performing output on the basis of output data, characterized by including a program for causing a computer to execute processing including: an authentication information acquiring step of acquiring authentication information; an output-request-information acquiring step of acquiring output request information, which includes acquisition source information concerning an acquisition source of the output data, from another network device; an output data authenticating and acquiring step of acquiring, when it is judged on the basis of the authentication information acquired in the authentication information acquiring step that a user is eligible to use the output data, the output data from a device using apparatus on the basis of the acquisition source information included in the output request information acquired in the output-request-information acquiring step; and an output step of performing output on the basis of the output data acquired in the output data authenticating and acquiring step.

With such a constitution, when the program is read by the computer and the computer executes processing in accordance with the program read, an action and an advantage equivalent to those of the network device in the form 15 are obtained.

The output-request-information acquiring step may take any form as long as output request information is obtained. For example, output request information may be acquired before authentication information is acquired. Output request information may be acquired after authentication information is acquired. The same applies to the output method in the form 37 in the following description.

[Form 30] An output control program in a form 30 is characterized in that, in the output control program in the form 29, the output request information and the authentication information include at least one of identification information for identifying a user, identification information for identifying the device using apparatus, and identification information for identifying the output data, in the output data authenticating and acquiring means, eligibility for using the output data is judged on the basis of the identification information included in the output request information acquired in the output-request-information acquiring step and the identification information included in the authentication information acquired in the authentication information acquiring step.

With such a constitution, when the program is read by the computer and the computer executes processing in accordance with the program read, an action and an advantage equivalent to those of the network device in the form 16 are obtained.

[Form 31] An output control program in a form 31 is characterized in that, in the output control program in any one of the forms 29 and 30, in the output-request-information acquiring step, the output request information is acquired from the network device registered in acquisition source information, in which an acquisition source of the output request information is registered, as an acquisition source.

With such a constitution, when the program is read by the computer and the computer executes processing in accordance with the program read, an action and an advantage equivalent to those of the network device in the form 17 are obtained.

[Form 32] An output control program in a form 32 is characterized in that, in the output control program in the form 31, in the acquisition source information, an acquisition source and an acquisition procedure for the output request information are registered in association with each other, and in the output-request-information acquiring step, the output request information is acquired from the another network device on the basis of the acquisition source information in accordance with an acquisition procedure corresponding to the another network device.

With such a constitution, when the program is read by the computer and the computer executes processing in accordance with the program read, an action and an advantage equivalent to those of the network device in the form 18 are obtained.

[Form 33] An output control program in a form 33 is characterized by including, in the output control program in the form 32, a program for causing the computer to execute processing including an acquisition-source-information updating step of updating an acquisition procedure for the acquisition source information on the basis of the acquisition procedure information included in the output request information acquired in the output-request-information acquiring step.

With such a constitution, when the program is read by the computer and the computer executes processing in accordance with the program read, an action and an advantage equivalent to those of the network device in the form 19 are obtained.

[Form 34] An output control program in a form 34 is characterized by including, in the output control program according to any one of the forms 29 to 33, a program for causing the computer to execute processing including a deletion instruction transmitting step of transmitting a deletion instruction to a network device that has acquired the output request information.

With such a constitution, when the program is read by the computer and the computer executes processing in accordance with the program read, an action and an advantage equivalent to those of the network device in the form 20 are obtained.

[Form 35] On the other hand, in order to attain the object described above, an output request program in a form 35 is an output request program that uses a network device, characterized by including a program for causing a computer to execute processing including: an output-request-information transmitting step of transmitting output request information, which includes acquisition source information concerning an acquisition source of the output data, to the network device; and an output data providing step of providing output data in output data storing means that stores the output data.

With such a constitution, when the program is read by the computer and the computer executes processing in accordance with the program read, an action and an advantage equivalent to those of the device using apparatus in the form 21 are obtained.

The output-request-information transmitting step may take any form as long as output request information is transmitted to the network device. For example, output request information may be transmitted actively. Output request information may be transmitted in response to a request from the network device or other apparatuses. The same applies to an output method in the form 37 in the following description.

[Form 36] An output request program in a form 36 is characterized by including, in the output request program in the form 35, a program for causing the computer to execute processing including a deletion instruction transmitting step of transmitting, when a transmission destination of the output request information and a provision destination of the output data are different, a deletion instruction to the network device that has become the transmission destination of the output request information.

With such a constitution, when the program is read by the computer and the computer executes processing in accordance with the program read, an action and an advantage equivalent to those of the device using apparatus in the form 22 are obtained.

[Form 37] On the other hand, in order to attain the object described above, an output method in a form 37 is an output method of connecting a first network device and a second network device, which perform output on the basis of output data, and a device using apparatus, which uses the network devices, so as to be capable of communicating with each other and of obtaining authentication to perform the output in the network devices, characterized in that the output method includes, for the devices using apparatus: an output-request-information transmitting step of transmitting output request information, which includes acquisition source information concerning an acquisition source of the output data, to the first network device; and an output data providing step of providing output data in output data storing means that stores the output data, the output method includes, for the first network device: an output-request-information receiving step of receiving the output request information; an output-request-information saving step of saving the output request information received in the output-request-information receiving step in output-request-information storing means; a first authenticate on information acquiring step of acquiring authentication information; a first output data authenticating and acquiring step of acquiring, when it is judged on the basis of the authentication information acquired in the first authentication information acquiring step that a user is eligible to use the output data, the output data from the device using apparatus on the basis of acquisition source information included in the output request information in the output-request-information storing means; a first output step of performing output on the basis of the output data acquired in the first output data authenticating and acquiring step; and an output-request-information providing step of providing output request information in the output-request-information storing means, and the output method includes, for the second network device: a second authentication information acquiring step of acquiring the authentication information; an output request information acquiring step of acquiring the output request information from the first network device; a second output data authenticating and acquiring step of acquiring, when it is judged on the basis of the authentication information acquired in the second authentication information acquiring step that the user is eligible to use the output data, the output data from the device using apparatus on the basis of the acquisition source information included in the output request information acquired in the output request information acquiring step; and a second output step of performing output on the basis of the output data acquired in the second output data authenticating and acquiring step.

Consequently, an advantage equivalent to that of the output system in the form 1 is obtained.

[Form 38] An output method in a form 38 is characterized in that, in the output method in the form 37, the output request information and the authentication information include at least one of identification information for identifying a user, identification information for identifying the device using apparatus, and identification information for identifying the output data, in the first output data authenticating and acquiring step, eligibility for using the output data is judged on the basis of the identification information included in the output request information in the output-request-information storing means and the identification information included in the authentication information acquired in the first authentication information acquiring step, and in the second output data authenticating and acquiring step, eligibility for using the output data is judged on the basis of the identification information included in the output request information acquired in the output-request-information acquiring step and the identification information included in the authentication information acquired in the second authentication information acquiring step.

Consequently, an advantage equivalent to that of the output system in the form 2 is obtained.

[Form 39] An output method in a form 39 is characterized in that, in the output method in any one of the forms 37 and 38, in the output-request-information acquiring step, the output request information is acquired from the first network device registered in the acquisition source information, in which an acquisition source of the output request information is registered, as an acquisition source.

Consequently, an advantage equivalent to that of the output system in the form 3 is obtained.

[Form 40] An output method in a form 40 is characterized in that, in the output method in the form 39, in the acquisition source information, an acquisition source and an acquisition procedure for the output request information are registered in association with each other, in the output-request-information acquiring step, the output request information is acquired from the first network device on the basis of the acquisition source information in accordance with an acquisition procedure corresponding to the first network device, and in the output-request-information providing step, the output request information is provided in accordance with an acquisition procedure set in the first network device.

Consequently, an advantage equivalent to that of the output system in the form 4 is obtained.

[Form 41] An output method in a form 41 is characterized in that, in the output method in the form 40, the output method includes, for the first network device: an acquisition procedure determining step of determining the acquisition procedure; and an acquisition-procedure-information updating step of updating acquisition procedure information in acquisition-procedure-information storing means, which stores acquisition procedure information indicating the acquisition procedure, on the basis of the acquisition procedure determined in the acquisition procedure determining step, in the output-request-information providing step, output request information, which includes acquisition procedure information indicating the acquisition procedure determined in the acquisition procedure determining step, is provided on the basis of the acquisition procedure information in the acquisition-procedure-information storing means, and the output method includes, for the second network device: an acquisition-source-information updating step of updating an acquisition procedure for the acquisition source information on the basis of the acquisition procedure information included in the output request information acquired in the output-request-information acquiring step.

Consequently, an advantage equivalent to that of the output system in the form 5 is obtained.

[Form 42] An output method in a form 42 is characterized in that, in the output method in any one of the forms 37 to 41, in the output-request-information providing step, when it is judge that the second network device that has requested acquisition of output data is registered in provision-destination information, in which a provision destination of the output request information is registered, as a provision destination, the output request information is provided to the second network device.

Consequently, an advantage equivalent to that of the output system in the form 6 is obtained.

[Form 43] An output method in a form 43 is characterized in that, in the output method in any one of the forms 37 to 42, the output method includes, for the device using apparatus: a deletion instruction transmitting step of transmitting, when a transmission destination of the output request information and a provision destination of the output data are different, a deletion instruction to the first network device that has become the transmission destination of the output request information, and the output method includes, for the first network device: an output-request-information deleting step of deleting output request information in the output-request-information storing means in response to the deletion instruction.

Consequently, an advantage equivalent to that of the output system in the form 7 is obtained.

[Form 44] An output method in a form 44 is characterized in that, in the output method in any one of the forms 37 to 42, the output method includes, for the second network device: a deletion instruction transmitting step of transmitting a deletion instruction to the first network device that has acquired the output request information, and the output method includes, for the first network device: an output-request-information deleting step of deleting output request information in the output-request-information storing means in response to the deletion instruction.

Consequently, an advantage equivalent to that of the output system in the form 8 is obtained.

[Form 45] On the other hand, in order to attain the object described above, an, output system in al form 45 is an output system in which plural network devices, which perform output on the basis of output data, and a device using apparatus, which uses the network devices, are connected so as to be capable of communicating with each other and the network devices obtain authentication to perform the output, the output system characterized in that the device using apparatus includes: output data storing means that stores the output data; output-request-information transmitting means that transmits output request information, which includes acquisition source information concerning an acquisition source of the output data, to the plural network devices; and output data providing means that provides the network devices with output data in the output data storing means, and the network devices include: output-request-information storing means; output-request-information receiving means that receives the output request information; output-request-information saving means that saves the output request information received by the output-request-information receiving means in the output-request-information storing means; authentication information acquiring means that acquires authentication information; output data authenticating and acquiring means that acquires, when it is judged on the basis of the authentication information acquired by the authentication information acquiring means that a user is eligible to use the output data, the output data from the device using apparatus on the basis of acquisition source information included in the output request information in the output-request-information storing means; and output means that performs output on the basis of the output data acquired by the output data authenticating and acquiring means.

With such a constitution, in the device using apparatus, output request information is transmitted to the plural network devices by the output-request-information transmitting means.

In each of the network devices, when output request information is received by the output-request-information receiving means, the output request information received is saved in the output-request-information storing means by the output-request-information saving means.

First, when the user wishes to perform output in any one of the network devices, the user gives authentication information to the authentication information acquiring means of the network device.

In the network device, when the authentication information is acquired by the authentication information acquiring means, eligibility for using output data is judged by the output data authenticating and acquiring means on the basis of the authentication information acquired. As a result, when it is judged that the user is eligible to use the output data, the output data is acquired from the device using apparatus by the output data authenticating and acquiring means on the basis of acquisition source information included in output request information in the output-request-information storing means.

In the device using apparatus, output data in the output data storing means is provided to the network device by the output data providing means.

In the network device, when output data is acquired, output is performed by the output means on the basis of the output data acquired.

On the other hand, when the user wishes to perform output in any one of the other network devices, output is performed in the same manner if the user gives authentication information to the authentication information acquiring means of the network device.

This makes it possible to perform output in an arbitrary network device even after output request information is transmitted from the device using apparatus. Thus, there is an advantage that it is possible to improve a degree of freedom of changing a network device serving as an output destination.

In the network device, output data is acquired at the time of output on the basis of output request information. Thus, it is possible to reduce the likelihood that the output data is stolen from the network device because of illegal access or the like. Therefore, there is also an advantage that it is possible to improve security compared with that in the past output system.

Output request information is transmitted to the plural network devices. Thus, even if any one of the network devices becomes inoperable, it is possible to perform output in any one of the other network devices. Therefore, there is also an advantage that it is possible to reduce the likelihood that output cannot be performed.

The authentication information acquiring means may take any constitution as long as the authentication information acquiring means acquires authentication information. For example, authentication information may be inputted to the authentication information acquiring means from an input device or the like. The authentication information acquiring means may obtain or receive authentication information from an external apparatus or the like. The authentication information acquiring means may read out authentication information from a storage, a storage medium, or the like. Therefore, acquisition includes at least input, obtainment, reception, and readout. The same applies to output systems in forms 47, 52, and 53 and network devices in forms 57 and 63 in the following description.

The output data authenticating and acquiring means may take any constitution as long as the output data authenticating and acquiring means judges eligibility for using output data on the basis of at least authentication information. For example, the output data authenticating and acquiring means may judge eligibility for using output data on the basis of only authentication information. The output data authenticating and acquiring means may judge eligibility for using output data on the basis of authentication information and other information. In the latter case, the other information may be registered in the network devices in advance or information received from the device using apparatus, other network devices, and other apparatuses may be used as the other information. The same applies to the output systems in the forms 47, 52 and 53 and the network devices in forms 57 and 63 in the following description.

The output means may take any constitution as long as the output means performs output on the basis of output data. The output means includes, for example, printing means that performs printing on the basis of print data, display means that performs display on the basis of display data, or sound output means that outputs sound on the basis of sound data. For example, a projector and an LCD correspond to the display means. The same applies to the output systems in the forms 47, 52, and 53 and the network devices in the forms 57 and 63 in the following description.

The output-request-information transmitting means may take any constitution as long as the output-request-information transmitting means transmits output request information to the network devices. For example, the output-request-information transmitting means may actively transmit output request information. The output-request-information transmitting means may transmit output request information in response to a request from the network devices or other apparatuses. The same applies to the output systems in the forms 47, 52, and 53 and device using apparatuses in the forms 66 and 68 in the following description.

The output data storing means stores output data with every means and at every time. The output data storing means may have output data stored therein in advance. The output data storing means may store output data according to input or the like from the outside at the time of operation of the system without storing the output data in advance. The same applies to the output systems in the forms 47, 52, and 53 and the device using apparatuses in the forms 66 and 68 in the following description.

The output-request-information storing means stores output request information with every means and at every time. The output-request-information storing means may have output request information stored therein in advance. The output-request-information storing means may store output request information according to input or the like from the outside at the time of operation of the system without storing the output request information in advance. The same applies to the output system in the form 47 and the network device in the form 57 in the following description.

[Form 46] An output system in a form 46 is characterized in that, in the output system in the form 45, the device using apparatus includes transmission-destination-information storing means that stores transmission destination information in which a transmission destination of the output request information is registered, and the output-request-information transmitting means transmits the output request information to a network device registered in the transmission destination information as a transmission destination.

With such a constitution, in the device using apparatus, output request information is transmitted to the network device, which is registered in the transmission destination information as a transmission destination, by the output-request-information transmitting means.

Consequently, in the device using apparatus, output request information is transmitted only to the network device registered in the transmission destination information. Thus, it is possible to reduce the likelihood that the output request information is transmitted to an unexpected network device. Therefore, there is an advantage that it is possible to further improve security.

The transmission-destination-information storing means stores transmission destination information with every means and at every time. The transmission-destination-information storing means may have transmission destination information stored therein in advance. The transmission-destination-information storing means may store transmission destination information according to input or the like from the outside at the time of operation of the system without storing the transmission destination information in advance. The transmission-destination-information storing means may refer to transmission destination information stored on the outside and temporarily hold the transmission destination information. The same applies to an output system in a form 48, a network device in a form 59, and a device using apparatus in a form 67.

[Form 47] An output system in a form 47 is an output system in which plural network devices, which perform output on the basis of output data, and a device using apparatus, which uses the network devices, are connected so as to be capable of communicating with each other and the network devices obtain authentication to perform the output, the output system characterized in that the device using apparatus includes: output data storing means that stores the output data; output-request-information transmitting means that transmits output request information, which includes acquisition source information concerning an acquisition source of the output data, to a representative network device serving as a representative among the plural network devices; and output-data providing means that provides the network devices with output data in the output data storing means, the network devices include: output-request-information storing means; output-request-information receiving means that receives the output request information; output-request-information saving means that saves the output request information received by the output-request-information receiving means in the output-request-information storing means; authentication information acquiring means that acquires authentication information; output data authenticating and acquiring means that acquires, when it is judged on the basis of the authentication information acquired by the authentication information acquiring means that a user is eligible to use the output data, the output data from the device using apparatus on the basis of acquisition source information included in the output request information in the output-request-information storing means; and output means that performs output on the basis of the output data acquired by the output data authenticating and acquiring means, and the representative network device includes output-request-information transferring means that transmits the output request information received by the output-request-information receiving means to the network devices other than the representative network device.

With such a constitution, in the device using apparatus, output request information is transmitted to the representative network device by the output-request-information transmitting means.

In the representative network device, when the output request information is received by the output-request-information receiving means, the output request information received is saved in the output-request-information storing means by the output-request-information saving means. The received output request information is transmitted to the network devices other than the representative network device by the output-request-information transferring means.

In each of the other network devices, when the output request information is received by the output-request-information receiving means, the output request information received is saved in the output-request-information storing means by the output-request-information saving means.

First, when the user wishes to perform output in any one of the network devices including the representative network device, the user gives authentication information to the authentication information acquiring means of the network device.

In the network device, when the authentication information is acquired by the authentication information acquiring means, it is judged by the output data authenticating and acquiring means, on the basis of the authentication information acquired, whether a user is eligible to use output data. As a result, when it is judged that the user is eligible to use the output data, the output data is acquired from the device using apparatus by the output data authenticating and acquiring means on the basis of acquisition source information included in output request information in the output-request-information storing means.

In the device using apparatus, output data in the output data storing means is provided to the network device by the output data providing means.

In the network device, when output data is acquired, output is performed by the output means on the basis of the output data acquired.

On the other hand, when the user wishes to perform output in any one of the other network devices, output is performed in the same manner if the user gives authentication information to the authentication information acquiring means of the network device.

This makes it possible to perform output in an arbitrary network device even after output request information is transmitted from the device using apparatus. Thus, there is an advantage that it is possible to improve a degree of freedom of changing a network device serving as an output destination.

In the network device, output data is acquired at the time of output on the basis of output request information. Thus, it is possible to reduce the likelihood that the output data is stolen from the network device because of illegal access or the like. Therefore, there is also an advantage that it is possible to improve security compared with that in the past.

In the device using apparatus, output request information only has to be transmitted to the representative network device. Thus, there is also an advantage that, even if presence of the network devise other than the representative network device is not recognized, it is possible to use the network devices.

The output-request-information transferring means may take any constitution as long as the output-request-information transferring means transmits output request information to the network devise other than the representative network device. For example, the output-request-information transferring means may actively transmit output request information. The output-request-information transferring means may transmit output request information in response to a request from the other network devices, the device using apparatus, or other apparatuses. The same applies to the output system in the form 53 and network devices in forms 58 and 64 in the following description.

[Form 48] An output system in a form 48 is characterized in that, in the output system in the form 47, the representative network device includes transmission-destination-information storing means that stores transmission destination information in which a transmission destination of the output request information is registered, and the output-request-information transferring means transmits the output request information to a network device registered in the transmission destination information as a transmission destination.

With such a constitution, in the representative network device, output request information is transmitted to the network device, which is registered in the transmission destination information as a transmission destination, by the output-request-information transferring means.

Consequently, in the representative network device, output request information is transmitted only to the network device registered in the transmission destination information. Thus, it is possible to reduce the likelihood that the output request information is transmitted to an unexpected network device. Therefore, there is an advantage that it is possible to further improve security.

[Form 49] An output system in a form 49 is characterized in that, in the output system in any one of the forms 45 to 48, the output request information and the authentication information include at least one of identification information for identifying a user, identification information for identifying the device using apparatus, and identification information for identifying the output data, and the output data authenticating and acquiring means judges eligibility for using the output data on the basis of the identification information included in the output request information in the output-request-information storing means and the identification information included in the authentication information acquired by the authentication information acquiring means.

With such a constitution, in the network devices, eligibility for using output data is judged by the output data authenticating and acquiring means on the basis of identification information included in output request information in the output-request-information storing means and identification information included in authentication information acquired.

Consequently, since authentication is performed on the basis of identification information included in output request information, it is possible to vary authentication information for each user, for each device using apparatus, or for each output data. Therefore, there is an advantage that it is possible to further improve security.

The identification information for identifying a user includes, for example, a user identifier, a user name, a user ID, and a one-time identifier allocated by the user. If the identification information is included in the output request information and the authentication information, it is possible to perform authentication of eligibility of use and specify output data of a user who has requested output. The same applies to a network device in a form 60, an output control program in a form 72, and an output method in a form 85 in the following description.

The identification information for identifying a device using apparatus includes, for example, address information (an IP address, etc.), a device identifier, a name, and a device ID of the device using apparatus, and a one-time identifier allocated by the device using apparatus, a server, or the like. If the identification information is included in the output request information and the authentication information, it is possible to perform authentication of eligibility of use and specify an acquisition source of output data. The same applies to the network device in the form 60, the output control program in the form 72, and the output method in the form 85 in the following description.

The identification information for identifying output data includes, for example, a data identifier, a job identifier, a data name, a job name, a data ID, a job ID, and a one-time identifier allocated by a device using apparatus, a server, or the like. If the identification information is included in the output request information and the authentication information, it is possible to perform authentication of eligibility of use and specify each output data when an identical user performs plural output requests. The same applies to the network device in the form 60, the output control program in the form 72, and the output method in the form 85 in the following description.

[Form 50] An output system in a form 50 is characterized in that, in the output system in any one of the forms 45 to 49, the network device includes: status information acquiring means that acquires status information indicating a progress state of output processing of the other network devices; output processing monitoring means that monitors a progress state of output processing of the network device; and output-request-information deleting means that deletes the output request information, and the output-request-information deleting means deletes, when it is judged, on the basis of the status information acquired by the status information acquiring means and a result of the monitoring by the output processing monitoring means, that the output processing is completed in any one of the network devices including the network device, output request information corresponding to the output processing from the output-request-information storing means.

With such a constitution, in the network device, status information indicating a progress state of output processing of the other network device is acquired by the status information acquiring means and a progress state of output processing of the network device is monitored by the output processing monitoring means. When it is judged on the basis of the status information acquired and a result of the monitoring by the output processing monitoring means that output processing is completed in any one of the network devices including the network device, output request information corresponding to the output processing is deleted from the output-request-information storing means.

Consequently, since the output request information is held by the network device until the output processing is completed, even if the network device performing the output processing becomes inoperable, it is possible to perform output in any one of the other network devices. Therefore, there is an advantage that it is possible to reduce the likelihood that output cannot be performed.

Since the output request information is deleted from the network device after the output processing is completed, it is possible to reduce the likelihood that the output request information is stolen from the network device because of illegal access or the like. Therefore, there is also an advantage that it is possible to further improve security.

The status information acquiring means may take any constitution as long as the status information acquiring means acquires status information. It is possible to acquire status information from, for example, the network device, the device using apparatus, and other apparatuses. When status information is acquired, from the apparatuses other than the network device, for example, status information of the network devices only has to be saved in an apparatus at an acquisition source. The same applies to a network device in a form 61 in the following description.

[Form 51] An output system in a form 51 is characterized in that, in the output system in any one of the forms 45 to 49, the network device includes: output processing monitoring means that monitors a progress state of output processing of the network device; and output data deleting means that deletes the output data, and the output data deleting, means deletes, when it is judged on the basis of a result of the monitoring by the output processing monitoring means that output processing of a predetermined unit is completed, a part, for which the output processing is completed, of output data corresponding to the output processing.

With such a constitution, in the network device, a progress state of output processing of the network device is monitored by the output processing monitoring means. When it is judged on the basis of a result of the monitoring by the output processing monitoring means that outputs processing of a predetermined unit is completed, a part, for which the output processing is completed, of output data corresponding to the output processing is deleted.

Consequently, in the network device, a part, for which the output processing is completed, of the output data is deleted every time the output processing of a predetermined unit is completed. Thus, it is possible to reduce the likelihood that the output data is stolen from the network device because of illegal access or the like. Therefore, there is an advantage that it is possible to further improve security.

It is possible to judge that the output processing of a predetermined unit is completed by judging, for example, that output processing for a predetermined amount of data is completed, output processing in a predetermined time is completed, or, when plural kinds of output processing are applied to output data, each of the kinds of output processing is completed. The same applies to a network device in a form 62, an output control program in a form 74, and an output method in a form 87 in the following description.

[Form 52] An output system in a form 52 is an output system in which plural network devices, which perform output on the basis of output data, and a device using apparatus, which uses the network devices, are connected so as to be capable of communicating with each other and the network devices obtain authentication to perform the output, the output system characterized in that the device using apparatus includes: output data storing means that stores the output data; output-request-information transmitting means that transmits output request information to the plural network devices; and output data providing means that provides the network devices with output data in the output data storing means, and the network devices include: output-request-information receiving means that receives the output request information; authentication information acquiring means that acquires authentication information; acquisition-source-information confirming means that confirms acquisition source information concerning an acquisition source of the output data; output data authenticating and acquiring means that acquires, when it is judged on the basis of the authentication information acquired by the authentication information acquiring means that a user is eligible to use the output data, the output data from the device using apparatus on the basis of the acquisition source information confirmed by the acquisition-source-information confirming means; and output means that performs output on the basis of the output data acquired by the output data authenticating and acquiring means.

With such a constitution, in the device using apparatus, output request information is transmitted to the plural network devices by the output-request-information transmitting means.

First, when the user wishes top perform output in any one of the network devices, the user gives authentication information to the authentication information acquiring means of the network device.

In the network device, when output request information is received by the output-request-information receiving means and the authentication information is acquired by the authentication information acquiring means, it is judged by the output data authenticating and acquiring means on the basis of the authentication information acquired whether a user is eligible to use output data. Acquisition source information is confirmed by the acquisition-source-information confirming means. As a result of the judgment, when it is judged that the user is eligible to use the output data, the output data is acquired from the device using apparatus by the output data authenticating and acquiring means on the basis of the acquisition source information confirmed.

In the device using apparatus, output data in the output data storing means is provided to the network device by the output data providing means.

In the network device, when output data is acquired, output is performed by the output means on the basis of the output data acquired.

On the other hand, when the user wishes to perform output in any one of the other network devices, output is performed in the same manner if the user gives authentication information to the authentication information acquiring means of the network device.

Consequently, an advantage equivalent to that of the output system in the form 45 is obtained.

The acquisition-source-information confirming means may take any constitution as long as the acquisition-source-information confirming means confirms acquisition source information. For example, acquisition source information may be inputted to the acquisition-source-information confirming means from an input device or the like. The acquisition-source-information confirming means may obtain or receive acquisition source information from an external apparatus or the like. For example, the acquisition-source-information confirming means may read out acquisition source information from a storage, a storage medium, or the like. The acquisition-source-information confirming means may refer to acquisition source information included in output request information, authentication information, and other information. Therefore, confirmation includes at least input, obtainment, reception, readout, and reference. The same applies to an output system in a form 53 and a network device in a form 63 in the following description.

[Form 53] An output system, in a form 53 is an output system in which plural network devices, which perform output on the basis of output data, and a device using apparatus, which uses the network devices, are connected so as to be capable of communicating with each other and the network devices obtain authentication to perform the output, the output system characterized in that the device using apparatus includes: output data storing means that stores the output data; output-request-information transmitting means that transmits output request information to a representative network device serving as a representative among the plural network devices; and output data providing means that provides the network devices with output data in the output data storing means, the network devices include: output-request-information receiving means that receives the output request information; authentication information acquiring means that acquires authentication information; acquisition-source-information confirming means that confirms acquisition source information concerning an acquisition source of the output data; output data authenticating and acquiring means that acquires, when it is judged on the basis of the authentication information acquired by the authentication information acquiring means that a user is eligible to use the output data, the output data from the device using apparatus on the basis of the acquisition source information confirmed by the acquisition-source-information confirming means; and output means that performs output on the basis of the output data acquired by the output data authenticating and acquiring means, and the representative network device has output-request-information transferring means that transmits the output request information received by the output-request-information receiving means to the network devices other than the representative network device.

With such a constitution, in the device using apparatus, output request information is transmitted to the representative network device by the output-request-information transmitting means.

In the representative network device, when the output request information is received by the output-request-information receiving means, the output request information received is transmitted to the network devices other than the representative network device by the output-request-information transferring means.

First, when the user wishes to perform output in any one of the network devices, the user gives authentication information to the authentication information acquiring means of the network device.

In the network device, when the output request information is received by the output request-information receiving means and the authentication information is acquired by the authentication information acquiring means, it is judged by the output data authenticating and acquiring means, on the basis of the authentication information acquired, whether the user is eligible to use output data. Acquisition source information is confirmed by the acquisition-source-information confirming means. As a result of the judgment, when it is judged that the user is eligible to use the output data, the output data is acquired from the device using apparatus by the output data authenticating and acquiring means on the basis of acquisition source information confirmed.

In the device using apparatus, output data in the output data storing means is provided to the network device by the output data providing means.

In the network device, when output data is acquired, output is performed by the output means on the basis of the output data acquired.

On the other hand, when the user wishes to perform output in any one of the other network devices, output is performed in the same manner if the user gives authentication information to the authentication information acquiring means of the network device.

Consequently, an advantage equivalent to that of the output system in the form 47 is obtained.

[Form 54] An output system in a form 54 is characterized in that, in the output system in any one of the forms 52 and 53, the authentication information includes the acquisition source information, and the acquisition-source-information confirming means acquires the acquisition source information from the authentication information acquired by the authentication information acquiring means.

With such a constitution, in the network device, when authentication information is acquired by the authentication information acquiring means, acquisition source information is acquired by the acquisition-source-information confirming means from the authentication information acquired.

[Form 55] An output system in a form 55 is characterized in that, in the output system in any one of the forms 45 and 52, an output request information relaying apparatus, which relays the output request information, is connected to the network devices to be capable of communicating with the network devices, the output-request-information transmitting means transits the output request information to the output request information relaying apparatus, and the output request information relaying apparatus includes: second output-request-information receiving means that receives the output request information; and output-request-information transferring means that transmits the output request information received by the second output-request-information receiving means to the plural network devices.

With such a constitution, in the device using apparatus, output request information is transmitted to the output request information relaying apparatus by the output-request-information transmitting means.

In the output request information relaying apparatus, when output request information is received by the second output-request-information receiving means, the output request information received is transmitted to the plural network devices by the output-request-information transferring means.

[Form 56] An output system in a form 5-6 is characterized in that, in the output system in any one of the forms 47 and 53, an output request information relaying apparatus, which relays the output request information, is connected to the network devices to be capable of communicating with the network devices, the output-request-information transmitting means transits the output request information to the output request information relaying apparatus, and the output request information relaying apparatus includes: second output-request-information receiving means that receives the output request information; and second output-request-information transferring means that transmits the output request information received by the second output-request-information receiving means to the representative network device.

With such a constitution, in the device using apparatus, output request information is transmitted to the output request information relaying apparatus by the output-request-information transmitting means.

In the output request information relaying apparatus, when output request information is received by the second output-request-information receiving means, the output request information received is transmitted to the representative network device by the second output-request-information transferring means.

[Form 57] On the other hand, in order to attain the object described above, a network device in a form 57 is a network device that performs output on the basis of output data, characterized by including:

output-request-information storing means; output-request-information receiving means that receives output request information including acquisition source information concerning an acquisition source of the output data; output-request-information saving means that saves the output request information received by the output-request-information receiving means in the output-request-information storing means; authentication information acquiring means that acquires authentication information; output data authenticating and acquiring means that acquires, when it is judged on the basis of the authentication information acquired by the authentication information acquiring means that a user is eligible to use the output data, the output data from the device using apparatus on the basis of acquisition source information included in the output request information in the output-request-information storing means; and output means that performs output on the basis of the output data acquired by the output data authenticating and acquiring means.

With such a constitution, an action equivalent to that of the network device in the output system in the form 45 or 47 is obtained. Therefore, an advantage equivalent to that of the output system in the form 45 or 47 is obtained.

[Form 58] A network device in a form 58 is characterized by including, in the network device in the form 57, output-request-information transferring means that transmits the output request information received by the output-request-information receiving means to other network devices other than the network device.

With such a constitution, an action equivalent to that of the representative network device in the output system in the form 47, is obtained. Therefore, an advantage equivalent to that of the output system in the form 47 is obtained.

[Form 59] A network, device in a form 59 is characterized by including, in the network device in the form 58, transmission-destination-information storing means that stores transmission destination information in which a transmission destination of the output request information is registered, and in that the output-request-information transmitting means transmits the output request information to a network device registered in the transmission destination information as a transmission destination.

With such a constitution, an action equivalent to that of the network device in the output system in the form 48 is obtained. Therefore, an advantage equivalent to that of the output system in the form 48 is obtained.

[Form 60] A network device in a form 60 is characterized in that, in the network device in any one of the forms 57 to 59, the output request information and the authentication information include at least one of identification information for identifying a user, identification information for identifying the device using apparatus, and identification information for identifying the output data, and the output data authenticating and acquiring means judges eligibility for using the output data on the basis of the identification information included in the output request information in the output-request-information storing means and the identification information included in the authentication information acquired by the authentication information acquiring means.

With such a constitution, an action equivalent to that of the network device in the output system in the form 49 is obtained. Therefore, an advantage equivalent to that of the output system in the form 49 is obtained.

[Form 61] A network device in a form 61 is characterized by including, in the network device in one any of the forms 57 to 60, status information acquiring means that acquires status information indicating a progress state of output processing of the other network devices; output processing monitoring means that monitors a progress state of output processing of the network device; and output-request-information deleting means that deletes the output request information, and in that the output-request-information deleting means deletes, when it is judged, on the basis of the status information acquired by the status information acquiring means and a result of the monitoring by the output processing monitoring means, that the output processing is completed in any one of the network devices including the network device, output request information corresponding to the output processing from the output-request-information storing means.

With such a constitution, an action equivalent to that of the network device in the output system in the form 50 is obtained. Therefore, an advantage equivalent to that of the output system in the form 50 is obtained.

[Form 62] A network device in a form 62 is characterized by including, in the network device according to any one of the forms 57 to 60, output processing monitoring means that monitors a progress state of output processing of the network device; and output data deleting means that deletes the output data, and in that the output data deleting means deletes, when it is judged on the basis of a result of the monitoring by the output processing monitoring means that outputs processing of a predetermined unit is completed, a part, for which the output processing is completed, of output data corresponding to the output processing.

With such a constitution, an action equivalent to that of the network device in the output system in the form 51 is obtained. Therefore, an advantage equivalent to that of the output system in the form 51 is obtained.

[Form 63] A network device in a form 63 is a network device that performs output on the basis of output data, characterized by including:

output-request-information receiving means that receives output request information; authentication information acquiring means that acquires authentication information; acquisition-source-information confirming means that confirms acquisition source information concerning an acquisition source of the output data; output data authenticating and acquiring means that acquires, when it is judged on the basis of the authentication information acquired by the authentication information acquiring means that a user is eligible to use the output data, the output data from the device using apparatus on the basis of the acquisition source information confirmed by the acquisition-source-information confirming means; and output means that performs output on the basis of the output data acquired by the output data authenticating and acquiring means.

With such a constitution, an action equivalent to that of the network device in the output system in the form 52 or 53 is obtained. Therefore, an advantage equivalent to that of the output system in the form 52 or 53 is obtained.

[Form 64] A network device in a form 64 is characterized by including, in the network device in the form 63, output-request-information transferring means that transmits the output request information received by the output-request-information receiving means to network devices other than the network device.

With such a constitution, an action equivalent to that of the representative network device in the output system in the form 53 is obtained. Therefore, an advantage equivalent to that of the output system in the form 53 is obtained.

[Form 65] A network device in a form 65 is characterized in that, in the network device in any one of the forms 63 and 64, the authentication information includes the acquisition source information, and the acquisition-source-information confirming means acquires the acquisition source information from the authentication information acquired by the authentication information acquiring means.

With such a constitution, an action equivalent to that of the representative network device in the output system in the form 54 is obtained. Therefore, an advantage equivalent to that of the output system in the form 54 is obtained.

[Form 66] On the other hand, in order to attain the object described above, a device using apparatus in a form 66 is a device using apparatus that uses a network device, characterized by including:

output data storing means that stores output data; output-request-information transmitting means that transmits output request information, which includes acquisition source information concerning an acquisition source of the output data, to a plurality of the network devices; and output data providing means that provides the network device with output data in the output data storing means.

With such a constitution, an action equivalent to that of the device using apparatus in the output system in the form 45 or 47 is obtained. Therefore, an advantage equivalent to that of the output system in the form 45 or 47 is obtained.

[Form 67] A device using apparatus in a form 67 is characterized by including, in the device using apparatus in the form 66, transmission-destination-information storing means that stores transmission destination information in which a transmission destination of the output request information is registered, and in that the output-request-information transmitting means transmits the output request information to a network device registered in the transmission destination information as a transmission destination.

With such a constitution, an action equivalent to that of the device using apparatus in the output system in the form 46 is obtained. Therefore, an advantage equivalent to that of the output system in the form 46 is obtained.

[Form 68] A device using apparatus in a form 68 is a device using apparatus that uses a network device, characterized by including:

output data storing means that stores output data; output-request-information transmitting means that transmits output request information to a plurality of the network devices; and output data providing means that provides the network device with output data in the output data storing means.

With such a constitution, an action equivalent to that of the device using apparatus in the output system in the form 52 is obtained. Therefore, an advantage equivalent to that of the output system in the form 52 is obtained.

[Form 69] On the other hand, in order to attain the object described above, an output control program in a form 69 is an output control program for performing output on the basis of output data, characterized by including a program for causing a computer to execute processing including: an output-request-information receiving step of receiving output request information including acquisition source information concerning an acquisition source of the output data; an output-request-information saving step of saving the output request information received in the output-request-information receiving step in output-request-information storing means; an authentication information acquiring step of acquiring authentication information; an output data authenticating and acquiring step of acquiring, when it is judged on the basis of the authentication information acquired in the authentication information acquiring step that a user is eligible to use the output data, the output data from a device using apparatus on the basis of acquisition source information included in the output request information in the output-request-information storing means; and an output step of performing output on the basis of the output data acquired in the output data authenticating and acquiring step.

With such a constitution, when the program is read by the computer and the computer executes processing in accordance with the program read, an action and an advantage equivalent to those of the network device in the form 57 are obtained.

The authentication information acquiring step may take any form as long as authentication information is acquired. For example, authentication information may be inputted from an input device or the like. Authentication information may be obtained or received from an external apparatus or the like or may be read out from a storage, a storage medium, or the like. Therefore, acquisition includes at least input, obtainment, reception, and readout. The same applies to an output control program in a form 75 and output methods in forms 81, 83, 88, and 89 in the following description.

The output data authenticating and acquiring step may take any form as long as eligibility for using output data is judged on the basis of at least authentication information. For example, eligibility for using output data may be judged on the basis of only authentication information. Eligibility for using output data may be judged on the basis of authentication information and other information. In the latter case, the other information may be registered in the network device in advance or information received from the device using apparatus, other network devices, and other apparatuses may be used as the other information. The same applies to the output control program in the form 75 and the output methods in the forms 81, 83, 88, and 89 in the following description.

The output step may take any form as long as output is performed on the basis of output data. The output step includes, for example, a printing step of performing printing on the basis of print data, a display step of performing display on the basis of display data, and a sound output step of outputting sound on the basis of sound data. For example, display by a projector or an LCD corresponds to the display step. The same applies to the output control program in the form 75 and the output methods in the forms 81, 83, 88, and 89 in the following description.

[Form 70] An output control program in a form 70 is characterized by including, in the output control program in the form 69, a program for causing the computer to execute processing including an output-request-information transferring step of transmitting output request information received in the output-request-information receiving step to network devices other than the network device.

With such a constitution, when the program is read by the computer and the computer executes processing in accordance with the program read, an action and an advantage equivalent to those of the network device in the invention 14 are obtained.

The output-request-information transferring step may take any form as long as output request information is transmitted to network devices other than the network device. For example, output request information may be transmitted actively. Output request information may be transmitted in response to a request from the other network devices, the device using apparatus, or other apparatuses. The same applies to an output control program in a form 76 and the output method in the form 83 in the following description.

[Form 71] An output control program in a form 71 is an output control program in the form 70, characterized in that in the output-request-information transferring step, the output request information is transmitted to a network device registered in transmission destination information, in which a transmission destination of the output request information is registered, as a transmission destination.

With such a constitution, when the program is read by the computer and the computer executes processing in accordance with the program read, an action and an advantage equivalent to those of the network device in the form 59 are obtained.

[Form 72] An output control program in a form 72 is characterized in that, in the output, control program in any one of the forms 69 to 71, the output request information and the authentication information include at least one of identification information for identifying a user, identification information for identifying the device using apparatus, and identification information for identifying the output data, and in the output data authenticating and acquiring step, eligibility for using the output data is judged on the basis of the identification information included in the output request information in the output-request-information storing means and the identification information included in the authentication information acquired in the authentication information acquiring step.

With such a constitution, when the program is read by the computer and the computer executes processing in accordance with the program read, an action and an advantage equivalent to those of the network device in the form 60 are obtained.

[Form 73] An output control program in a form 73 is characterized by including, in the output control program in any one of the forms 69 to 72, a program for causing the computer to execute processing including: a status information acquiring step of acquiring status information indicating a progress state of output processing of the other network devices; an output processing monitoring step of monitoring a progress state of output processing of the network device; and an output-request-information deleting step of deleting the output request information, and in the output-request-information deleting step, when it is judged, on the basis of the status information acquired in the status information acquiring step and a result of the monitoring in the output processing monitoring step, that the output processing is completed in any one of the network devices including the network device, output request information corresponding to the output processing is deleted from the output-request-information storing means.

With such a constitution, when the program is read by the computer and the computer executes processing in accordance with the program read, an action and an advantage equivalent to those of the network device in the form 61 are obtained.

The status information acquiring step may take any form as long as status information is acquired. It is possible to acquire status information from, for example, the network device, the device using apparatus, and other apparatuses. When status information is acquired from the apparatuses other than the network device, for example, status information of the network device only has to be saved in an apparatus at an acquisition source. The same applies to an output method in a form 86.

[Form 74] An output control program in a form 74 is characterized by including, in the output control program in any one of the forms 69 to 72, a program for causing the computer to execute processing including: an output processing monitoring step of monitoring a progress state of output processing of the network device; and an output data deleting step of deleting the output data, and in the output data deleting step, when it is judged on the basis of a result of the monitoring in the output processing monitoring step that output processing of a predetermined unit is completed, a part, for which the output processing is completed, of output data corresponding to the output processing is deleted.

With such a constitution, when the program is read by the computer and the computer executes processing in accordance with the program read, an action and an advantage equivalent to those of the network device in the form 62 are obtained.

[Form 75] An output control program in a form 75 is an output control program for performing output on the basis of output data, characterized by including:

an output-request-information receiving step of receiving output request information; an authentication information acquiring step of acquiring authentication information; an acquisition-source-information confirming step of confirming acquisition source information concerning an acquisition source of the output data; an output data authenticating and acquiring step of acquiring, when it is judged on the basis of the authentication information acquired in the authentication information acquiring step that a user is eligible to use the output data, the output data from a device using apparatus on the basis of the acquisition source information confirmed in the acquisition-source-information confirming step; and an output step of performing output on the basis of the output data acquired in the output data authenticating and acquiring step.

With such a constitution, when the program is read by the computer and the computer executes processing in accordance with the program read, an action and an advantage equivalent to those of the network device in the form 63 are obtained.

The acquisition-source-information confirming step may take any form as long as acquisition source information is confirmed. For example, acquisition source information may be inputted from an input device or the like. Acquisition source information may be obtained or received from an external apparatus or the like. For example, acquisition source information may be read out from a storage, a storage medium, or the like. Acquisition source information included in output request information, authentication information, or other information may be referred to. Therefore, confirmation includes at least input, obtainment, reception, readout, and reference. The same applies to the output control program in the form 76 in the following description.

[Form 76] An output control program in a form 76 is characterized by including, in the output control program in the form 75, a program for causing the computer to execute processing including an output-request-information transferring step of transmitting the output request information received in the output-request-information receiving step to network devices other than the network device.

With such a constitution, when the program is read by the computer and the computer executes processing in accordance with the program read, an action and an advantage equivalent to those of the network device in the form 64 are obtained.

[Form 77] An output control program in a form 77 is characterized in that, in the output control program in any one of the forms 75 and 76, the authentication information includes the acquisition source information, and in the acquisition-source-information confirming step, the acquisition source information is acquired from the authentication information acquired in the authentication information acquiring step.

With such a constitution, when the program is read by the computer and the computer executes processing in accordance with the program read, an action and an advantage equivalent to those of the network device in the form 65 are obtained.

[Form 78] On the other hand, in order to attain the object described above, an output request program in a form 78 is an output request program that uses a network device, characterized by including a program for causing a computer to execute processing including: an output-request-information transmitting step of transmitting output request information, which includes acquisition source information concerning an acquisition source of the output data, to a plurality of the network devices; and an output data providing step of providing the network device with output data in output data storing means that stores the output data.

With such a constitution, when the program is read by the computer and the computer executes processing in accordance with the program read, an action and an advantage equivalent to those of the network device in the form 66 are obtained.

The output-request-information transmitting step may take any form as long as output request information is transmitted to the network device. For example, output request information may be actively transmitted. Output request information may be transmitted in response to a request from the network device or other apparatuses. The same applies to an output request program in a form 80 and the output methods in the forms 81, 83, and 88.

[Form 79] An output request program in a form 79 is characterized in that, in the output request program in the form 78, in the output-request-information transmitting step, the output request information is transmitted to a network device registered in transmission destination information, in which a transmission destination of the output request information is registered, as a transmission destination.

With such a constitution, when the program is read by the computer and the computer executes processing in accordance with the program read, an action and an advantage equivalent to those of the device using apparatus in the form 67 are obtained.

[Form 80] An output request program in a form 80 is an output request program that uses a network device, characterized by including a program for causing a computer to execute processing including: an output-request-information transmitting step of transmitting output request information to a plurality of the network devices; and an output data providing step of providing the network device with output data in output data storing means that stores the output data.

With such a constitution, when the program is read by the computer and the computer executes processing in accordance with the program read, an action and an advantage equivalent to those of the device using apparatus in the form 68 are obtained.

[Form 81] On the other hand, in order to attain the object described above, an output method in a form 81 is an output method of connecting plural network devices, which perform output on the basis of output data, and a device using apparatus, which uses the network devices, so as to be capable of communicating with each other and of obtaining authentication to perform the output in the network devices, characterized in that the output method includes, for the device using apparatus: an output-request-information transmitting step of transmitting output request information, which includes acquisition source information concerning an acquisition source of the output data, to the plural network devices; and an output data providing step of providing the network devices with output data in output data storing means that stores the output data, and the output method includes, for the network devices: an output-request-information receiving step of receiving the output request information; an output-request-information saving step of saving the output request information received in the output-request-information receiving step in output-request-information storing means; an authentication information acquiring step of acquiring authentication information; an output data authenticating and acquiring step of acquiring, when it is judged on the basis of the authentication information acquired in the authentication information acquiring step that a user is eligible to use the output data, the output data from the device using apparatus on the basis of acquisition source information included in the output request information in the output-request-information storing means; and an output step of performing output on the basis of the output data acquired in the output data authenticating and acquiring step.

Consequently, an advantage equivalent to that of the output system in the form 45 is obtained.

[Form 82] An output method in a form 82 is characterized in that, in the output method in the form 81, in the output-request-information transmitting step, the output request information is transmitted to a network device registered in transmission destination information, in which a transmission destination of the output request information is registered, as a transmission destination.

Consequently, an advantage equivalent to that of the output system in the form 46 is obtained.

[Form 83] An output method in a form 83 is an output method of connecting plural network devices, which perform output on the basis of output data, and a device using apparatus, which uses the network devices, so as to be capable of communicating with each other and obtaining authentication to perform the output in the network devices, characterized in that the output method includes, for the device using apparatus: an output-request-information transmitting step of transmitting output request information, which includes acquisition source information concerning an acquisition-source of the output data, to a representative network device serving as a representative among the plural network devices; and an output data providing step of providing the network devices with output data in output data storing means that stores the output data, the output method includes, for the representative network device: a first output-request-information receiving step of receiving the output request information; a first output-request-information saving step of saving the output request information received in the first output-request-information receiving step in output-request-information storing means of the representative network device; and an output-request-information transferring step of transmitting the output request information received in the first output-request-information receiving step to the network devices other than the representative network device, the output method includes, for the other network devices: a second output-request-information receiving step of receiving the output request information; and a second output-request-information saving step of saving the output request information received in the second output-request-information receiving step in output-request-information storing means of the network devices, and the output method includes, for the network devices: an authentication information acquiring step of acquiring authentication information; an output data authenticating and acquiring step of acquiring, when it is judged on the basis of the authentication information acquired in the authentication information acquiring step that a user is eligible to use the output data, the output data from the device using apparatus on the basis of acquisition source information included in the output request information in the output-request-information storing means; and an output step of performing output on the basis of the output data acquired in the output data authenticating and acquiring step.

Consequently, an advantage equivalent to that of the output system in the form 47 is obtained.

[Form 84] An output method in a form 84 is characterized in that, in the output method in the form 83, in the output-request-information transferring step, the output request information is transmitted to a network device registered in transmission destination information, in which a transmission destination of the output request information is registered, as a transmission destination.

Consequently, an advantage equivalent to that of the output system in the form 48 is obtained.

[Form 85] An output method in a form 85 is characterized in that, in the output method in any one of the forms 81 to 84, the output request information and the authentication information include at least one of identification information for identifying a user, identification information for identifying the device using apparatus, and identification information for identifying the output data, and in the output data authenticating and acquiring step, eligibility for using the output data is judged on the basis of the identification information included in the output request information in the output-request-information storing means and the identification information included in the authentication information acquired in the authentication information acquiring step.

Consequently, an advantage equivalent to that of the output system in the form 49 is obtained.

[Form 86] An output method in a form 86 is characterized in that, in the output method in any one of the forms 81 to 85, the output method includes, for the network device: a status information acquiring step of acquiring status information indicating a progress state of output processing of the other network devices; an output processing monitoring step of monitoring a progress state of output processing of the network device; and an output-request-information deleting step of deleting the output request information, and in the output-request-information deleting step, when it is judged, on the basis of the status information acquired in the status information acquiring step and a result of the monitoring in the output processing monitoring step, that the output processing is completed in any one of the network devices including the network device, output request information corresponding to the output processing is deleted from the output-request-information storing means.

Consequently, an advantage equivalent to that of the output system in the form 50 is obtained.

[Form 87] An output method in a form 87 is characterized in that, in the output method in any one of the forms 81 to 85, the output method includes, for the network device: an output processing monitoring step of monitoring a progress state of output processing of the network device; and an output data deleting step of deleting the output data, and, in the output data deleting step, when it is judged on the basis of a result of the monitoring in the output processing monitoring step that output processing, of a predetermined unit is completed, a part, for which the output processing is completed, of output data corresponding to the output processing is deleted.

Consequently, an advantage equivalent to that of the output system in the form 51 is obtained.

[Form 88] An output method in a form 88 is an output method of connecting plural network devices, which perform output on the basis of output data, and a device using apparatus, which uses the network devices, so as to be capable of communicating with each other and of obtaining authentication to perform the output in the network devices, characterized in that the output method includes, for the device using apparatus: an output-request-information transmitting step of transmitting output request information to the plural network devices; and an output data providing step of providing the network devices with output data in output data storing means that stores the output data, and the output method includes, for the network devices: an output-request-information receiving step of receiving the output request information; an authentication information acquiring step of acquiring authentication information; an acquisition-source-information confirming step of confirming acquisition source information concerning an acquisition source of the output data; an output data authenticating and acquiring step of acquiring, when it is judged on the basis of the authentication information acquired in the authentication information acquiring step that a user is eligible to use the output data, the output data from the device using apparatus on the basis of the acquisition source information confirmed in the acquisition-source-information confirming step; and an output step of performing output on the basis of the output data acquired in the output data authenticating and acquiring step.

Consequently, an advantage equivalent to that of the output system in the form 52 is obtained.

[Form 89] An output method in a form 89 is an output method of connecting plural network devices, which perform output on the basis of output data, and a device using apparatus, which uses the network devices, so as to be capable of communicating with each other and of obtaining authentication to perform the output in the network devices, characterized in that the output method includes, for the device using apparatus: an output-request-information transmitting step of transmitting output request information to a representative network device serving as a representative among the plural network devices; and an output data providing step of providing the network devices with output data in output data storing means that stores the output data, the output method includes, for the representative network device: a first output-request-information receiving step of receiving the output request information; and an output-request-information transferring step of transmitting the output request information received in the first output-request-information receiving step to the network devices other than the representative network device, the output method includes, for the other network devices: a second output-request-information receiving step of receiving the output request information, and the output method includes, for the network devices: an authentication information acquiring step of acquiring authentication information; an acquisition-source-information confirming step of confirming acquisition source information concerning an acquisition source of the output data, an output data authenticating and acquiring step of acquiring, when it is judged on the basis of the authentication information acquired in the authentication information acquiring step that a user is eligible to use the output data, the output data from the device using apparatus on the basis of the acquisition source information confirmed in the acquisition-source-information confirming step; and an output step of performing output on the basis of the output data acquired in the output data authenticating and acquiring step.

Consequently, an advantage equivalent to that of the output system in the form 53 is obtained.

[Form 90] An output method in a form 90 is characterized in that, in the output method in any one of the forms 88 and 89, the authentication information includes the acquisition source information, and in the acquisition-source-information confirming step, the acquisition source information is acquired from the authentication information acquired in the authentication information acquiring step.

Consequently, an advantage equivalent to that of the output system in the form 54 is obtained.

[Form 91] An output method in a form 91 is characterized in that, in the output method in any one of the forms 81 to 88, an output request information relaying apparatus, which relays the output request information, is connected to the network devices to be capable of communicating with the network devices, in the output-request-information transmitting step, the output request information is transmitted to the output request information relaying apparatus, and the output method includes, for the output request information relaying apparatus: a second output-request-information receiving step of receiving the output request information; and an output-request-information transferring step of transmitting the output request information received in the second output-request-information receiving step to the plural network devices.

Consequently, an advantage equivalent to that of the output system in the form 55 is obtained.

[Form 92] An output method in a form 92 is characterized in that, in the output method in any one of the forms 83 to 89, an output request information relaying apparatus, which relays the output request information, is connected to the network devices to be capable of communicating with the network devices, in the output-request-information transmitting step, the output request information is transmitted to the output request information relaying apparatus, and the output method includes, for the output request information relaying apparatus: a second output-request-information receiving step of receiving the output request information; and a second output-request-information transferring step of transmitting the output request information received in the second output-request-information receiving step to the representative, network device.

Consequently, an advantage equivalent to that of the output system in the form 56 is obtained.

BRIEF DESCRIPTION OF THE DRAWINGS

FIG. 18 is a diagram showing a data structure of a deletion instruction.

BEST MODE FOR CARRYING OUT THE INVENTION

First Embodiment

Embodiments of the invention will be hereinafter explained with reference to the drawings. FIGS. 1 to 12 are diagrams showing a first embodiment of an output system, a network device, a device using apparatus, an output control program and an output request program, and an output method according to the invention.

Figure 1:
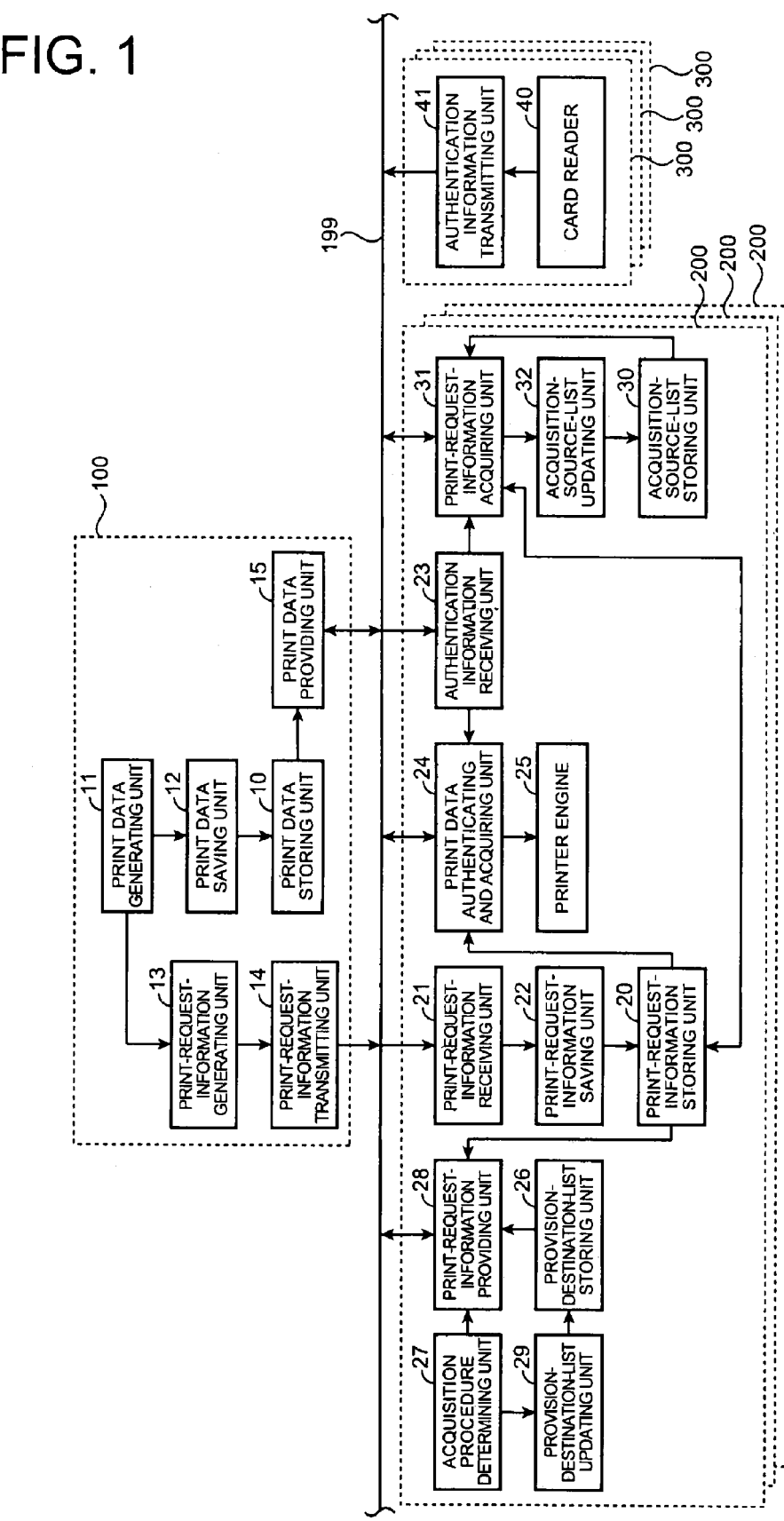
FIG. 1 is a functional block diagram showing schematic functions of a network system.

In this embodiment, the output system, the network device, the device using apparatus, the output control program and the output request program, and the output method according to the invention are applied to a case in which an authentication card is used to perform printing in a network printer 200 as shown in FIG. 1.

First, schematic functions of a network system to which the invention is applied will be explained with reference to FIG. 1.

FIG. 1 is a functional block diagram showing the schematic functions of the network system.

As shown in FIG. 1, a host terminal 100, plural network printers 200, and plural user authenticating apparatuses 300 corresponding to the respective network printers 200 are connected to a network 199. Note that, although only one host terminal 100 is shown in the figure to facilitate understanding of the invention, actually, a large number of host terminals 100 are connected to the network 199.

The host terminal 100 includes a print data storing unit 10, a print data generating unit 11 that generates print data, and a print data saving unit 12 that saves the print data generated by the print data generating unit 11 in the print data storing unit 10.

The host terminal 100 further includes a print-request-information generating unit 13 that generates print request information including address information of the host terminal 100 and user information in accordance with the generation of the print data, a print-request-information transmitting unit 14 that transmits the print request information generated by the print-request-information generating unit 13 to the network printers 200, and a print data providing unit 15 that provides the network printers 200 with print data in the print data storing unit 10 in response to an acquisition request.

The network printer 200 includes a print-request-information storing unit 20, a print-request-information receiving unit 21 that receives print request information, and a print-request-information saving unit 22 that saves the print request information received by the print-request-information receiving unit 21 in the print-request-information storing unit 20.

The network printer 200 further includes an authentication information receiving unit 23 that receives authentication information including user information together with a print request, a print data authenticating and acquiring unit 24 that acquires, when it is judged, on the basis of the authentication information received by the authentication information receiving unit 23 and the print request information in the print-request-information storing unit 20, that a user is eligible to use print data, the print data from the host terminal 100, and a printer engine 25 that performs printing on the basis of the print data acquired by the print data authenticating and acquiring unit 24.

The print data authenticating and acquiring unit 24 collates the user information included in the authentication information with the user information included in the print request information, when it is judged that the pieces of user information coincide with each other, judges that a user is eligible to use the print data, and acquires the print data on the basis of the address information included in the print request information.

The network printer 200 further includes a provision-destination-list storing unit 26 that stores a provision destination list in which provision destinations and acquisition procedures of print request information are registered, an acquisition procedure determining unit 27 that determines an acquisition procedure, a print-request-information providing unit 28 that provides the network printer 200 with the print request information in the print-request-information storing unit 20 in response to an acquisition request, and a provision-destination-list updating unit 29 that updates the acquisition procedures in the provision destination list on the basis of the acquisition procedure determined by the acquisition procedure determining unit 27.

When it is judged on the basis of the provision destination list that the network printer 200 that has requested acquisition of output data is registered as a provision destination, the print-request-information providing unit 2B provides print request information in accordance with an acquisition procedure corresponding to the provision destination. At this point, acquisition procedure information indicating the acquisition procedure determined by the acquisition procedure determining unit 27 is included in the print request information.

The network printer 200, further includes an acquisition-source-list storing unit 30 that stores an acquisition source list in which acquisition sources and acquisition procedures of print request information are registered, a print-request-information acquiring unit 31 that acquires print request information from the other network printers 200 in accordance with reception of authentication information, and an acquisition-source-list updating unit 32 that updates the acquisition procedures in the acquisition source list on the basis of acquisition procedure information included in the print request information acquired by the print-request-information acquiring unit 31.

When it is judged that print request information is not present in the print-request-information storing unit 20, the print-request-information acquiring unit 31 acquires print request information from the network printer 200, which is registered in the acquisition source list as an acquisition source, in accordance with an acquisition procedure corresponding to the acquisition source.

The user authenticating apparatus 300 is set near the network printer 200. The user authenticating apparatus 300 includes a card reader 40 that reads authentication information from an authentication card consisting of an IC card or the like and an authentication information transmitting unit 41 that transmits the authentication information read by the card reader 40 to the network printer 200 together with a print request.

A constitution of the host terminal 100 will be explained.

Figure 2:
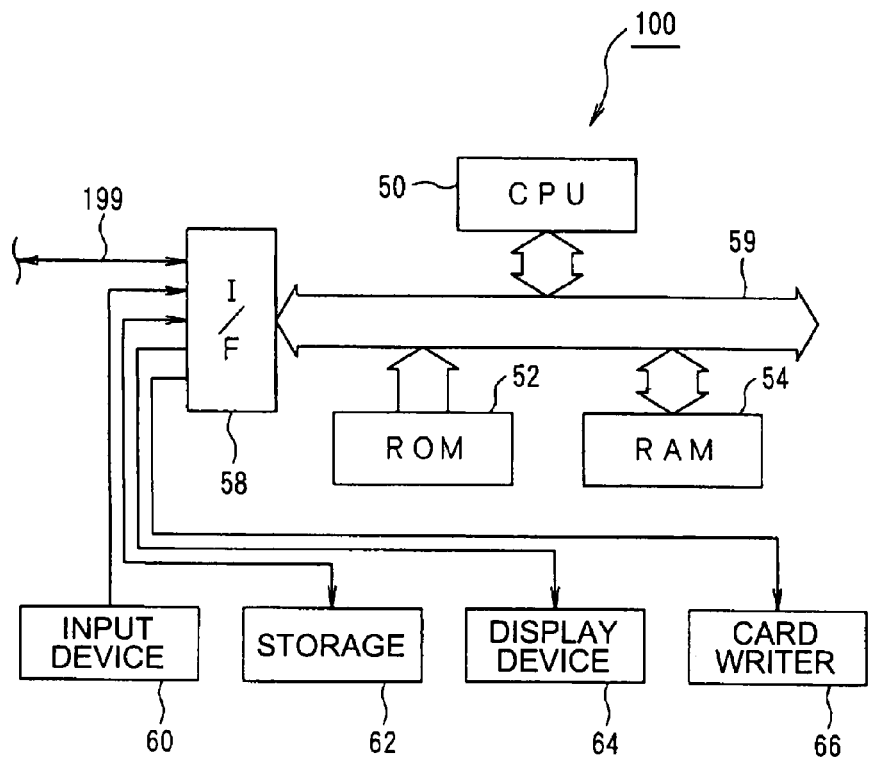
FIG. 2 is a block diagram showing a hardware configuration of a host terminal 100.

FIG. 2 is a block diagram showing a hardware configuration of the host terminal 100.

As shown in FIG. 2, the host terminal 100 includes a CPU 50 that controls arithmetic operations and the entire system on the basis of a control program, a ROM 52 that has the control program and the like of the CPU 50 stored in predetermined areas thereof in advance, a RAM 54 for storing data read out from the ROM 52 and the like and an arithmetic operation result required in an arithmetic operation process of the CPU 50, and an I/F 58 that mediates input of data from an external apparatus and output of data to the external apparatus. These units are connected to one another and to be capable of exchanging data via a bus 59 that is a data line for transferring data.

An input device 60 including a keyboard and a mouse capable of inputting data as a human interface, a storage 62 that stores data, tables, and the like as files, a display device 64 that displays a screen on the basis of an image signal, a card writer 66 that writes authentication information in an inserted authentication card, and a data line for connecting the host terminal 100 to the network 199 are connected to the I/F 58 as external devices.

The storage 62 constitutes the print data storing unit 10.

The CPU 50 consists of a micro-processing unit or the like. The CPU 50 starts predetermined programs stored in predetermined areas of the ROM 52 and executes print request information transmission processing and print data provision processing shown in the flowcharts in FIGS. 3 and 5, respectively, in a time division manner in accordance with the programs.

First, the print request information transmission processing will be explained in detail with reference to FIG. 3.

Figure 3:
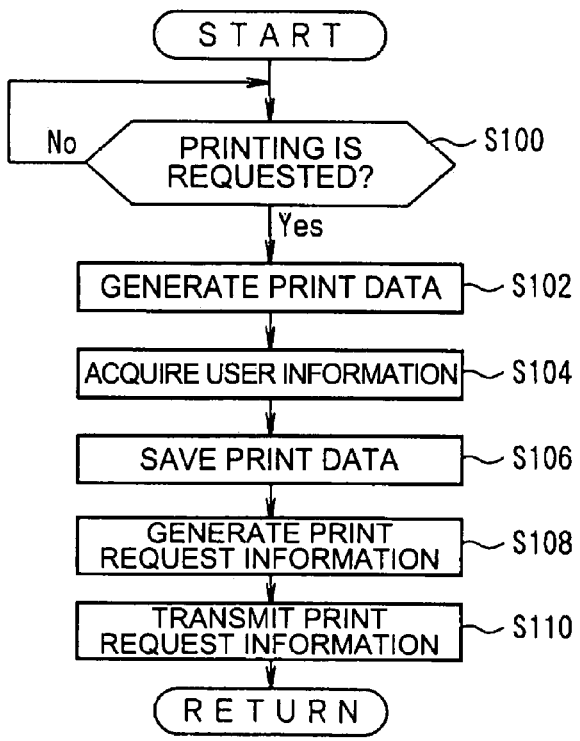
FIG. 3 is a flowchart showing print request information transmission processing.

FIG. 3 is a flowchart showing the print request information transmission processing.

The print request information transmission processing is processing for transmitting print request information to the network printer 200. When the print request information transmission processing is executed in the CPU 50, as shown in FIG. 3, first, the CPU 50 shifts to step S100.

In step S100, the CPU 50 judges whether printing is requested from a document composition application or the like. When it is judged that printing is requested (Yes), the CPU 50 shifts to step S102. When it is judged otherwise (No), the CPU 50 waits in step S100 until printing is requested.

In step S102, the CPU 50 generates print data. The CPU 50 shifts to step S104 and acquires user information of a user presently using the host terminal 100. The CPU 50 shifts to step S106 and saves the generated print data in the storage 62 in association with the user information acquired. Then, the CPU 50 shifts to step S108.

In step S108, the CPU 50 acquires an IP address of the host terminal 100 and generates print request information including the IP address acquired and the user information.

Figures 4, 5:
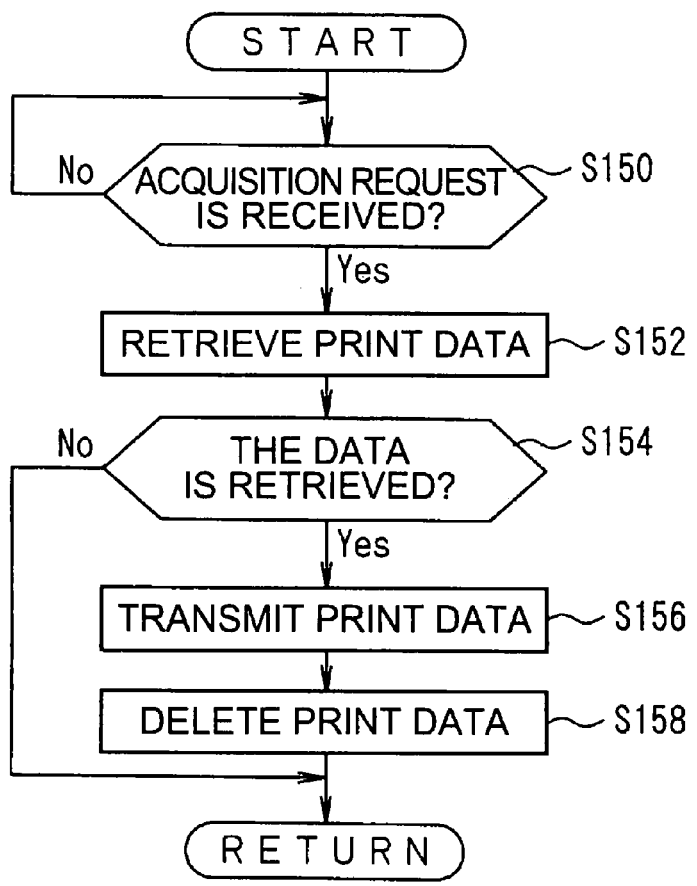
FIG. 4 is a diagram showing a data structure of print request information.
FIG. 5 is a flowchart showing print data provision processing.

FIG. 4 is a diagram showing a data structure of a print request information.

As shown in FIG. 4, the print request information includes a field 502 in which the user information is stored, a field 504 in which the IP address of the host terminal 100 is stored, a field 506 in which a printing date and time is stored, and a field 508 in which print setting is stored.

In the example in FIG. 4, "EPS" is registered as the user information and "192.168.1.5" is registered as the IP address. This indicates that user information of a user eligible to use the print data is "EPS" and an IP address of the host terminal 100 serving as an acquisition source of the print data is "192.168.1.5".

Subsequently, the CPU 50 shifts to step S110. The CPU 50 transmits the print request information generated to any one of the network printers 200 and ends the series of processing to return the processing to the original processing. As a transmission destination of the print request information, for example, a transmission destination selected out of the plural network printers 200 by the user, a transmission destination selected out of the plural network printers 200 on the basis of a communication load, a processing load, or the like, and a predefined network printer 200 set by a printer driver or the like are possible.

The print data provision processing will be explained in detail with reference to FIG. 5.

FIG. 5 is a flowchart showing the print data provision processing.

The print data provision processing is processing for providing the network printer 200 with print data in response to an acquisition request for the print data. When the print data provision processing is executed in the CPU 50, as shown in FIG. 5, first, the CPU 50 shifts to step S150.

In step S150, the CPU 50 judges whether an acquisition request for print data is received. When it is judged that an acquisition request is received (Yes), the CPU 50 shifts to step S152. When it is judged otherwise (No), the CPU 50 waits in step S150 until an acquisition request is received.

In step S152, the CPU 50 acquires user information from the acquisition request received and retrieves print data, which corresponds to user information identical with the user information acquired, from the storage 62. The CPU 50 shifts to step S154 and judges whether the print data is retrieved. When it is judged that a print data is retrieved (Yes), the CPU 50 shifts to step S156.

In step S156, the CPU 50 transmits the print data retrieved to the network printer 200 at a request source. The CPU 50 shifts to step S158, deletes the print data from the storage 62, and ends the series of processing to return the processing to the original processing.

On the other hand, when it is judged in step S154 that the print data is not retrieved (No), the CPU 50 ends the series of processing to return the processing to the original processing.

A constitution of the network printer 200 will be explained.

Figures 6, 7:
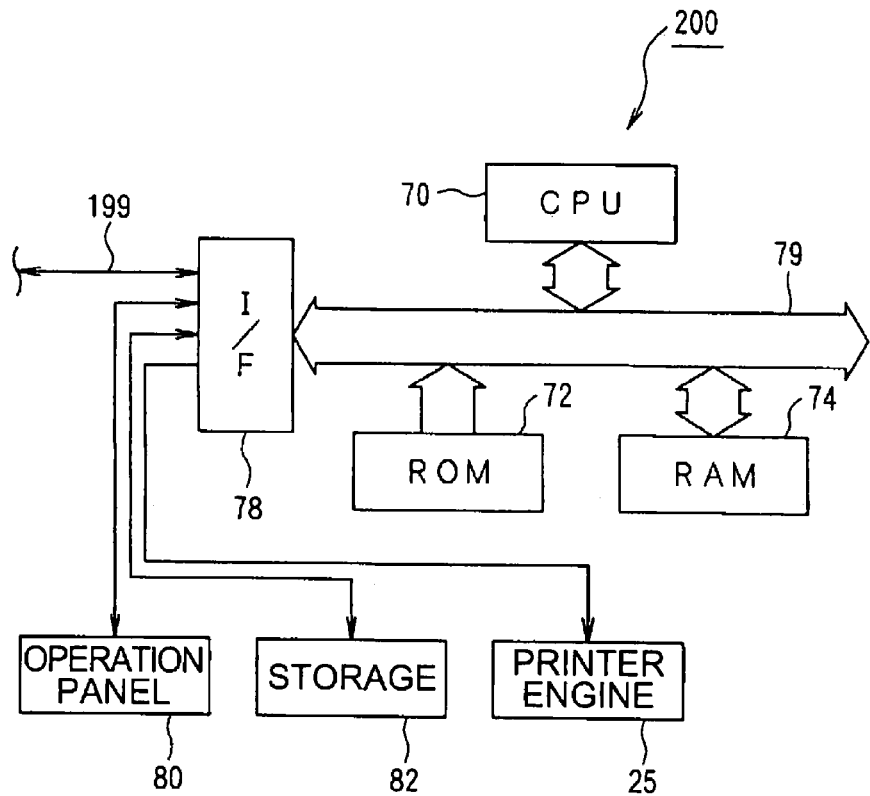
FIG. 6 is a block diagram showing a hardware configuration of a network printer 200.
FIG. 7 is a diagram showing a data structure of a provision destination list 400.

FIG. 6 is a block diagram showing a hardware configuration of the network printer 200.

As shown in FIG. 6, the network printer 200 includes a CPU 70 that controls arithmetic operations and the entire system on the basis of a control program, a ROM 72 that has the control program and the like of the CPU 70 stored in predetermined areas thereof in advance, a RAM 74 for storing data read out from the ROM 72 and the like and an arithmetic operation result required in an arithmetic operation process of the CPU 70, and an I/F 78 that mediates input of data from an external apparatus and output of data to the external apparatus. These units are connected to one another and to be capable of exchanging data via a bus 79 that is a data line for transferring data.

An operation panel 80 consisting of a touch panel or the like capable of inputting and displaying data as a human interface, a storage 82 that stores data, tables, and the like as files, a printer engine 25 including a print head, a head driving unit, and other mechanisms required for printing, and a data line for connecting the network printer 200 to the network 199 are connected to the I/F 78 as external devices.

The storage 82 constitutes the print-request-information storing unit 20, the provision-destination-list storing unit 26, and an acquisition-source-list storing unit 30.

FIG. 7 is a diagram showing a data structure of the provision destination list 400.

As shown in FIG. 7, one record is registered for each provision destination of print request information in the provision destination list 400. Each record includes a field 402 in which a name of the network printer 200 is registered, a field 404 in which an IP address of the network printer 200 is registered, a field 406 in which a port number of TCP/IP (Transmission Control Protocol/Internet Protocol) used for communication with the network printer 200 is registered, and a field 408 in which an encryption key to be used for encryption of print request information is registered.

In an example in FIG. 7, "PRINTER_A" is registered as the printer name, "192.168.1.11" is registered as the IP address, "19053" is registered as the port number, and "A_TYPE" is registered as an encryption key in a record on a first stage. This indicates that, when an acquisition request for print request information is sent from the network printer 200 with the printer name "PRINTER_A" and the IP address "192.168.1.11" to the port "19053", the print request information is encrypted with the encryption key "A_TYPE" and provided to the network printer 200. In other words, only the network printer 200 registered in the provision destination list 400 can acquire the print request information. Even the registered network printer 200 cannot acquire the print request information unless a designated port number and a corresponding decryption key are unknown.

Figures 8, 9:
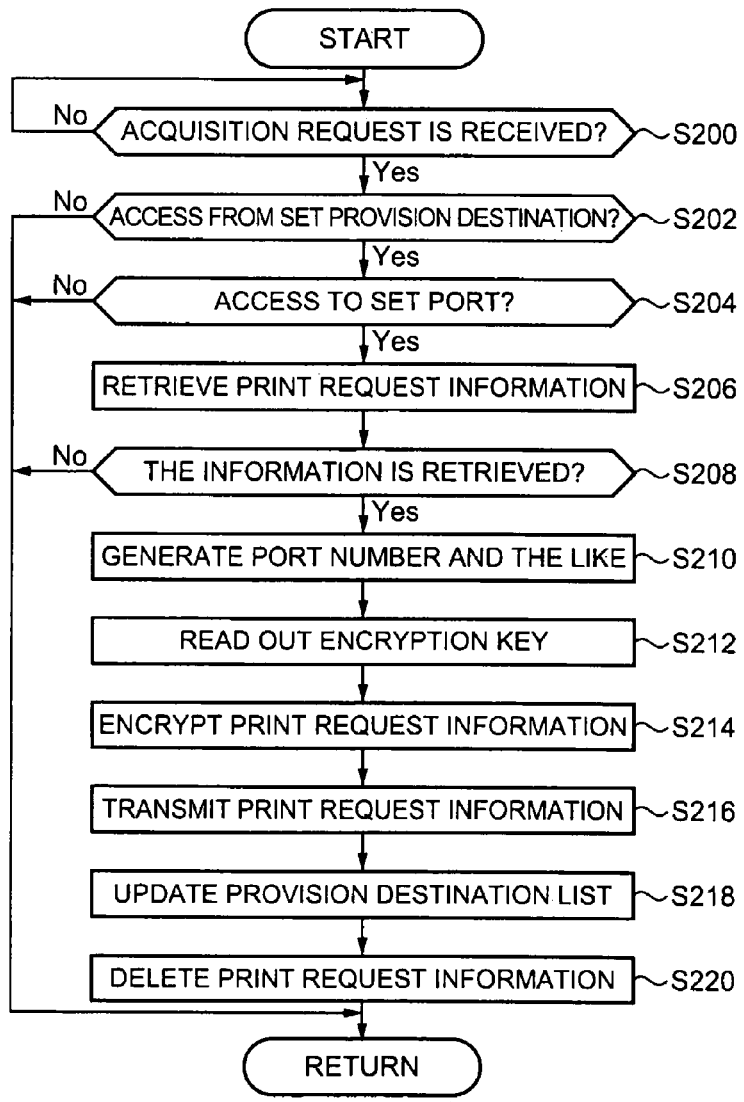
FIG. 8 is a diagram showing a data structure of an acquisition source list 420.
FIG. 9 is a flowchart showing print request information provision processing.

FIG. 8 is a diagram showing a data structure of the acquisition source list 420.

As shown in FIG. 8, one record is registered for each acquisition source of print request information in the acquisition source list 420. Each record includes a field 422 in which a name of the network printer 200 is registered, a field 424 in which an IP address of the network printer 200 is registered, a field 426 in which a port number of TCP/IP used for communication with the network printer 200 is registered, and a field 428 in which a decryption key to be used for decryption of the print request information is registered.

In an example in FIG. 8, "PRINTER_A" is registered as the printer name, "192.168.1.11" is registered as the IP address, "19053" is registered as the port number, and "A_TYPE" is registered as the decryption key in a record on a first stage. This indicates that it is possible to acquire print request information from the network printer 200 with the printer name "PRINTER_A" and the IP address "192.168.1.11" through the port "19053" and the print request information acquired is decrypted with the decryption key "A_TYPE".

Referring back to FIG. 6, the CPU 70 consists of a microprocessing unit or the like. The CPU 70 starts predetermined programs stored in predetermined areas of the ROM 72 and executes print request information provision processing, print request reception processing, and print control processing shown in the flowcharts in FIGS. 9, 10, and 11, respectively, in a time division manner in accordance with the programs.

First, the print request information provision processing will be explained in detail with reference to FIG. 9.

FIG. 9 is a flowchart showing the print request information provision processing.

The print request information provision processing is processing for providing the network printer 200 with print request information in response to an acquisition request for print request information. When the print request information provision processing is executed in the CPU 70, as shown in FIG. 9, first, the CPU 70 shifts to step S200.

In step S200, the CPU 70 judges whether an acquisition request for print request information is received. When it is judged that an acquisition request is received (Yes), the CPU 70 shifts to step S202. When it is judged otherwise (No), the CPU 70 waits in step S200 until an acquisition request is received.

In step S202, the CPU 70 judges on the basis of the provision destination list 400 whether a request source of the acquisition request received is a set provision destination (which refers to the network printer 200 with any one of printer names and any one of IP addresses registered in the provision destination list 400; the same applies to the following description). When it is judged that the request source of the received acquisition request is the set provision destination (Yes), the CPU 70 shifts to step S204.

In step S204, the CPU 70 judges on the basis of the provision source list 400 whether the received acquisition request is an access to a set port (which refers to a port of a port number corresponding to the set provision destination judged in step S202 among port numbers registered in the provision destination list 400; the same applies to the following description). When it is judged that the acquisition request is an access to the set port (Yes), the CPU 70 shifts to step S206.

In step S206, the CPU 70 acquires user information from the received acquisition request and retrieves print request information, which includes user information identical with the user information acquired, from the storage 82. The CPU 70 shifts to step 208 and judges whether the print request information is retrieved. When it is judged that print request information is retrieved (Yes), the CPU 70 shifts to step S210.

In step S210, the CPU 70 generates a port number, an encryption key, and a decryption key to be used in the next communication. The CPU 70 shifts to step S212 and reads out an encryption key corresponding to the network printer 200 at a request source from the provision destination list 400. Then, the CPU 70 shifts to step S214.

In step S214, the CPU 70 includes acquisition procedure information, which indicates the port number and the decryption key generated, in the print request information retrieved and encrypts the print request information with the encryption key read out. The CPU 70 shifts to step S216 and transmits the print request information encrypted to the network printer 200 at the request source. Then, the CPU 70 shifts to step S218.

In step S218, the CPU 70 updates a port number and an encryption key corresponding to the network printer 200 at the request source among port numbers and encryption keys registered in the provision destination list 400 on the basis of the port number and the encryption key generated. The CPU 70 shifts to step S220, deletes the print request information from the storage 82, and ends the series of processing to return the processing to the original processing.

On the other hand, when it is judged in step S208 that the print request information is not retrieved (No), when it is judged in step S204 that the received acquisition request is not an access to the set port (No), or when it is judged in step S202 that a request source of the received acquisition request is not the set provision destination (No), the CPU 70 ends the series of processing to return the processing to the original processing.

The print request information reception processing will be explained in detail with reference to FIG. 10.

Figure 10:
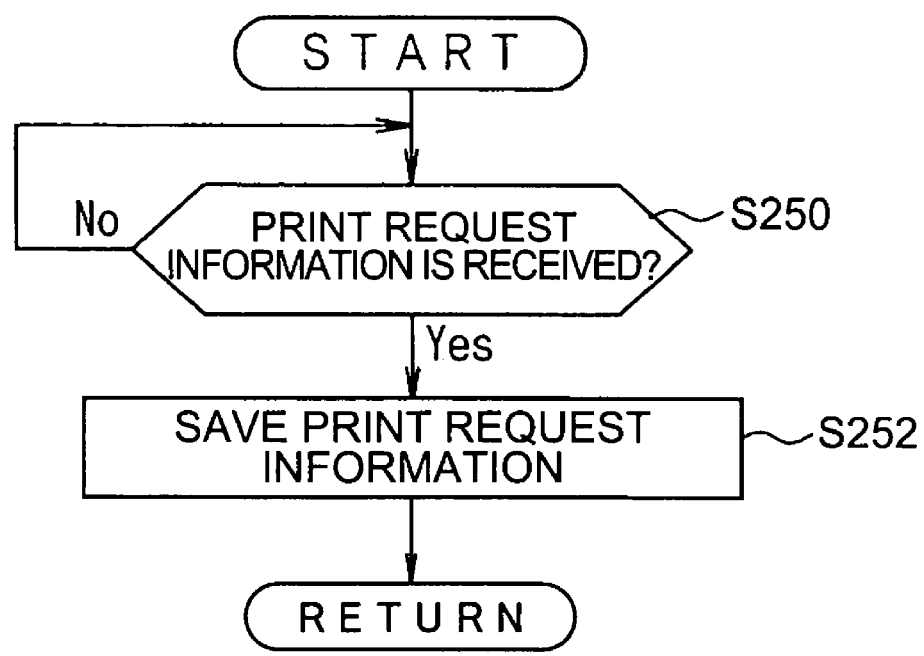
FIG. 10 is a flowchart showing print request information reception processing.

FIG. 10 is a flowchart showing the print request information reception processing.

The print request information reception processing is processing for receiving print request information from the host terminal 100. When the print request information reception processing is executed in the CPU 70, as shown in FIG. 10, first, the CPU 70 shifts to step S250.

In step S250, the CPU 70 judges whether print request information is received. When it is judged that print request information is received (Yes), the CPU 70 shifts to step S252, saves the received print request information in the storage 82, and ends the series of processing to return the processing to the original processing.

On the other hand, when it is judged in step S250 that print request information is not received (No), the CPU 70 waits in step S250 until print request information is received.

The print control processing will be explained in detail with reference to FIG. 11.

Figure 11:
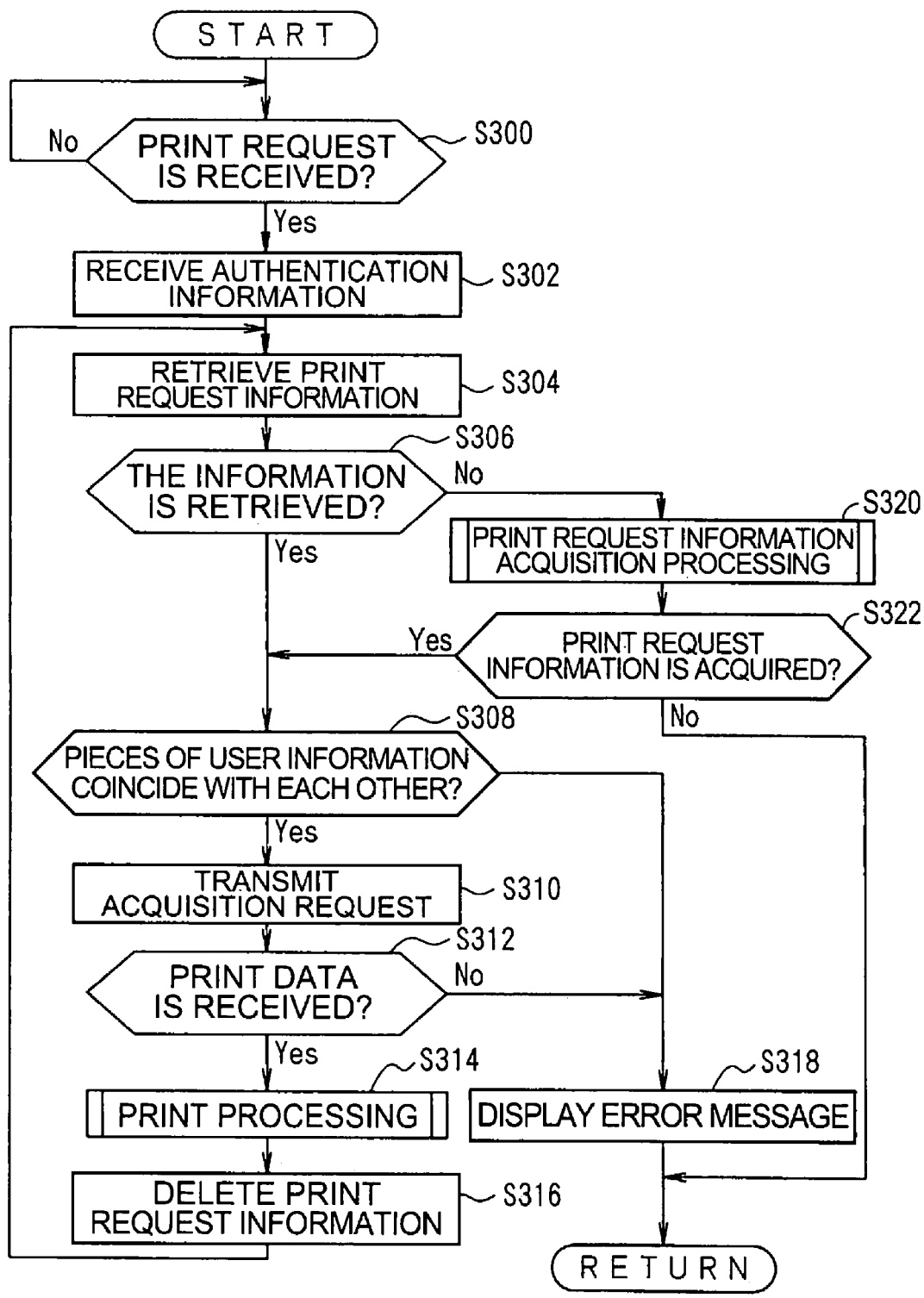
FIG. 11 is a flowchart showing print control processing.

FIG. 11 is a flowchart showing print control processing.

The print control processing is processing for performing printing in response to a print request from the user authenticating apparatus 300. When the print control processing is executed in the CPU 70, as shown in FIG. 11, first; the CPU 70 shifts to step S300.

In step S300, the CPU 70 judges whether a print request is received. When it is judged that a print request is received (Yes), the CPU 70 shifts to step S302. When it is judged otherwise (No), the CPU 70 waits in step S300 until a print request is received.

In step S302, the CPU 70 receives authentication information including user information. The CPU 70 shifts to step S304, acquires the user information from the authentication information received, and retrieves print request information, which includes user information identical with the user information acquired, from the storage 82. The CPU 70 shifts to step S306 and judges whether the print request information is retrieved. When it is judged that the print request information is retrieved (Yes), the CPU 70 shifts to step S308.

In step S308, the CPU 70 acquires the user information from the print request information retrieved and judges whether the user information acquired and the user information acquired in step S304 coincide with each other. When it is judged that the pieces of user information coincide with each other (Yes), the CPU 70 shifts to step S310.

In step S310, the CPU 70 acquires an IP address from the retrieved print request information and transmits an acquisition request for print data including the user information acquired in step S304 to the host terminal 100 on the basis of the IP address acquired. Then, the CPU 70 shifts to step S312.

In step S312, the CPU 70 judges whether print data is received. When it is judged that print data is received (Yes), the CPU 70 shifts to step S314 and performs printing with the printer engine 25 on the basis of the print data received. The CPU 70 shifts to step S316 and deletes the print request information from the storage 82. Then, the CPU 70 shifts to step S304.

On the other hand, when it is judged in step S312 that print data is not received within a predetermined time (No) or when it is judged in step S308 that the pieces of user information do not coincide with each other (No), the CPU 70 shifts to step S318, displays an error message on the operation panel 80, and ends the series of processing to return the processing to the original processing.

On the other hand, when it is judged in step S306 that the print request information is not retrieved (No), the CPU 70 shifts to step S320 and executes the print request information acquisition processing for acquiring print request information from the other network printers 200. The CPU 70 shifts to step S322 and judges whether print request information could be acquired. When it is judged that print request information could be acquired (Yes), the CPU 70 shifts to step S308.

On the other hand, when it is judged in step S322 that print request information cannot be acquired (No), the CPU 70 ends the series of processing to return the processing to the original processing.

The print request information acquisition processing in step S320 will be explained in detail with reference to FIG. 12.

Figure 12:
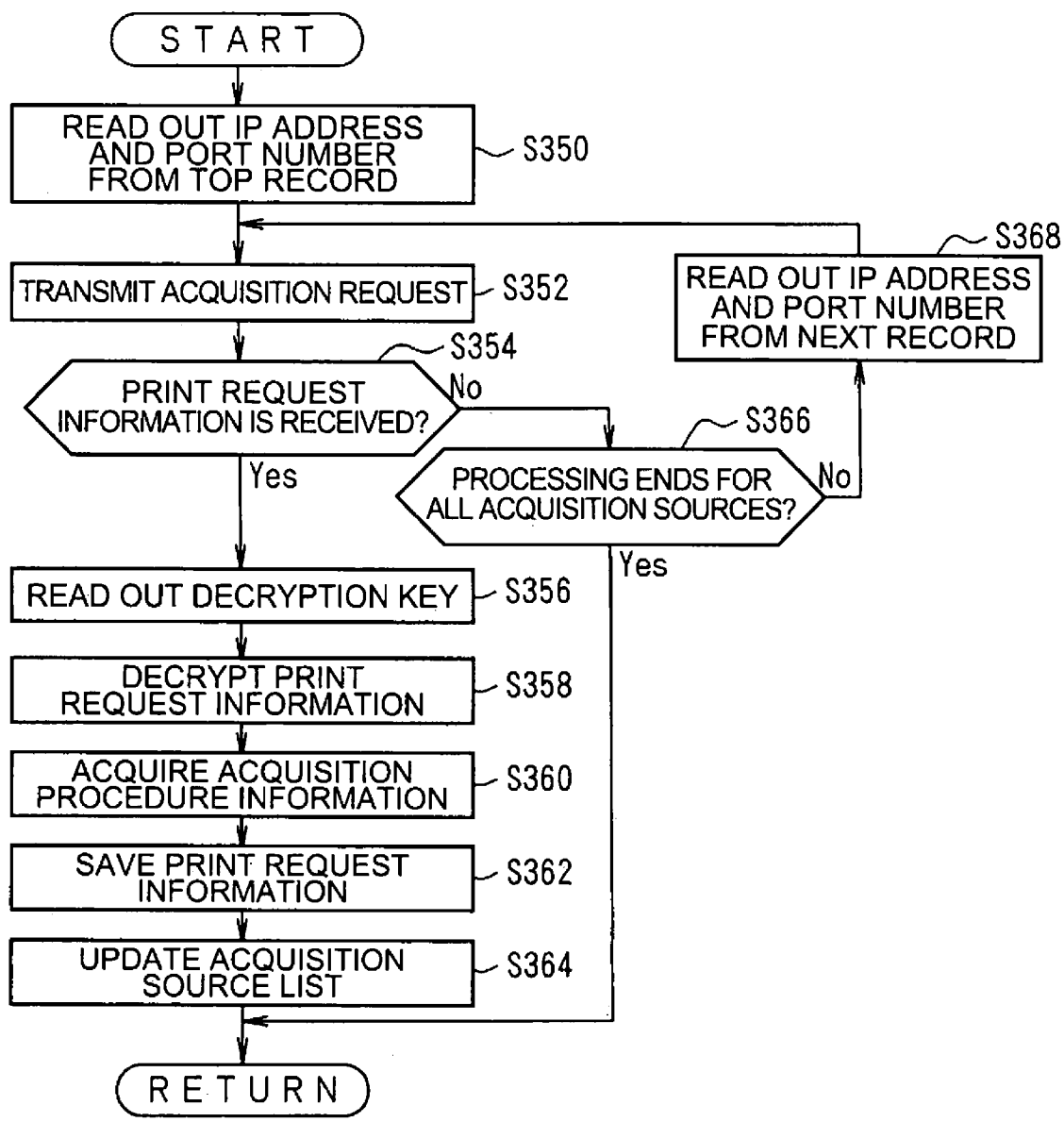
FIG. 12 is a flowchart showing print request information provision processing.

FIG. 12 is a flowchart showing the print request information provision processing.

When the print request information provision processing is executed in step S320, as shown in FIG. 12, first, the CPU 70 shifts to step S350.

In step S350, the CPU 70 reads out an IP address and a port number from a top record of the acquisition source list 420. Then, the CPU 70 shifts to step S352.

In step S352, the CPU 70 transmits an acquisition request for print request information, which includes the user information acquired in step S304, to the other network printers 200 on the basis of the IP address and the port number read out. Specifically, the CPU 70 transmits the acquisition request for the print request information to the network printer 200 with the read-out IP address via a port of the read-out port number.

Subsequently, the CPU 70 shifts to step S354 and judges whether print request information is received. When it is judged that print request information is received (Yes), the CPU 70 shifts to step S356. The CPU 70 reads out a decryption key corresponding to the network printer 200 at an acquisition source from the acquisition source list 420. The CPU 70 shifts to step S358 and decrypts the print request information received with the decryption key read out. Then, the CPU 70 shifts to step S360.

In step S360, the CPU 70 acquires acquisition procedure information from print request information obtained by decrypting the received print request information. The CPU 70 shifts to step S362 and saves the print request information obtained by decrypting the received print request information (parts other than the acquisition procedure information) in the storage 82. Then, the CPU 70 shifts to step S364.

In step S364, the CPU 70 updates a port number and a decryption key corresponding to the network printer 200 at the acquisition source among port numbers and decryption keys registered in the acquisition source list 420 on the basis of the acquisition procedure information acquired and ends the series of processing to return the processing to the original processing.

On the other hand, when it is judged in step S354 that print request information is not received (No), the CPU 70 shifts to step S366 and judges whether the processing in steps S352 and S354 has ended for all the acquisition sources in the acquisition source list 420. When it is judged that the processing has not ended for all the acquisition sources (No), the CPU 70 shifts to step S368 and reads out an IP address and a port number from the next record of the acquisition source list 420. Then, the CPU 70 shifts to step S352.

On the other hand, when it is judged in step S366 that the processing in steps S352 and S354 has ended for all the acquisition sources in the acquisition source list 420 (Yes), the CPU 70 ends the series of processing to return the processing to the original processing.

Operations in this embodiment will be explained.

A user uses a document composition application or the like to request printing in the host terminal 100.

In the host terminal 100, when printing is requested, print data is generated through steps S102 to S106. User information of the user presently using the host terminal 100 is acquired. The print data generated is saved in the storage 62 in association with the user information. Print request information including an IP address of the host terminal 100 and the user information is generated through steps S108 and S110. The print request information generated is transmitted to any one of the network printers 200 (hereinafter referred to as network printer A).

In the network printer A, when the print request information is received, the print request information received is saved in the storage 82 through step S252.

Subsequently, in the host terminal 100, the user inserts an authentication card into the card writer 66 and writes authentication information in the authentication card with the card writer 66. Note that the authentication information may be written in the authentication card in advance. In this case, the card writer 66 does not have to be provided in the host terminal 100.

Printing in two cases will be hereinafter explained. In one case, printing is performed by the network printer A. In the other case, printing is performed in any one of the network printers 200 other than the network printer A (hereinafter referred to as network printer B).

First, the case in which printing is performed by the network printer A will be explained.

When the user wishes to perform printing in the network printer A, the user proceeds to the network printer A and inserts the authentication card into the card reader 40 of the user authenticating apparatus 300 near the network printer A.

In the user authenticating apparatus 300, when the authentication card is inserted into the card reader 40, the authentication information is read from the authentication card by the card reader 40. The authentication information read is transmitted to the network printer A by the authentication information transmitting unit 41 together with a print request.

In the network printer A, when the authentication information is received together with the print request, through step S304, user information is acquired from the authentication information received, and print request information including user information identical with the user information acquired is retrieved from the storage 82. At this point, since the print request information is saved in the storage 82, the print request information is retrieved. It is judged through step S308 whether the user information included in the print request information retrieved and the user information included in the received authentication information coincide with each other. As a result, when it is judged that the pieces of user information coincide with each other, through step S310, an acquisition request including the user information is transmitted to the host terminal 100 on the basis of an IP address included in the retrieved print request information.

In the host terminal 100, when the acquisition request is received, through step S152, the user information is acquired from the acquisition request received and print data corresponding to user information identical with the user information acquired is retrieved from the storage 62. At this point, since the print data is saved in the storage 62, the print data is retrieved. The print data retrieved is transmitted to the network printer A and deleted through steps S156 and S158.

In the network printer A, when the print data is received, through steps S314 and S316, printing is performed on the basis of the print data received and the print request information is deleted. Note that, when an identical user issues plural print requests, the processing in steps S304 to S316 is executed repeatedly until the print request information is no longer retrieved.

The case in which printing is performed by the network printer B will be explained. Note that it is assumed that the network printer B is registered in the provision destination list 400 of the network printer A and the network printer A is registered in the acquisition source list 420 of the network printer B.

When the user wishes to perform printing with the network printer B rather than the network printer A, the user proceeds to the network printer B and inserts the authentication card into the card reader 40 of the user authenticating apparatus 300 near the network printer B.

In the user authenticating apparatus 300, when the authentication card is inserted into the card readers 40, the authentication information is read from the authentication card by the card reader 40. The authentication information read is transmitted to the network printer B by the authentication information transmitting unit 41 together with a print request.

In the network printer B, when the authentication information is received together with the print request, through step S304, user information is acquired from the authentication information received, and print request information including user information identical with the user information acquired is retrieved from the storage 82. At this point, since the print request information is not saved in the storage 82, through steps S350 to S354, S366, and S368, an IP address and a port number of the network printer A are repeatedly read out from the acquisition source list 420. An acquisition request including the user information is transmitted to the network printer A on the basis of the IP address and the port number read out.

In the network printer A, when the acquisition request is received, since the network printer B is registered in the provision destination list 400, through step, S202, it is judged that the acquisition request is an access from a set provision destination. Since the access from the network printer B is based on a registered content in the acquisition source list 420, through step S204, it is judged that the access is an access to a set port. Through step S206, the user information is acquired from the acquisition request received and print request information including user information identical with the user information acquired is retrieved from the storage 82. At this point, since the print request information is saved in the storage 82, through steps S210 to S216, a port number and the like to be used in the next communication are generated, an encryption key corresponding to the network printer B is read out from the provision destination list 400, and print request information including acquisition procedure information is encrypted by the encryption key read out and transmitted to the network printer B. Through steps S218 and S220, the port numbers and the encryption keys in the provision destination list 400 are updated on the basis of the port number and the like generated and the print request information is deleted.

In the network printer B, when the print request information is received, through steps S356 and S358, a decryption key corresponding to the network printer A is read out from the acquisition source list 420 and the print request information is decrypted by the decryption key read out. Through steps S360 to S364, print request information obtained by decrypting the print request information is saved in the storage 82 and the port numbers and the decryption keys in the acquisition source list 420 are updated on the basis of acquisition procedure information included in, the print request information.

In the network printer B, when the print request information is acquired, through step S308, it is judged whether the user information included in the print request information acquired and the user information included in the authentication information received coincide with each other. As a result, when it is judged that the pieces of user information coincide with each other, through step S310, an acquisition request including the user information is transmitted to the host terminal 100 on the basis of an IP address included in the acquired print request information.

In the host terminal 100, when the acquisition request is received, through step S152, the user information is acquired from the acquisition request received print data corresponding to user information identical with the user information acquired is retrieved from the storage 62. At this point, since the print data is saved in the storage 62, the print data is retrieved. Through steps S156 and S158, the print data retrieved is transmitted to the network printer B and deleted.

In the network printer B, when the print data is received, through steps S314 and S316, printing is performed on the basis of the print data received and the print request information is deleted. Note that, when an identical user issues plural print requests, the processing in steps S304 to S316, S320, and S322 is executed repeatedly until print request information can no longer be acquired.

Note that, when the user uses an authentication card having illegal authentication information recorded therein, in the network printers A and B, an error message is displayed through step S318.

When the print data cannot be received because of a communication failure or other causes, in the network printers A and B, an error message is displayed through step S318.

When an acquisition request is transmitted to a port other than the set port because of illegal access or the like, in the network printer A, the access is rejected.

In this way, in this embodiment, the host terminal 100 transmits print request information including an IP address to the network printer 200. The host terminal 100 also provides the network printer 200 with print data in the storage 62 in response to an acquisition request. When the print request information is received, the network printer 200 saves the received print request information in the storage 82. When authentication information is received together with a print request, the network printer 200 judges eligibility for using the print data on the basis of the authentication information received. When it is judged that a user is eligible to use the print data, the network printer 200 acquires print data from the host terminal 100 on the basis of the IP address included in the print request information and performs printing on the basis of the print data acquired. When print request information is not present in the storage 82, the network printer 200 acquires print request information from the other network printers 200 and provides the network printer 200 with print request information in the storage 82 in response to an acquisition request.

This makes it possible to perform printing in an arbitrary network printer 200 even after the print request information is transmitted from the host terminal 100. Thus, it is possible to improve a degree of freedom of changing the network printer 200 serving as a print destination.

The network printer 200 can acquire print data on the basis of the IP address included in the print request information. Thus, it is possible to accumulate the print data in an arbitrary host terminal 100 rather than a specific acquisition source such as a printer server. Therefore, since the printer server or the like does not have to be provided, it is possible to simplify a system configuration compared with that in the past. In addition, since print data does not concentrate on a specific apparatus, it is possible to reduce the likelihood that printing is not performed compared with that in the past.

In this embodiment, the host terminal 100 transmits print request information including an IP address and user information to the network printer 200. When authentication information including user information is received together with a print request, the network printer 200 collates the user information included in the authentication information received with the user information included in the print request information. When it is judged that the pieces of user information coincide with each other, the network printer 200 judges that a user is eligible to use print data.

Consequently, since authentication is performed on the basis of the user information included in the print request information, it is possible to vary authentication information for each user. Therefore, it is possible to improve security.

In this embodiment, the network printer 200 acquires print request information from the network printer 200 registered in the acquisition source list 420 as an acquisition source.

This makes it possible to reduce an amount of traffic on a network compared with a constitution in which print request information is acquired by searching through the network printer 200 with broadcast or multicast.

In this embodiment, the network printer 200 acquires print request information on the basis of the acquisition source list 420 in accordance with an acquisition procedure corresponding to the network printer 200 to be an acquisition source. The network printer 200 provides the print request information on the basis of the provision destination list 400 in accordance with an acquisition procedure corresponding to the network printer 200 that has requested acquisition of output data.

Consequently, the network printer 200 cannot acquire the print request information unless the network printer 200 complies with a predetermined acquisition procedure. Thus, it is possible to reduce the likelihood that the print request information is stolen from the network printer 200 because of illegal access or the like. Therefore, it is possible to further improve security.

In this embodiment, the network printer 200 determines an acquisition procedure, provides print request information including acquisition procedure information indicating the acquisition procedure determined, updates an acquisition procedure for the provision destination list 400 on the basis of the acquisition procedure determined, and updates an acquisition procedure for the acquisition source list 420 on the basis of the acquisition procedure information included in the print request information acquired.

Consequently, the acquisition procedure is changed every time the print request information is acquired. Thus, it is possible to further reduce the likelihood that the print request information is stolen from the network printer 200 because of illegal access or the like. Therefore, it is possible to further improve security.

In this embodiment, the network printer 200 provides, when it is judged that the network printer 200 that has requested acquisition of output data is registered in the provision destination list 400 as a provision destination, the network printer 200 that has requested acquisition of output data with print request information.

Consequently, in the network printer 200, the print request information is provided only to the network printers 200 registered in the provision destination list 400. Thus, it is possible to reduce the likelihood that the print request information is stolen from the network printer 200 because of illegal access or the like. Therefore, it is possible to further improve security.

In the first embodiment, the host terminal 100 corresponds to the device using apparatus in the form 1, 2, 9, 10, 15, 16, 21, 23, 24, 29, 30, 37 or 38. The print data storing unit 10 and the storage 62 correspond to the output data storing means in the form 1, 21, 35, or 37. The print-request-information transmitting unit 14, the I/F 58, and the step S110 correspond to the output-request-information transmitting means in the form 1 or 21. The step S110 corresponds to the output-request-information transmitting step in the form 35 or 37. The print data providing unit 15, the I/F 58, and the steps S150 to S156 correspond to the output data providing means in the form 1 or 21.

In the first embodiment, the steps S150 to S156 correspond to the output data providing step in the form 35 or 37. The network printer 200 corresponds to the first network device in the form 1, 3 to 6, 37, or 39 to 41, the second network device in the form 1, 3, 5, 6, 37, 41, or 42, or the network device in the form 1, 9 to 13, 15 to 19, 21, 27, 29, 31, 32, 35, or 37. The print-request-information storing unit 20 and the storage 82 correspond to the output-request-information storing means in the form 1, 2, 9, 10, 23, 24, 37, or 38. The print-request-information receiving unit 21, the I/F 78, and the step S250 correspond to the output-request-information receiving means in the form 1 or 9.

In the first embodiment, the step S250 corresponds to the output-request-information receiving step in the form 23 or 37. The print-request-information saving unit 22 and the step S252 correspond to the output-request-information saving means in the form 1 or 9. The step S252 corresponds to the output-request-information saving step in the form 23 or 37. The authentication information receiving unit 23, the I/F 78, and the step S302 correspond to the first authentication information acquiring means in the form 1 or 2, the second authentication information acquiring means in the form 1 or 2, or the authentication information acquiring means in the form 9, 10, 15, or 16. The step S302 corresponds to the first authentication information acquiring step in the form 37 or 38, the second authentication information acquiring step in the form 37 or 38, or the authentication information acquiring step in the form 23, 24, 29, or 30.

In the first embodiment, the print data authenticating and acquiring unit 24, the I/F 78, and the steps S304 to S312 correspond to the first output data authenticating and acquiring means in the form 1 or 2, the second output data authenticating and acquiring means in the form 1 or 2, or the output data authenticating and acquiring means in the form 9, 10, 15, or 16. The steps S304 to S312 correspond to the first output data authenticating and acquiring step in the form 37 or 38, the second output data authenticating and acquiring step in the form 37 or 38, or the output data authenticating or acquiring step in the form 23, 24, 29, or 30.

In the first embodiment, the printer engine 25 and the step S314 correspond to the first output means in the form 1, the second output means in the form 1, or the output means in the form 9 or 15. The step S314 corresponds to the first output step in the form 37, the second output step in the form 37, or the output step in the form 23 or 29. The provision-destination-list storing unit 26 and the storage 82 correspond to the acquisition-procedure-information storing means in the form 5, 12, 26, or 41 or the provision-destination-information storing means in the form 6 or 13. The acquisition procedure determining unit 27 and the step S210 correspond to the acquisition procedure determining means in the form 5 or 12.

In the first embodiment, the step S210 corresponds to the acquisition procedure determining step in the form 26 or 41. The print-request-information providing unit 28, the I/F 78, and the steps S200 to S208 and, S212 to S216 correspond to the output-request-information providing means in the form 1, 4 to 6, 9, or 11 to 13. The steps S200 to S208 and S212 to S216 correspond to the output-request-information providing step in the form 23, 25 to 27, 37, or 40 to 42. The provision-destination-list updating unit 29 and the step S218 correspond to the acquisition-procedure-information updating means in the form 5 or 12.

In the first embodiment, the step S218 corresponds to the acquisition-procedure-information updating step in the form 26 or 41. The acquisition-source-list storing unit 30 and the storage 82 correspond to the acquisition source information storing means in the form 3 or 17. The print-request-information acquiring unit 31, the I/F 78, and the steps S350 to S360, S366, and S368 correspond to the output-request-information acquiring means in the forms 1 to 5 or 15 to 19. The steps S350 to S360, S366, and S368 correspond to the output-request-information acquiring, step in the forms 29 to 33 or 37 to 41. The acquisition-source-list updating unit 32 and the step S364 correspond to the acquisition-source-information updating means in the form 5 or 19. The step S364 corresponds to the acquisition-source-information updating step in the form 33 or 41.

In the first embodiment, the print data corresponds to the output data in the form 1, 2, 9, 10, 15, 16, 21, 23, 24, 29, 30, 35, 37, or 38. The IP address corresponds to the acquisition source information in the form 1, 3 to 5, 9, 15, 17 to 19, 21, 23, 29, 31 to 33, 35, 37, or 39 to 41. The print request information corresponds to the output request information in the forms 1 to 6, 9 to 13, 15 to 19, 21, 23 to 27, 29 to 33, 35, or 37 to 42. The user information corresponds to the identification information in the form 2, 10, 16, 24, 30, or 38.

Second Embodiment

A second embodiment of the invention will be explained with reference to the drawings. FIGS. 19 to 32 are diagrams showing the second embodiment of the output system, the network device, the device using apparatus, the output control program and the output request program, and the output method according to the invention.

Figure 19:
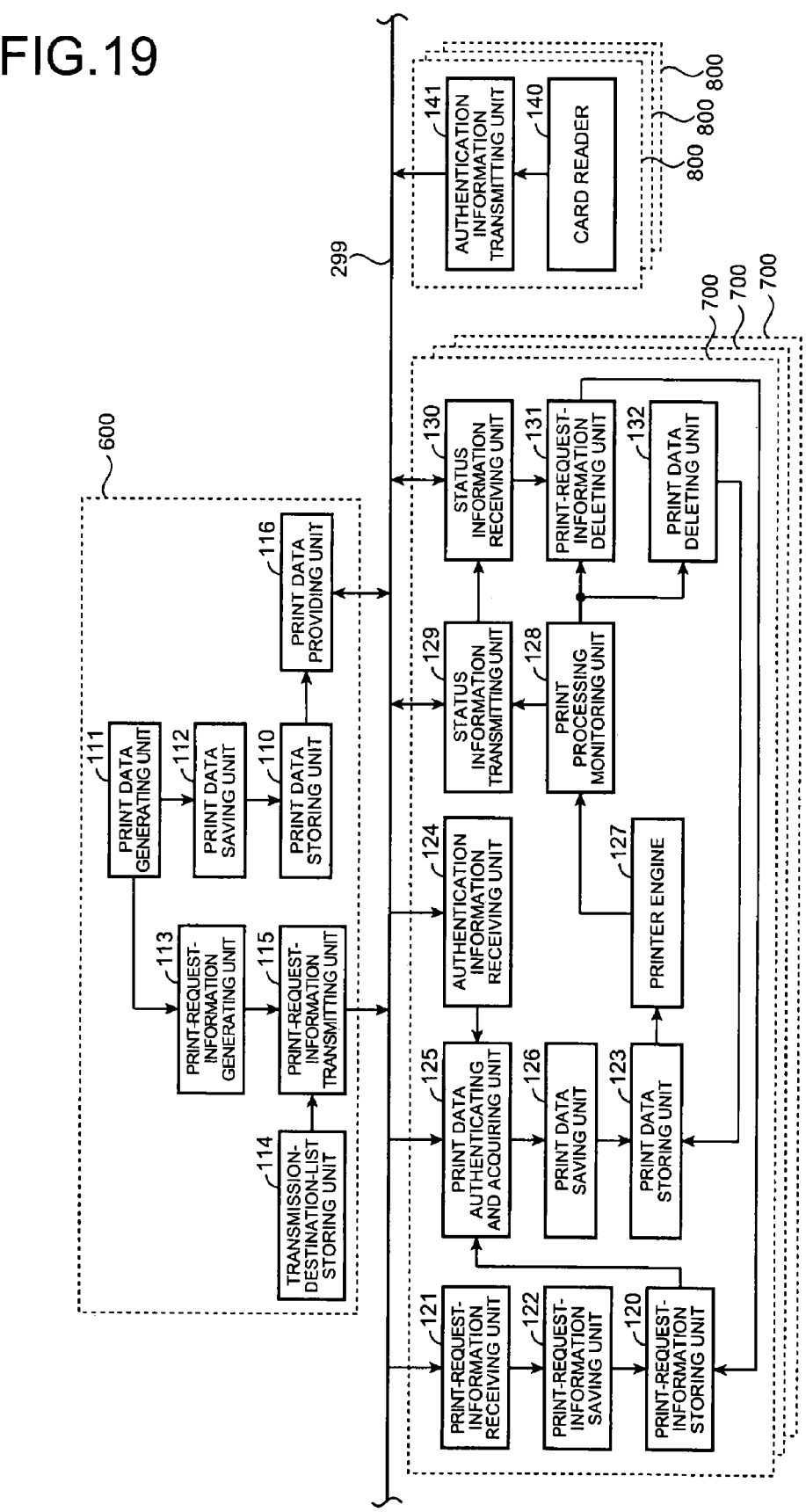
FIG. 19 is a functional block diagram showing schematic functions of a network system.

In this embodiment, the output system, the network device, the device using apparatus, the output control program and the output request program, and the output method are applied to the case in which printing is performed by the network printer 700 using an authentication card as shown in FIG. 19.

Schematic functions of a network system to which the invention is applied will be explained with reference to FIG. 19.

FIG. 19 is a functional block diagram showing the schematic functions of the network system.

As shown in FIG. 1, a host terminal 600, plural network printers 700, and plural user authenticating apparatuses 800 corresponding to the respective network printers 700 are connected to a network 299. Note that, although only one host terminal 600 is shown in the figure to facilitate understanding of the invention, actually, a large number of host terminals 600 are connected to the network 299.

The host terminal 600 includes a print data storing unit 110, a print data generating unit 111 that generates print data, and a print data saving unit 112 that saves the print data generated by the print data generating unit 111 in the print data storing unit 110.

The host terminal 600 further includes a print-request-information generating unit 113 that generates print request information including address information of the host terminal 600 and user information in accordance with the generation of the print data, a transmission-destination-list storing unit 114 that stores a transmission destination list in which a transmission destination of the print request information is registered, and a print-request-information transmitting unit 115 that transmits the print request information generated by the print-request-information generating unit 113 to the network printers 700 that are registered in the transmission destination list as transmission destinations.

The host terminal 600 further includes a print data providing unit 116 that provides the network printer 700 with the print data in the print data storing unit 110 in response to an acquisition request.

The network printer 700 includes a print-request-information storing unit 120, a print-request-information receiving unit 121 that receives print request information, and a print-request-information saving unit 122 that saves the print request information received by the print-request-information receiving unit 121 in the print-request-information storing unit 120.

The network printer 700 further includes a print data storing unit 123, an authentication information receiving unit 124 that receives authentication information including user information together with a print request, a print data authenticating and acquiring unit 125 that acquires, when it is judged, on the basis of the authentication information received by the authentication information receiving unit 124 and the print request information in the print-request-information storing unit 120, that a user is eligible to use print data, the print data from the host terminal 600, a print data saving unit 126 that saves the print data acquired by the print data authenticating and acquiring unit 125 in the print data storing unit 123, and a printer engine 127 that performs printing on the basis of the print data in the print data storing unit 123.

The print data authenticating and acquiring unit 125 collates the user information included in the authentication information with the user information included in the print request information, when it is judged that the pieces of user information coincide with each other, judges that a user is eligible to use the print data, and acquires the print data on the basis of the address information included in the print request information.

The network printer 700 further includes a print processing monitoring unit 128 that monitors a progress state of print processing of the network printer 700 on the basis of a control state of the printer engine 127, a status information transmitting unit 129 that transmits status information indicating the progress state of the print processing of the network printer 700 to the other network printers 700 on the basis of the control state of the printer engine 127, a status information receiving unit 130 that receives status information, a print-request-information deleting unit 131 that deletes print request information, and a print data deleting unit 132 that deletes print data.

The print-request-information deleting unit 131 deletes, when it is judged, on the basis of the status information received by the status information receiving unit 130 and a result of the monitoring by the print processing monitoring unit 128, that print processing is completed in any one of the network printers 700 including the network printer 700, print request information corresponding to the print processing from the print-request-information storing unit 120.

The print data deleting unit 132 deletes, when it is judged on the basis of a result of the monitoring by the print processing monitoring unit 128 that print processing for one page is completed, a part, for which the print processing is completed, of print data corresponding to the print processing in the print data storing unit 123.

The user authenticating apparatus 800 is set near the network printer 700. The user authenticating apparatus 800 includes a card reader 140 that reads authentication information from an authentication card consisting of an IC card or the like and an authentication information transmitting unit 141 that transmits the authentication information read by the card reader 140 to the network printer 700 together with a print request.

A constitution of the host terminal 600 will be explained.

Figures 20, 21:
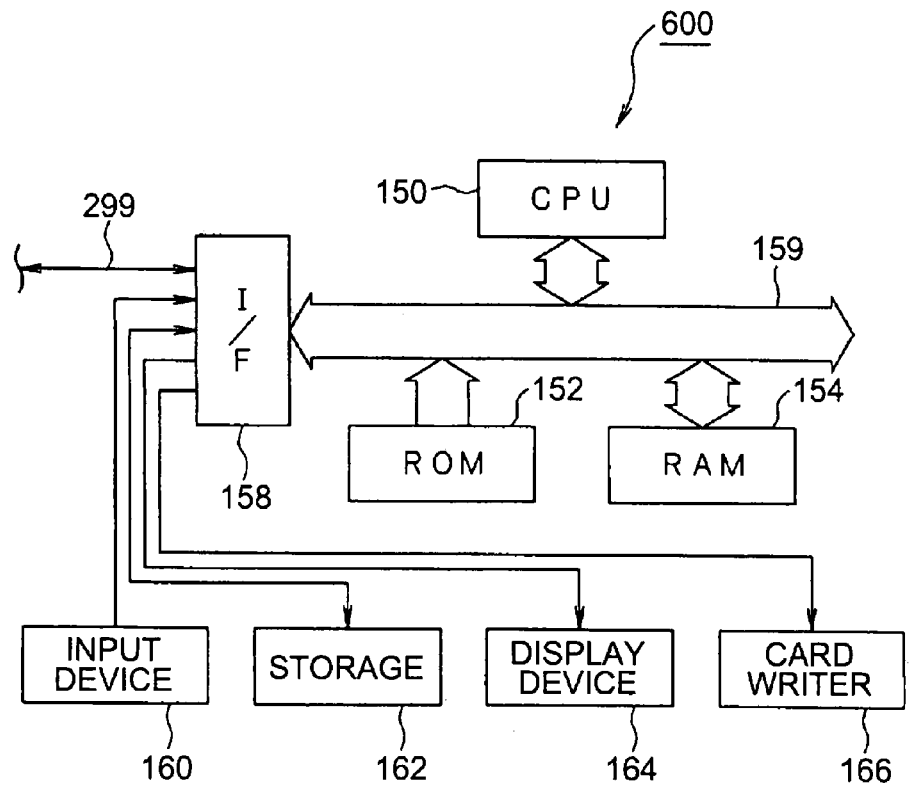
FIG. 20 is a block diagram showing a hardware configuration of a host terminal 600.
FIG. 21 is a diagram showing a data structure of a transmission destination list 410.

FIG. 20 is a block diagram showing a hardware configuration of the host terminal 600.

As shown in FIG. 20, the host terminal 600 includes a CPU 150 that controls arithmetic operations and the entire system on the basis of a control program, a ROM 152 that has the control program and the like of the CPU 150 stored in predetermined areas thereof in advance, a RAN 154 for storing data read out from the ROM 152 and the like and an arithmetic operation result required in an arithmetic operation process of the CPU 150, and an I/F 158 that mediates input of data from an external apparatus and output of data to the external apparatus. These units are connected to one another and to be capable of exchanging data via a bus 159 that is a data line for transferring data.

An input device 160 including a keyboard and a mouse capable of inputting data as a human interface, a storage 162 that stores data, tables, and the like as files, a display device 164 that displays a screen on the basis of an image signal, a card writer 166 that writes authentication, information in an inserted authentication card, and a data line for connecting the host terminal 600 to the network 299 are connected to the I/F 158 as external devices.

The storage 162 constitutes the print data storing unit 110 and the transmission-destination-list storing unit 114.

FIG. 21 is a diagram showing a data structure of the transmission destination list 410.

As shown in FIG. 21, one record is registered for each transmission destination of print request information in the transmission destination list 410. Each record includes a field 412 in which a name of the network printer 700 is registered and a field 414 in which an IP address of the network printer 700 is registered.

In an example in FIG. 21, "PRINTER_A" is registered as the printer name, "192.168.1.201" is registered as the IP address. This indicates that print request information is transmitted to the network printer 700 with the printer name "PRINTER_A" and the IP address "192.168.1.201".

The storage 162 stores the print job management table 430 that manages a print job.

Figures 22, 23:
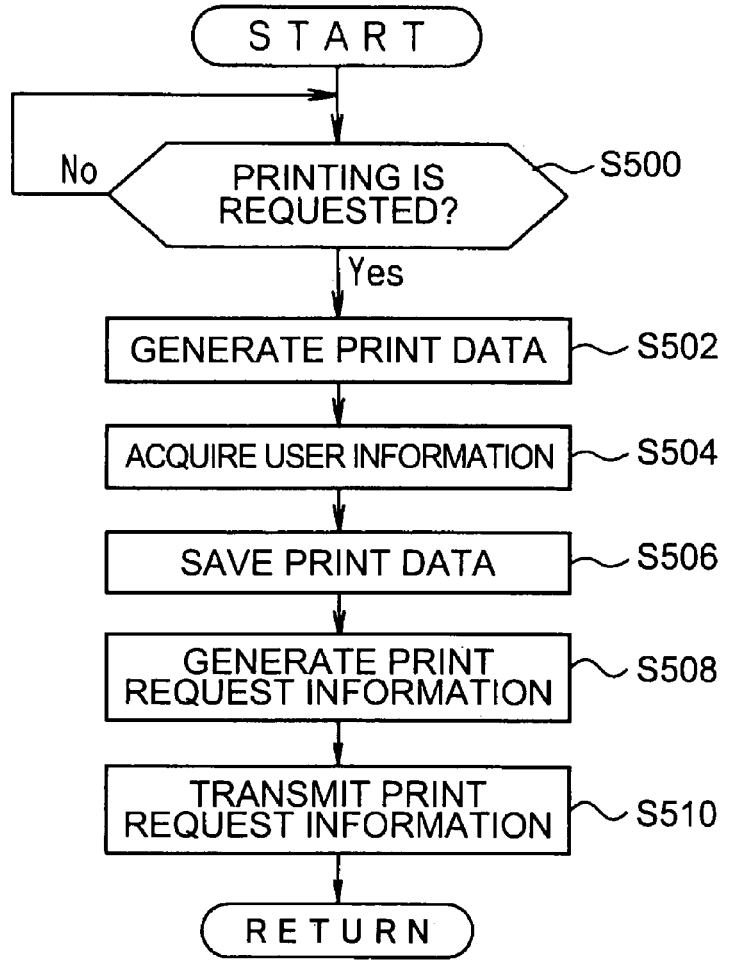
FIG. 22 is a diagram showing a data structure of a print job management table 430.
FIG. 23 is a flowchart showing print request information transmission processing.

FIG. 22 is a diagram showing a data structure of the print job management table 430.

As shown in FIG. 22, one record is registered for each print job in the print job management table 430. Each record includes a field 432 in which a job ID allocated to a print job is registered, a field 434 in which user information is registered, a field 436 in which the number of pages for which print processing is completed is registered, and a field 438 in which a progress state of print processing is registered.

In an examples in FIG. 22, "000016" is registered as the job ID, "BBB" is registered as the user information, "0/2" is registered as the number of processed pages, and "printing" is registered as the progress state in a record on a first stage. This indicates that the print job 000016 (which refers to a print job to which the job ID "000016" is allocated; the same abbreviation is used in the following description) is a job, printing of which a user with the user information "BBB" requests, and print processing is performed in any one of the network printers 700 presently. This also indicates that the print data related to the print job 000016 is constituted by two pages in total and print processing is not completed for none of the pages. As the progress state, there is "standby" other than "printing". "Standby" indicates a state in which print processing for a print job is put on standby until authentication information is received by the network printer 700.

Referring back to FIG. 20, the CPU 150 consists of a micro-processing unit or the like. The CPU 50 starts predetermined programs stored in predetermined areas of the ROM 152 and executes print request information transmission processing, print data provision processing, and status information reception processing shown in the flowcharts in FIGS. 23, 25, and 26, respectively, in a time division manner in accordance with the programs.

First, the print request information transmission processing will be explained in detail with reference to FIG. 23.

FIG. 23 is a flowchart showing the print request information transmission processing.

The print request information transmission processing is processing for transmitting print request information to the network printer 700. When the print request information transmission processing is executed in the CPU 150, as shown in FIG. 23, first, the CPU 150 shifts to step S500.

In step S500, the CPU 150 judges whether printing is requested from a document composition application or the like. When it is judged that printing is requested (Yes), the CPU 150 shifts to step S502. When it is judged otherwise (No), the CPU 150 waits in step S500 until printing is requested.

In step S502, the CPU 150 issues a job ID and generates print data. The CPU 150 shifts to step S504 and acquires user information of a user presently using the host terminal 600. The CPU 150 shifts to step S506.

The CPU 150 saves the generated print data in the storage 162 in association with the job ID issued. The CPU 150 registers a new record including the issued job ID and the user information acquired in the print job management table 430. At this point, the CPU 150 sets the number of processed pages as "0" and sets the progress state as "standby".

Subsequently, the CPU 150 shifts to step S508, acquires an IP address of the host terminal 600, and generates print request information including the issued job ID, the acquired user information, and the IP address acquired.

Figures 24, 25:
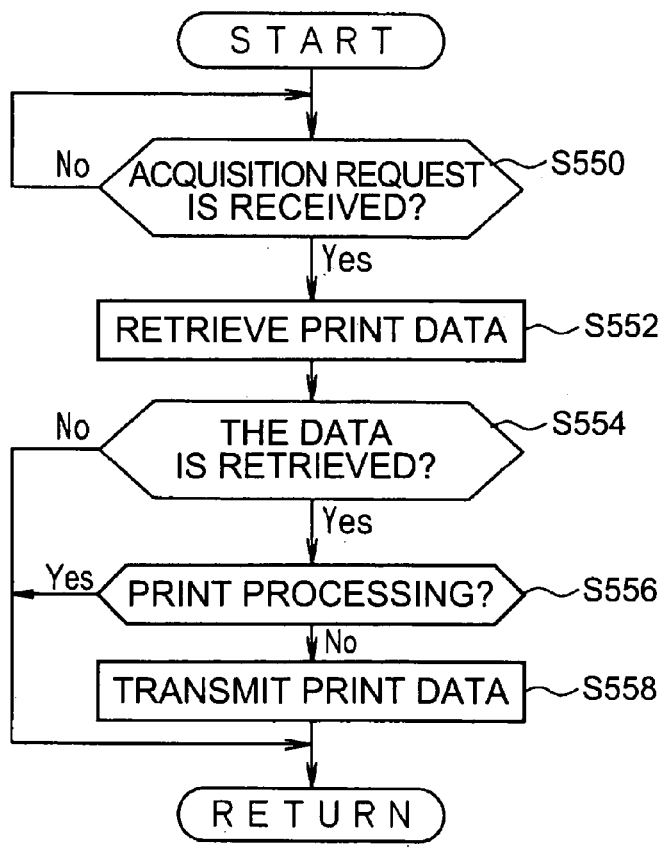
FIG. 24 is a diagram showing a data structure of print request information.
FIG. 25 is a flowchart showing print data provision processing.

FIG. 24 is a diagram showing a data structure of print request information.

As shown in FIG. 24, the print request information includes a field 512 in which the job ID is stored, a field 514 in which the user information is stored, a field 516 in which the IP address of the host terminal 600 is stored, a field 518 in which a printing date and time is stored, and a field 520 in which print setting is stored.

In an example in FIG. 24, "000016" is registered as the job is "BBB" is registered as the user information, "192.168.1.12" is registered as the IP address. This indicates that user information of a user eligible to use print data related to the print job 000016 is "BBB" and the IP address of the host terminal 600 to be an acquisition source of the print data is "192.168.1.12".

The CPU 150 shifts to step S510, refers to the transmission destination list 410, transmits the print request information generated to a set transmission destination (which refers to the network printer 700 with the printer name and the IP address registered in the transmission destination list 410; the same applies to the following description), and ends the series of processing to return the processing to the original processing.

The print data provision processing will be explained in detail with reference to FIG. 25.

FIG. 25 is a flowchart showing the print data provision processing.

The print data provision processing is processing for providing the network printer 700 with print data in response to an acquisition request for the print data. When the print data provision processing is executed in the CPU 150, as shown in FIG. 25, first, the CPU 150 shifts to step S550.

In step S550, the CPU 150 judges whether an acquisition request for print data is received. When it is judged that an acquisition request is received (Yes), the CPU 150 shifts to step S552. When it is judged otherwise (No), the CPU 150 waits in step S550 until an acquisition request is received.

In step S552, the CPU 150 acquires a job ID from the acquisition request received, refers to the print job management table 430, and retrieves print data corresponding to a job ID identical with the acquired job ID from the storage 162. The CPU 150 shifts to step S554 and judges whether the print data is retrieved. When it is judged that the print data is retrieved (Yes), the CPU 150 shifts to step S556.

In step S556, the CPU 150 refers to the print job management table 430 and judges whether a progress state of print processing for a print job with the acquired job ID is "printing". When it is judged that the progress state is not "printing" (No), the CPU 150 shifts to step S558, transmits the print data retrieved to the network printer 700 at a request source, and ends the series of processing to return the processing to the original processing.

On the other hand, when it is judged in step S556 that the progress state is "printing" (Yes) or when it is judged in step S554 that the print data is not retrieved (No), the CPU 150 ends the series of processing to return the processing to the original processing.

The status information reception processing will be explained in detail with reference to FIG. 26.

Figure 26:
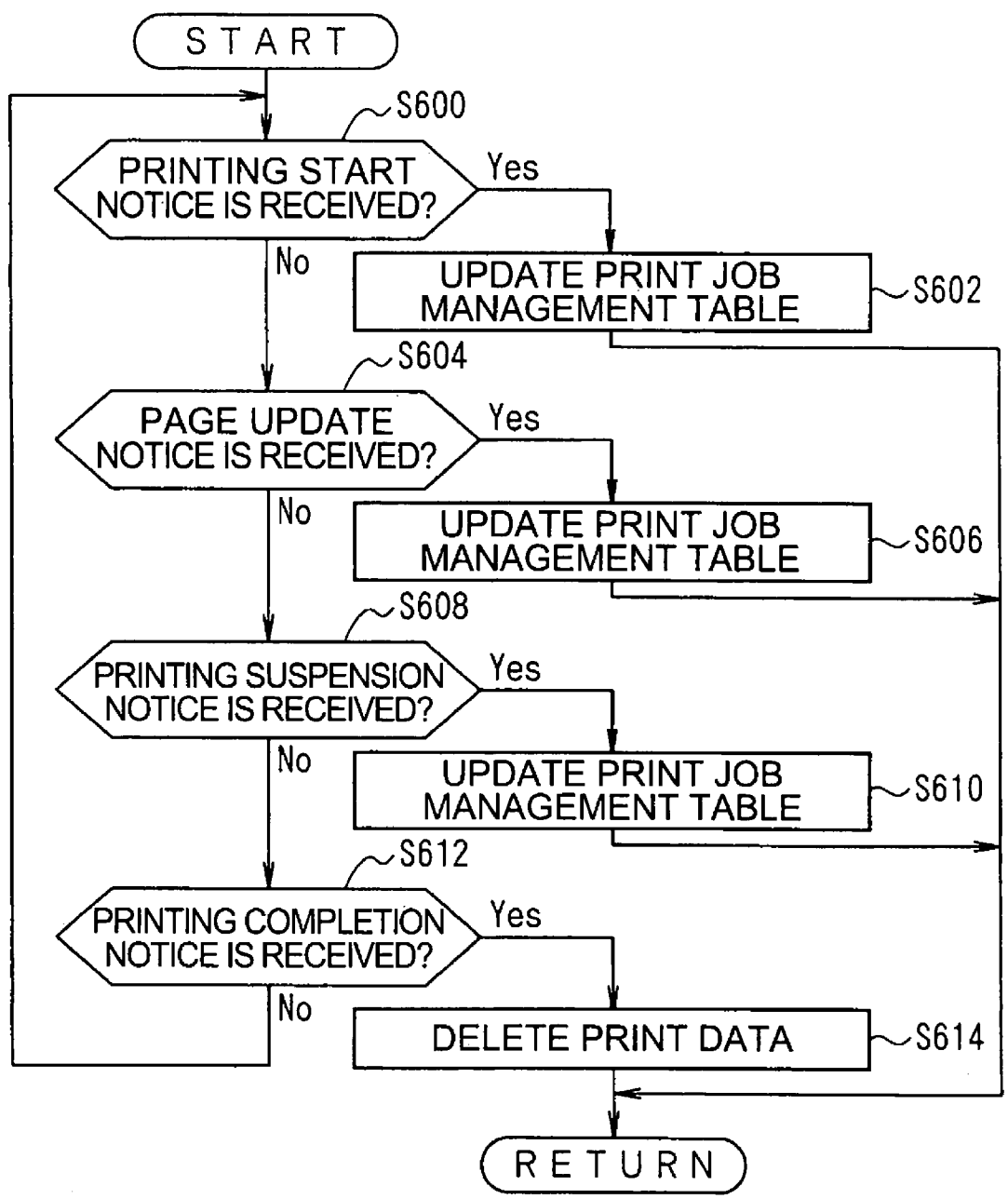
FIG. 26 is a flowchart showing status information reception processing.

FIG. 26 is a flowchart showing the status information reception processing.

The status information reception processing is processing for receiving status information from the network printer 700. When the status information reception processing is executed in the CPU 150, as shown in FIG. 26, first, the CPU 150 shifts to step S600.

In step S600, the CPU 150 judges whether a printing start notice, which indicates that print processing is started in the network printer 700, is received. When it is judged that a printing, start notice is received (Yes), the CPU 150 shifts to step S602 and acquires a job ID from the printing start notice received. The CPU 150 changes a progress state of a record corresponding to the job ID acquired to "printing" in the print job management table 430 and ends the series of processing to return the processing to the original processing.

On the other hand, when it is judged in step S600 that a printing start notice is not received (No), the CPU 150 shifts to step S604 and judges whether a page update notice, which indicates that print processing for one page is completed in the network printer 700, is received. When it is judged that a page update notice is received (Yes), the CPU 150 shifts to step S606.

In step S606, the CPU 150 acquires a job ID from the page update notice received. The CPU 150 increments the number of processed pages of a record corresponding to the job ID acquired by "1" in the print job management table 430 and ends the series of processing to return the processing to the original processing.

On the other hand, when it is judged in step S604 that a page update notice is not received (No), the CPU 150 shifts to step S608. The CPU 150 judges whether a printing suspension notice, which indicates that print processing is suspended in the network printer 700, is received. When it is judged that a printing suspension notice is received (Yes), the CPU 150 shifts to step S610.

In step S610, the CPU 150 acquires a job ID from the printing suspension notice received, changes a progress state of a record corresponding to the job ID acquired to "standby" in the print job management table 430, and ends the series of processing to return the processing to the original processing.

On the other hand, when it is judged in step S608 that the printing suspension notice is not received (No), the CPU shifts to step S612, judges whether a printing completion notice, which indicates that print processing is completed in the network printer 700, is received. When it judged that a printing completion notice is received (Yes), the CPU 150 shifts to step S614.

In step S614, the CPU 150 acquires a job ID from the printing completion notice received and deletes print data, which corresponds to the job ID acquired, from the storage 162. In addition, the CPU 150 deletes a record corresponding to the acquired job ID from the print job management table 430 and ends the series of processing to return the processing to the original processing.

On the other hand, when it is judged in step S612 that the printing completion notice is not received (No), the CPU 150 shifts to step S600.

A constitution of the network printer 700 will be explained.

Figures 27, 28:
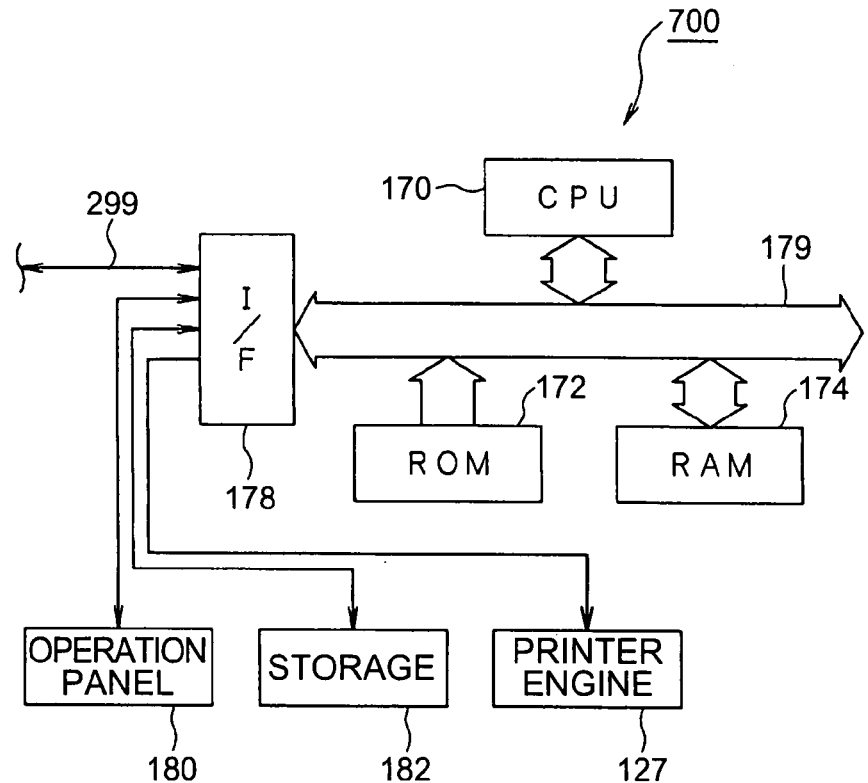
FIG. 27 is a block diagram showing a hardware configuration of a network printer 700.
FIG. 28 is a diagram showing a data structure of a print job management table 440.

FIG. 27 is a block diagram showing a hardware configuration of the network printer 700.

As shown in FIG. 27, the network printer 700 includes a CPU 170 that controls arithmetic operations and the entire system on the basis of a control program, a ROM 172 that has the control program and the like of the CPU 170 stored in predetermined areas thereof in advance, a RAM 174 for storing data read out from the ROM 172 and the like and an arithmetic operation result required in an arithmetic operation process of the CPU 170, and an I/F 178 that mediates input of data from an external apparatus and output of data to the external apparatus. These units are connected to one another and to be capable of exchanging data via a bus 179 that is a data line for transferring data.

An operation panel 180 consisting of a touch panel or the like capable of inputting and displaying data as a human interface, a storage 182 that stores data, tables, and the like as files, a printer engine 127 including a print head, a head driving unit, and other mechanisms required for printing, and a data line for connecting the network printer 700 to the network 299 are connected to the I/F 178 as external devices.

The storage 182 constitutes the print-request-information, storing unit 120 and the print data storing unit 123 and stores the print job management table 440 that manages print jobs.

FIG. 28 is a diagram showing a data structure of the print job management table 440.

As shown in FIG. 28, one record is registered for each print job in the print job management table 440. Each record includes a field 442 in which a job ID is registered, a field 444 in which an IP address of the host terminal 600 is registered, a field 446 in which user information is registered, a field 448 in which the number of pages for which print processing is completed is registered, and a field 450 in which a progress state of print processing is registered.

In an example in FIG. 28, "000016" is registered as the job ID, "192.168.1.12" is registered as the IP address, "BBB" is registered as the user information, "0/2" is registered as the number of processed pages, and "printing" is registered as the progress state in a record on a second stage. This indicates that, in addition to the contents of the example in FIG. 22, it is possible to acquire print data related to the print job 000016 from the host terminal 600 with the IP address "192.168.1.12". As the progress state, there are "standby" and "monitoring" other than "printing". "Standby" indicates a state in which print processing for a print job is put on standby until authentication information is received. "Monitoring" indicates a state in which, when a print job is subjected to print processing in the other network printers 700, the print processing of the print job is monitored.

Referring back to FIG. 27, the CPU 170 consists of microprocessing unit or the like. The CPU 170 starts predetermined, programs stored in predetermined areas of the ROM 172 and executes print request information reception processing, print control processing, printing state monitoring processing, and status information reception processing shown in the flowcharts in FIGS. 29 to 32, respectively, in a time division manner in accordance with the programs.

First, the print, request information reception processing will be explained in detail with reference to FIG. 29.

Figure 29:
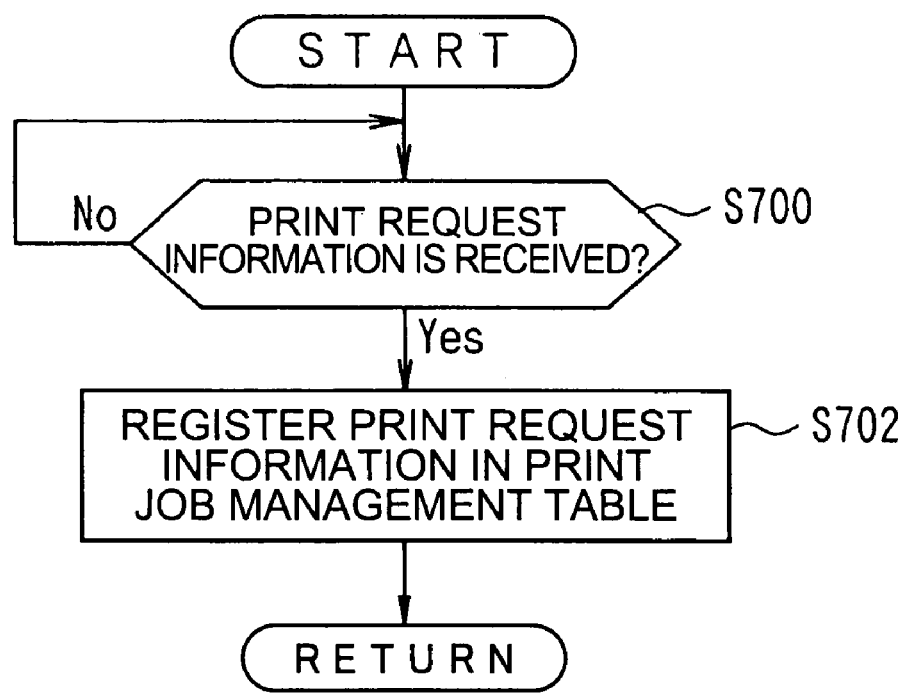
FIG. 29 is a flowchart showing print request information reception processing.

FIG. 29 is a flowchart showing the print request information reception processing.

The print request information reception processing is processing for receiving print request information from the host terminal 600. When the print request information reception processing is executed in the CPU 170, as shown in FIG. 29, first, the CPU 170 shifts to step S700.

In step S700, the CPU 170 judges whether print request information is received. When it is judged that print request information is received (Yes), the CPU 170 shifts to step S702. When it is judged otherwise (No), the CPU 170 waits in step S700 until print request information is received.

In step S702, the CPU 170 acquires a job ID, user information, and an IP address from the print request information received and registers a new record including the job ID, the user information, and the IP address acquired in the print job management table 440. At this point, the CPU 170 sets the number of processed pages as "0" and sets the progress state as "standby".

When the processing in step S702 ends, the CPU 170 ends the series of processing to return the processing to the original processing.

The print control processing will be explained in detail with reference to FIG. 30.

Figure 30:
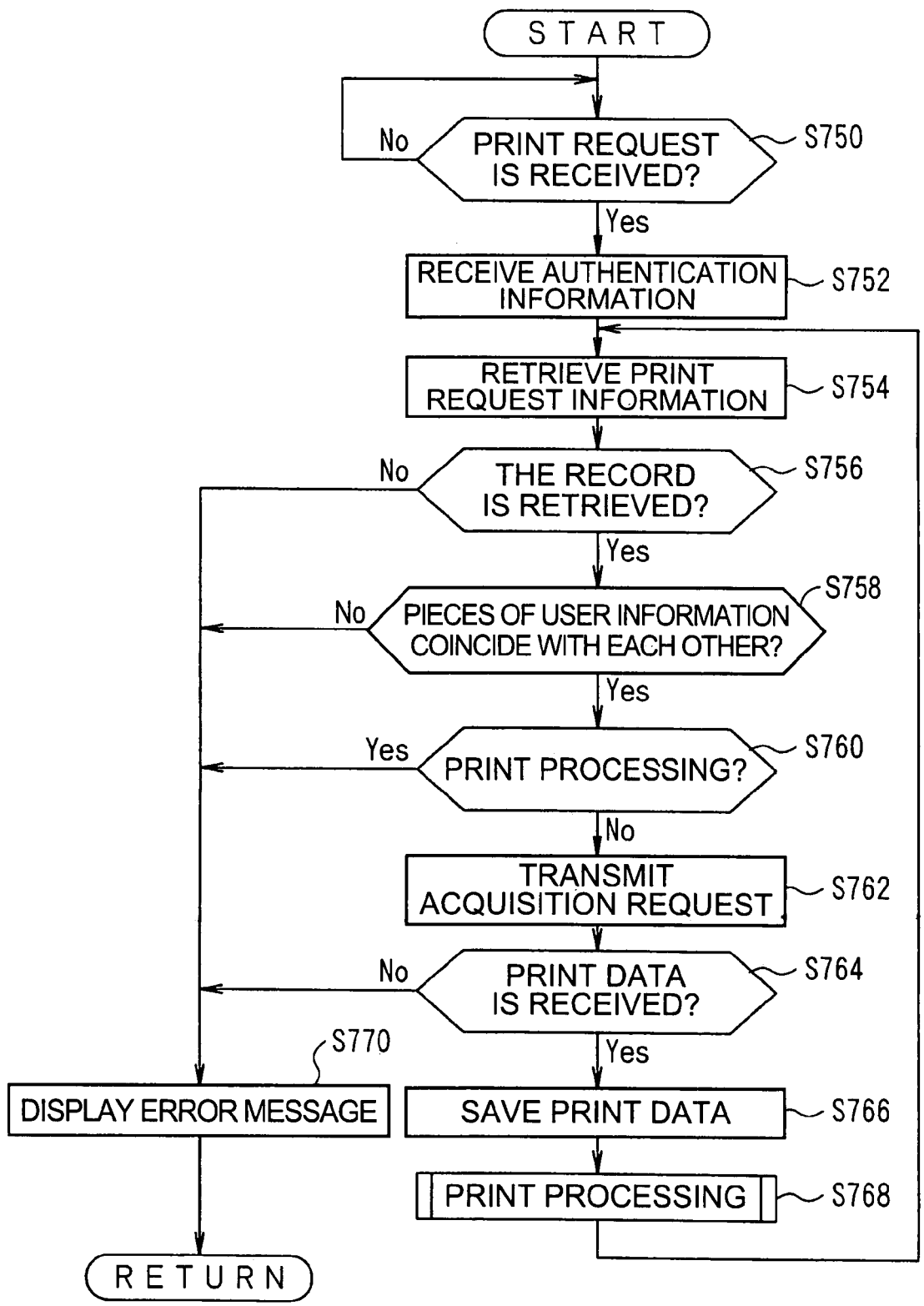
FIG. 30 is a flowchart showing print control processing.

FIG. 30 is a flowchart showing the print control processing.

The print control processing is processing for performing printing in response to a print request from the user authenticating apparatus 800. When the print control processing is executed in the CPU 170, as shown in FIG. 30, first, the CPU 170 shifts to step S750.

In step S750, the CPU 170 judges whether a print request is received. When it is judged that a print request is received (Yes), the CPU 170 shifts to step S752. When it is judged otherwise (No), the CPU 170 waits in step S750 until a print request is received.

In step S752, the CPU 170 receives authentication information including user information. The CPU 170 shifts to step S754, acquires the user information from the authentication information received, and retrieves a record, which includes user information identical with the user information acquired, from the print job management table 440. The CPU 170 shifts to step S756 and judges whether the record is retrieved. When it is judged that the record is retrieved (Yes), the CPU 170 shifts to step S758.

In step S758, the CPU 170 acquires the user information from the record retrieved and judges whether the user information acquired and the user information acquired in step S754 coincide with each other. When it is judged that the pieces of user information coincide with each other (Yes), the CPU 170 shifts to step S760.

In step S760, the CPU 170 acquires a job ID from the record retrieved, refers to the print job management table 440, and judges whether a progress state of print processing for a print job with the job ID acquired is "printing" or "monitoring". When it is judged that the progress state is neither "printing" nor "monitoring" (No), the CPU 170 shifts to step S762.

In step S762, the CPU 170 acquires an IP address from the retrieved record and transmits an acquisition request for print data including the job ID acquired in step S760 to the host terminal 600 on the basis of the IP address acquired. The CPU 170 shifts to step S764.

In step S764, the CPU 170 judges whether print data is received. When it is judged that print data is received (Yes), the CPU 170 shifts to step S766 and saves the print data received in the storage 182 in association with the job ID acquired in step S760. The CPU 170 shifts to step S768 and performs printing with the printer engine 127 on the basis of the print data in the storage 182. Then, the CPU 170 shifts to step S754.

On the other hand, when it is judged in step S764 that print data is not received within a predetermined time (No), when it is judged in step S760 that a progress state is "printing" or "monitoring" (Yes), when it is judged in step S758 that the pieces of user information do not coincide with each other (No), or when it is judged in step S756 that the record is not retrieved (No), the CPU 170 shifts to step S770, displays an error message on the operation panel 180, and ends the series of processing to return the processing to the original processing.

The printing state monitoring processing will be explained in detail with reference to FIG. 31.

Figure 31:
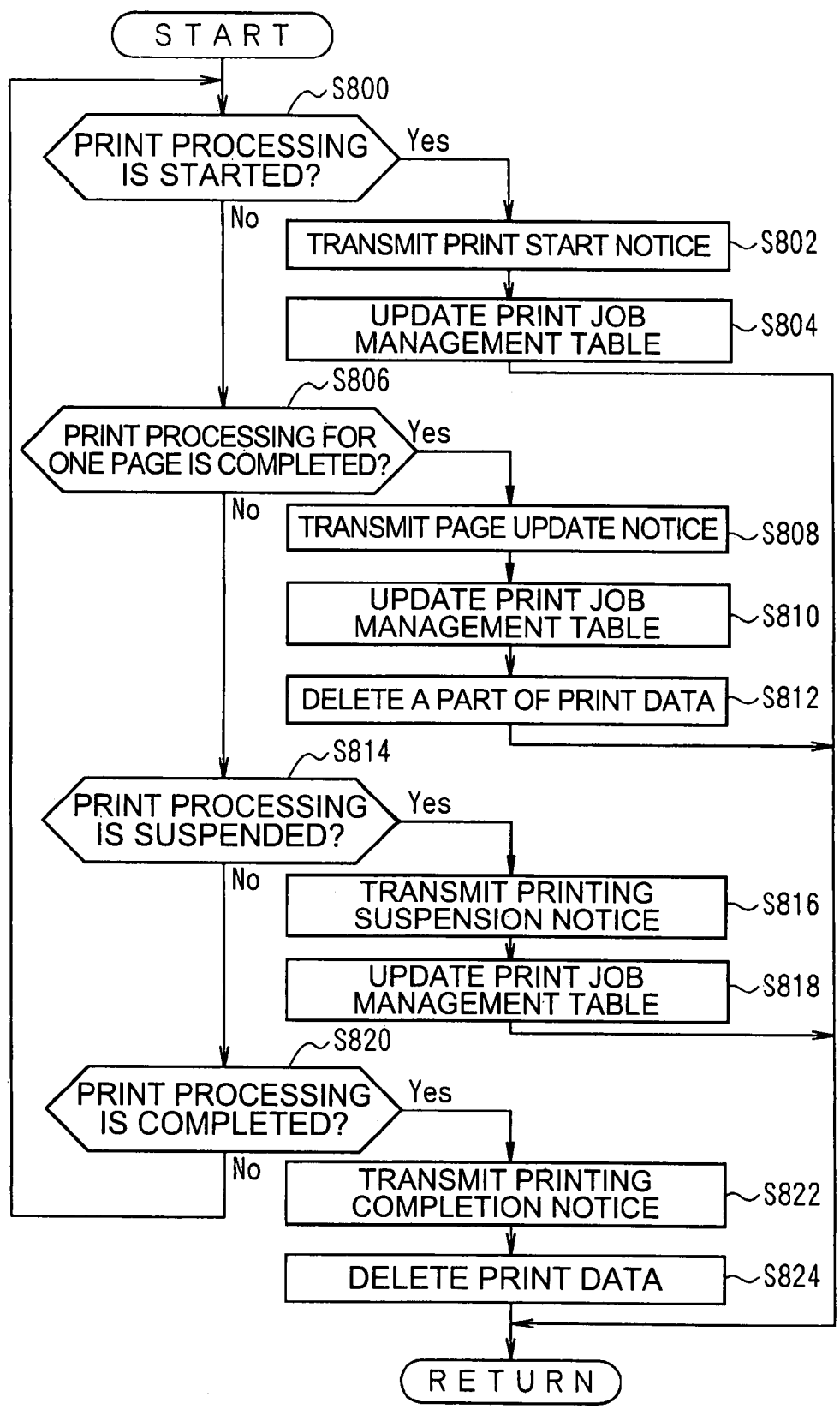
FIG. 31 is a flowchart showing printing state monitoring processing.

FIG. 31 is a flowchart showing the printing state monitoring processing.

The printing state monitoring processing is processing for monitoring a progress state of print processing of the network printer 700. When the printing state monitoring processing is executed in the CPU 170, as shown in FIG. 31, first, the CPU 170 shifts to step S800.

In step S800, the CPU 170 judges whether print processing is started in the printer engine 127. When it is judged that print processing is started (Yes), the CPU 170 shifts to step S802.

In step S802, the CPU 170 acquires a job ID of a print job for which the print processing is started and transmits a printing start notification including the job ID acquired to the host terminal 600 and all the other network printers 700. The CPU 170 shifts to step S804, changes a progress state of a record corresponding to the acquired job ID to "printing" in the print job management table 440, and ends the series of processing to return the processing to the original processing.

On the other hand, when it is judged in step S802 that print processing is not started (No), the CPU 170 shifts to step S806 and judges whether print processing for one page is completed in the printer engine 127. When it is judged that print processing for one page is completed (Yes), the CPU 170 shifts to step S808.

In step S808, the CPU 170 acquires a job ID of a print job for which the print processing for one page is completed and transmits a page update notice including the job ID acquired to the host terminal 600 and all the other network printers 700. The CPU 170 shifts to step S810 and increments the number, of processed pages of a record corresponding to the acquired job ID by "1" in the print job management table 440. The CPU 170 shifts to step S812, deletes a part, for which the print processing is completed, of print data corresponding to the acquired job ID from the storage 182, and ends the series of processing to return the processing to the original processing.

On the other hand, when it is judged in step S806 that print processing for one page is not completed (No), the CPU 170 shifts to step S814 and judges whether the print processing is suspended in the printer engine 127. When it is judged that the print processing is suspended (Yes), the CPU 170 shifts to step S816.

In step S816, the CPU 170 acquires a job ID of a print job for which the print processing is suspended and transmits a printing suspension notice including the job ID acquired to the host terminal 600 and all the other network printers 700. The CPU 170 shifts to step S818, changes a progress state of a record corresponding to the acquired job ID to "standby" in the print job management table 440, and ends the series of processing to return the processing to the original processing.

On the other hand, when it is judged in step S814 that the print processing is not suspended (No), the CPU 170 shifts to step S820 and judges whether the print processing is completed in the printer engine 127. When it is judged that the print processing is completed (Yes), the CPU 170 shifts to step S822.

In step S822, the CPU 170 acquires a job ID of a print job for which the print processing is completed and transmits a printing completion notice including the job ID acquired to the host terminal 600 and all the other network printers 700. The CPU 170 shifts to step S824 and deletes print data corresponding to the acquired job ID from the storage 182. In addition, the CPU 170 deletes a record corresponding to the acquired job ID from the print job management table 440 and ends the series of processing to return the processing to the original processing.

On the other hand, when it is judged in step S820 that the print processing is not completed (No), the CPU 170 shifts to step S800.

The status information reception processing will be explained in detail with reference to FIG. 32.

Figure 32:
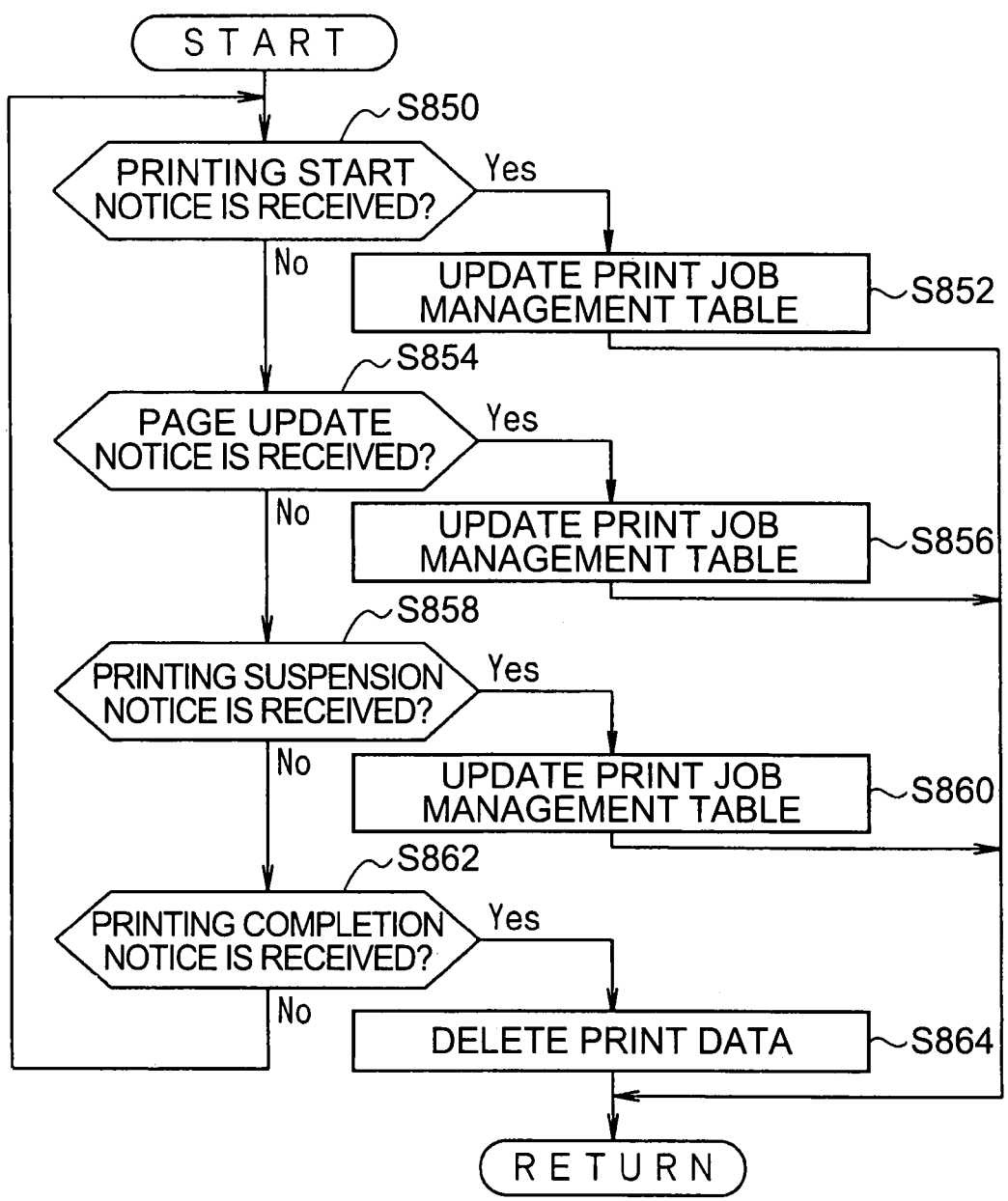
FIG. 32 is a flowchart showing status information reception processing.

FIG. 32 is a flowchart showing the status information reception processing.

The status information reception processing is processing for receiving status information from the other network printers 700. When the status information reception processing is executed in the CPU 170, as shown in FIG. 32, first, the CPU 170 shifts to step S850.

In step S850, the CPU 170 judges whether a printing start notice is received. When it is judged that a printing start notice is received (Yes), the CPU 170 shifts to step S852. The CPU 170 acquires a job ID from the printing start notice received, changes a progress state of a record corresponding to the job ID acquired to "monitoring" in the print job management table 440, and ends the series of processing to return the processing to the original processing.

On the other hand, when it is judged in step S850 that a printing start notice is not received (No), the CPU 170 shifts to step S854 and judges whether a page update notice is received. When it is judged that a page update notice is received (Yes), the CPU 170 shifts to step S856.

In step S856, the CPU 170 acquires a job ID from the page update notice received, increments the number of processed pages of a record corresponding to the job ID acquired by "1" in the print job management table 440, and ends the series of processing to return the processing to the original processing.

On the other hand, when it is judged in step S854 that a page update notice is not received (No), the CPU 170 shifts to step S858 and judges whether a printing suspension notice is received. When it is judged that a printing suspension notice is received (Yes), the CPU 170 shifts to step S860.

In step S860, the CPU 170 acquires a job ID from the printing suspension notice received, changes a progress state of a record corresponding to the job ID acquired to "standby" in the print job management table 440, and ends the series of processing to return the processing to the original processing.

On the other hand, when it is judged in step S858 that a printing suspension notice is not received (No), the CPU 170 shifts to step S862 and judges whether a printing completion notice is received. When it is judged that a printing completion notice is received (Yes), the CPU 170 shifts to step S864.

In step S864, the CPU 170 acquires a job ID from the printing completion notice received and deletes print data corresponding to the job ID, which is acquired from the printing completion notice, from the storage 182. At the same time, the CPU 170 deletes a record corresponding to the acquired job ID from the print job management table 440 and ends the series of processing to return the processing to the original processing.

On the other hand, when it is judged in step S862 that a printing completion notice is not received (No), the CPU 170 shifts to step S850.

Operations in this embodiment will be explained.

A user uses a document composition application or the like to request printing in the host terminal 600.

In the host terminal 600, when the printing is requested, through steps S502 and S504, a job ID is issued and print data is generated and user information of the user presently using the host terminal 600 is acquired. Subsequently, through step S506, the print data generated is saved in the storage 162 in association with the job ID. A new record including the job ID and the user information is registered in the print job management table 430. Through steps S508 and S510, print request information including the job ID, an IP address of the host terminal 600, and the user information is generated and the print request information generated is transmitted to a set transmission destination.

In the network printer 700, when the print request information is received, through step S702, the job ID, the user information, and the IP address are acquired from the print request information received and a new record including the job ID, the user information, and the IP address acquired is registered in the print job management table 440.

In the host terminal 600, the user inserts an authentication card into the card writer 166 and writes authentication information in the authentication card with the card writer 166. Note that the authentication information may be written in the authentication card in advance. In this case, the card writer 166 does not have to be provided in the host terminal 600.

First, a case in which printing is performed in any one of the network printers 700 (hereinafter referred to as network printer A) at set transmission destinations will be explained.

When the user wishes to perform printing in the network printer A, the user proceeds to the network printer A and inserts an authentication card into the card reader 140 of the user authentication apparatus 800 near the network printer A.

In the user authentication apparatus 800, when the authentication card is inserted into the card reader 140, authentication information is read from the authentication card by the card reader 140. The authentication information read is transmitted to the network printer A by the authentication information transmitting unit 141 together with a print request.

In the network printer A, when the authentication information is received together with the print request, through step S754, user information is acquired from the authentication information received. A record including user information identical with the user information acquired is retrieved from the print job management table 440. At this point, since the record is registered in the print job management table 440, the record is retrieved. Through step S758, it is judged whether the user information included in the record retrieved and the user information included in the received authentication information coincide with each other. As a result, when it is judged that the pieces of user information coincide with each other, through step S760, it is judged whether a progress state is "printing" or "monitoring" for a print job with a job ID included in the retrieved record. At this point, since the progress state is "standby" for the print job, through step S762, an acquisition request including the job ID is transmitted to the host terminal 600.

In the host terminal 600, when the acquisition request is received, through step S552, the job ID is acquired from the acquisition request received and print data corresponding to a job ID identical with the job ID acquired is retrieved from the storage 162. At this point, since the print data is saved in the storage 162, the print data is retrieved. Through step S556, it is judged whether a progress state is "printing" for a print job with the job ID acquired. At this point, since the progress state is "standby" for the print job, through step S558, the print data retrieved is transmitted to the network printer A.

In the network printer A, when the print data is received, through steps S766 and S768, the print data received is saved in the storage 182 in association with the job ID and printing is started on the basis of the print data in the storage 182. When print processing is started, through step S802, a job ID of a print job, for which the print processing is started, is acquired and a printing start notice including the job ID acquired is transmitted. In addition, through step S804, a progress state of a record corresponding to the job ID acquired is changed to "printing".

In the host terminal 600, when the printing start notice is received, through step S602, the job ID is acquired from the printing start notice received and a progress state of a record corresponding to the job ID acquired is changed to "printing". Consequently, even if an acquisition request is received, print data corresponding to the print processing is never provided until the print processing is suspended or completed.

In the other network printers 700, when the printing start notice is received, through step S852, the job ID is acquired from the printing start notice received and a progress state of a record corresponding to the job ID acquired is changed to "monitoring". Consequently, even if authentication information is received, the print processing is never performed until the print processing is suspended or completed.

In the network printer A, when print processing for one page is completed, through step S808, a job ID of a print job, for which the print processing for one page is completed, is acquired and a page update notice including the job ID acquired is transmitted. In addition, through steps S810 and S812, the number of processed pages of a record corresponding to the acquired job ID is incremented and a part, for which the print processing is completed, of print data corresponding to the acquired job ID is deleted.

In the host terminal 600 and the other network printers 700, when the page update notice is received, through steps S606 and S856, the job ID is acquired from the page update notice received and the number of processed pages of a record corresponding to the job ID acquired is incremented.

In the network printer A, the transmission of a page update notice and the increment of the number of processed pages are performed until the print processing is suspended or completed. When the print processing is completed, through step S822, a job ID of a print job, for which the print processing is completed, is acquired and a printing completion notice including the job ID acquired is transmitted. Through step S824, print data corresponding to the acquired job ID is deleted. In addition, a record corresponding to the acquired job ID is deleted from the print job management table 440.

In the host terminal 600 and the other network printers 700, when the printing completion notice is received, through steps S614 and S864, the job ID is acquired from the printing completion notice received and print data corresponding to the job ID acquired is deleted. In addition, a record corresponding to the acquired job ID is deleted from the print job management tables 430 and 440.

Note that, in the network printer A, when are identical user issues plural print requests, the processing in steps S754 to S768 is executed repeatedly until the record is no longer retrieved.

A case in which printing is suspended in the network printer A and printing is resumed in any one of the network printers 700 other than the network printer A (hereinafter referred to as network printer B) at the set transmission destinations will be explained.

In the network printer A, when print processing is suspended because of a fault, toner shortage, a suspension request, or other causes, through step S816, a job ID of a print job for which the print processing is suspended is acquired and a printing suspension notice including the job ID acquired is transmitted. In addition, through step S818, a progress state of a record corresponding to the acquired job ID is changed to "standby".

In the host terminal 600, when the printing suspension notice is received, through step S610, the job ID is acquired from the printing suspension notice received and a progress state of a record corresponding to the job ID acquired is changed to "standby". Consequently, when an acquisition request is received for the print processing, it is possible to provide print data corresponding to the print processing again.

In the other network printers 700, when the printing suspension notice is received, through step S860, the job ID is acquired from the printing suspension notice received and a progress state of a record corresponding to the acquired job ID is changed to "standby". Consequently, when authentication information is received for the print processing, it is possible to perform the print processing again.

Subsequently, the user proceeds to the network printer B and inserts the authentication card into the card reader 140 of the user authentication apparatus 800 near the network printer B.

In the user authentication apparatus 800, when the authentication card is inserted into the card reader 140, authentication information is read from the authentication card by the card reader 140. The authentication information read is transmitted to the network printer B by the authentication information transmitting unit 141 together with a print request.

In the network printer B, when the authentication information is received together with the print request, through step S754, user information is acquired from the authentication information received and a record including user information identical with the user information acquired is retrieved from the print job management table 440. At this point, since the record is registered in the print job management table 440, the record is retrieved. Through step S758, it is judged whether the user information included in the record retrieved and the user information included in the received authentication information coincide with each other. As a result, when it is judged that the pieces of user information coincide with each other, through step S760, it is judged whether a progress state is "printing" or "monitoring" for a print job with a job ID included in the retrieved record. At this point, since the progress state is "standby" for the print job, through step S762, an acquisition request including the job ID is transmitted to the host terminal 600.

In the host terminal 600, when the acquisition request is received, through step S552, the job ID is acquired from the acquisition request received and print data corresponding to a job ID identical with the job ID acquired is retrieved from the storage 162. At this point, since the print data is saved in the storage 162, the print data is retrieved. Through step S556, it is judged whether a progress state is "printing" for a print job with the acquired job ID. At this point, since the progress state is "standby" for the print job, through step S558, the print data retrieved is transmitted to the network printer B.

In the network printer B, when the print data is received, through steps S766, and S768, the print data received is saved in the storage 182 in association with the job ID and printing is performed on the basis of the print data in the storage 182. At this point, the number of processed pages in the print job management table 440 is referred to and printing is resumed from a section where printing is suspended in the network printer A (a page next to a page for which print processing is completed).

When an authentication card having illegal authentication information recorded therein is used, in the network printers A and B, through step S770, an error message is displayed.

When the print data cannot be received because of a communication failure or other causes, in the network printers A and B, through step S770, an error message is displayed.

The case in which printing is suspended in the network printer A and printing is resumed in the network printer B is explained above. However, when printing is performed in the network printer B from the beginning, printing is performed in the same manner as the case in which printing is performed in the network printer A.

In this way, in this embodiment, the host terminal 600 transmits print request information including an IP address to the plural network printers 700 and provides the network printers 700 with print data in the storage 162 in response to an acquisition request. When the print request information is received, the network printer 700 saves the received print request information in the storage 182. When authentication information is received together with a print request, the network printer 700 judges eligibility for using print data on the basis of the authentication information received. When it is judged that a user is eligible to use the print data, the network printer 700 acquires the print data from the host terminal 600 on the basis of the IP address included in the print request information and performs printing on the basis of the print data acquired.

This makes it possible to perform printing in an arbitrary network printer 700 even after print request information is transmitted, from the host terminal 600. Thus, it is possible to improve a degree of freedom of changing the network printer 700 serving as a print destination.

In the network printer 700, since print data is acquired at the time of printing on the basis of print request information, it is possible to reduce the likelihood that the print data is stolen from the network printer 700 because of illegal access or the like. Therefore, it is possible to improve security compared with that in the past.

Since print request information is transmitted to the plural network printers 700, even if any one of the network printers 700 becomes inoperable, it is possible to perform printing in any one of the other network printers 700. Therefore, it is possible to reduce the likelihood that printing cannot be performed.

In this embodiment, the host terminal 600 transmits print request information to the network printers 700 registered in the transmission destination list 410 as transmission destinations.

Consequently, in the host terminal 600, the print request information is transmitted only to the network printers 700 registered in the transmission destination list 410. This makes it possible to reduce the likelihood that the print request information is transmitted to an unexpected network printer 700. Therefore, it is possible to further improve security.

In this embodiment, the host terminal 600 transmits print request information including an IP address and user information to user network printer 700. When authentication information including user information is received together with a print request, the network printer 700 collates the user information included in the authentication information received with the user information included in the print request information. When it is judged that the pieces of user information coincide with each other, the network printer 700 judges that a user is eligible to use print data.

Consequently, since authentication is performed on the basis of the user information included in the print request information, it is possible to vary authentication information for each user. Therefore, it is possible to improve security.

In this embodiment, the network printer 700 receives status information indicating a progress state of print processing of the other network printers 700 and monitors a progress state of print processing of the network printer 700. When it is judged on the basis of the status information received and a result of the monitoring that print processing is completed in any one of the network printers 700 including the network printer 700, the network printer 700 deletes print request information corresponding to the print processing.

Consequently, since the print request information is held by the network printer 700 until the print processing is completed, even if the network printer 700 performing the print processing becomes inoperable, it is possible to perform printing in any one of the other network printers 700. Therefore, it is possible to reduce the likelihood that printing cannot be performed.

Since the print request information is deleted from the network printer 700 after the print processing is completed, it is possible to reduce the likelihood that the print request information is stolen from the network printer 700 because of illegal access or the like. Therefore, it is possible to further improves security.

In this embodiment, the network printer 700 monitors a progress state of print processing of the network printer 700. When it is judged on the basis of a result of the monitoring that print processing for one page is completed, the network printer 700 deletes a part, for which the print processing is completed, of print data corresponding to the print processing.

Consequently, in the network printer 700, since a part, for which the print processing is completed, of the print data is deleted every time the print processing for one page is completed, it is possible to reduce the likelihood that the print data is stolen from the network printer 700 because of illegal access or the like. Therefore, it is possible to further improve security.

In the second embodiment, the host terminal 600 corresponds to the device using apparatus in the form 45, 46, 49, 57, 66, 66, 67, 69, 72, 81, or 85. The print data storing unit 110, the transmission-destination-list storing unit 114, and the storage 162 correspond to the output data storing means in the form 45, 66, 78, or 81 or the transmission-destination-information storing means in the form 46 or 67. The print-request-information transmitting unit 115, the I/F 158, and the step S510 correspond to the output-request-information transmitting means in the form 45, 46, 66, or 67. The step S510 corresponds to the output-request-information transmitting step in the form 78, 79, 81, or 82. The print data providing unit 116, the I/F 158, and the steps S550 to S558 correspond to the output data providing means in the form 45 or 66.

In the second embodiment, the steps S550 to S558 correspond to the output data providing step in the form 78 or 81. The network printer 700 corresponds to the network device in the form 45, 46, 50, 51, 57, 60 to 62, 66, 67, 73, 78, 79, 81, 82, 86, or 87. The print-request-information storing unit 120 and the storage 182 correspond to the output-request-information storing means in the form 45, 49, 50, 57, 60, 61, 69, 72, 73, 81, 85, or 86. The print-request-information receiving unit 121, the I/F 178, and the step S700 correspond to the output-request-information receiving means in the form 45 or 57.

In the second embodiment, the step S700 corresponds to the output-request-information receiving step in the form 69 or 81. The print-request-information saving unit 122 and the step S702 correspond to the output-request-information saving means in the form 45 or 57. The step S702 corresponds to the output-request-information saving step in the form 69 or 81. The authentication information receiving unit 124, the I/F 178, and the step S752 correspond to the authentication information acquiring means in the form 45, 49, 57, or 60. The step S752 corresponds to the authentication information acquiring step in the form 69, 72, 81, or 85. The print data authenticating and acquiring unit 125, the I/F 178, and the steps S754 to S764 correspond to the output data authenticating and acquiring means in the form 45, 49, 57, or 60.

In the second embodiment, the steps S754 to S764 correspond to the output data authenticating and acquiring step in the form 69, 72, 81, or 85. The printer engine 127 and the step S768 correspond to the output means in the form 45 or 57. The step S768 corresponds to the output step in the form 69 or 81. The print processing monitoring unit 128 and the steps S800, S806, S814, and S820 correspond to the output processing monitoring means in the form 50, 51, 61, or 62. The steps S800, S806, S814, and S820 correspond to the output processing monitoring step in the form 73, 74, 86, or 87.

In the second embodiment, the status information receiving unit 130, the I/F 178, and the steps S850, S854, S858, and S862 correspond to the status information acquiring means in the form 50 or 61. The steps S850, S854, S858, and S862 correspond to the status information acquiring step in the form 73 or 86. The print-request-information deleting unit 131 and the steps S828 and S864 correspond to the output-request-information deleting means in the form 50 or 61. The steps S828 and S864 correspond to the output-request-information deleting step in the form 73 or 86. The print data deleting unit 132 and the step S812 correspond to the output data deleting means in the form 51 or 62.

In the second embodiment, the step S812 corresponds to the output data deleting step in the form 74 or 87. The print data corresponds to the output data in the form 45, 49, 51, 57, 60, 62, 66, 69, 72, 74, 78, 81, 85, or 87. The IP address corresponds to the acquisition source information in the form 45, 57, 66, 69, 78, or 81. The print request information corresponds to the output request information in the form 45, 46, 49, 50, 57, 60, 61, 66, 67, 69, 72, 73, 78, 79, 81, 82, 85, or 86. The user information corresponds to the identification information in the form 49, 60, 72, or 85. The transmission destination list 410 corresponds to the transmission destination information in the form 46, 67, 79, or 82.

Third Embodiment

Figure 33:
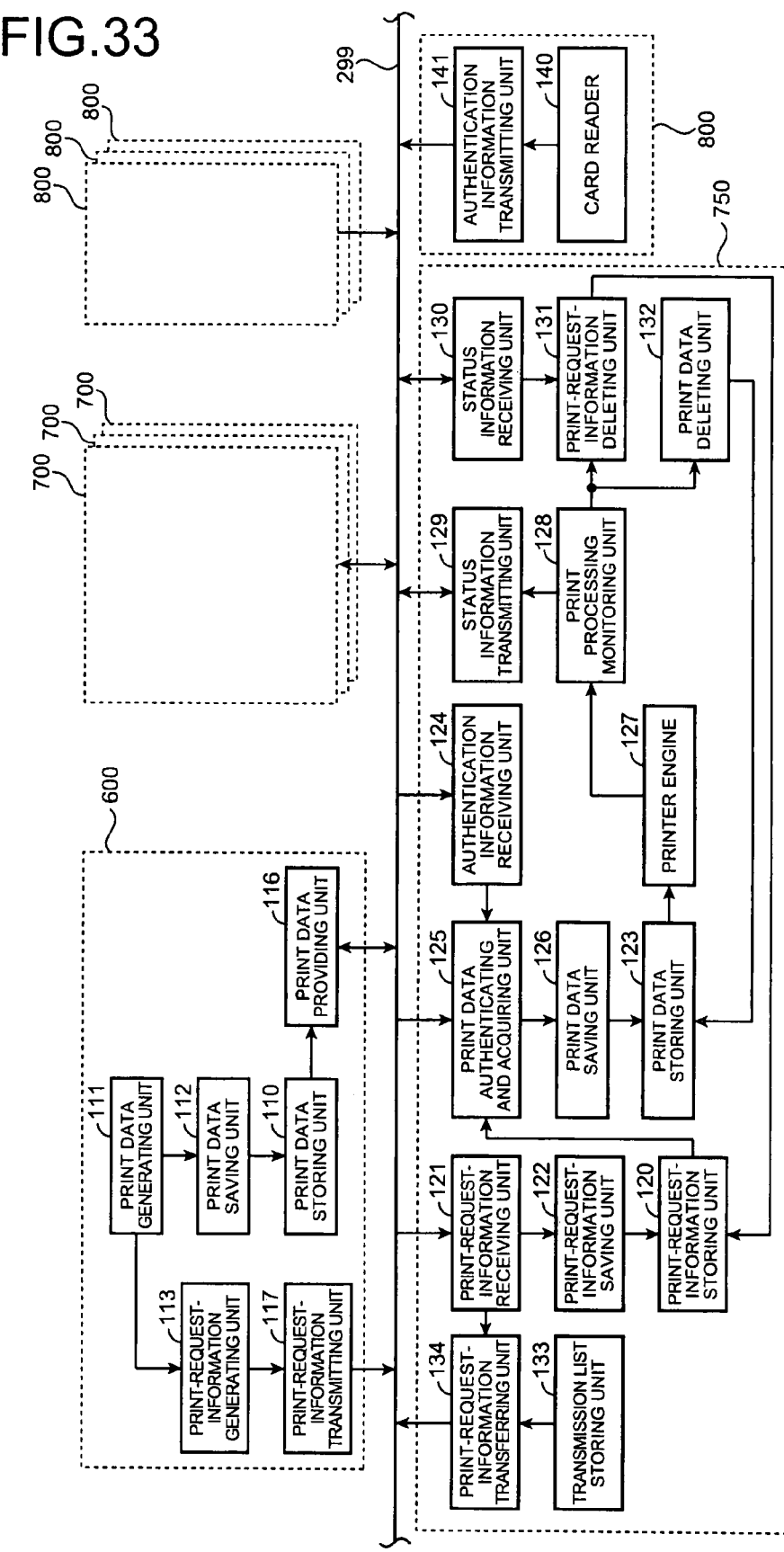
FIG. 33 is a functional block diagram showing schematic functions of a network system.
Figure 34:
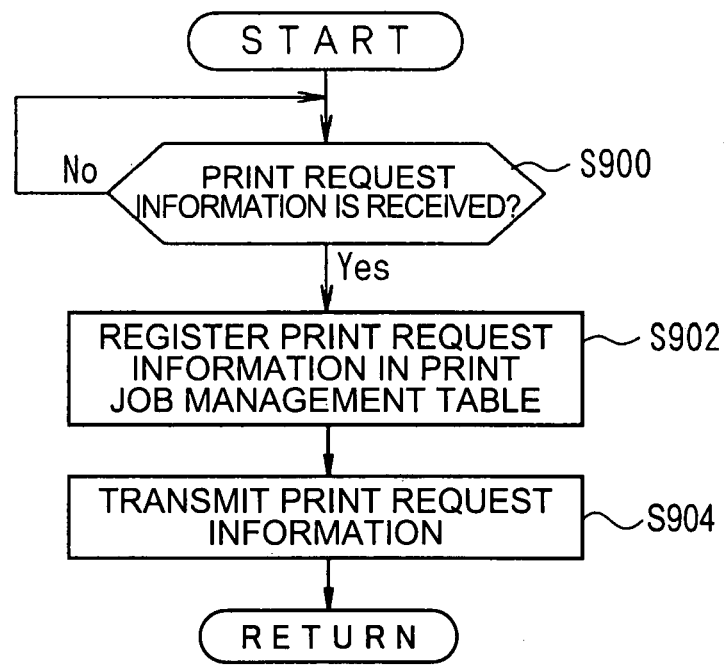
FIG. 34 is a flowchart showing print request information reception processing.

A third embodiment of the invention will be explained with reference to the drawings. FIGS. 33 and 34 are diagrams showing the third embodiment of the output system, the network device, the device using apparatus, the output control program and the output request program, and the output method according to the invention.

In this embodiment, as shown in FIG. 33, the output system the network device, the device using apparatus, the output control program and the output request program, and the output method according to the invention are applied to a case in which an authentication card is used to perform printing in the network printer 700. This embodiment is different from the second embodiment in that a representative network printer 750, rather than the host terminal 600, transmits print request information to the plural network printers 700. Note that, in the following description, only components different from the second embodiment will be explained. Components same as those in the second embodiment are denoted by the identical reference numerals and signs, and explanations of the components are omitted.

First, schematic functions of a network system to which the invention is applied will be explained with reference to FIG. 33.

FIG. 33 is a functional block diagram showing the schematic functions of the network system.

As shown in FIG. 33, the host terminal 600, the plural network printers 700, the representative network printer 750, and the plural user authenticating apparatuses 800, which correspond to the respective network printers 700 and the representative network printer 750, are connected to the network 299.

The host terminal 600 includes a print-request-information transmitting unit 17, which transmits print request information generated by the print-request-information generating unit 113 to the representative network printer 750, other than the print data storing unit 110, the print data generating unit 111, the print data saving unit 112, the print-request-information generating unit 113, and the print data providing unit 116.

The representative network printer 750 includes the print-request-information storing unit 120, the print-request-information receiving unit 121, the print-request-information saving unit 122, the print data storing unit 123, the authentication information receiving unit 124, the print data authenticating and acquiring unit 125, the print data saving unit 126, the printer engine 127, the print processing monitoring unit 128, the status information transmitting unit 129, the status information receiving unit 130, the print-request-information deleting unit 131, and the print data deleting unit 132.

The representative network printer 750 further includes a transmission-destination-list storing unit 33 that stores the transmission destination list 410 and a print-request-information transferring unit 34 that transmits print request information received by the print-request-information receiving unit 121 to the network printers 700 registered in the transmission destination list 410 as transmission destinations.

A constitution of the representative network printer 750 will be explained.

In the representative network printer 750, as in the network printer 700, the CPU 170, the ROM 172, the RAM 174, and the I/F 178 are connected via the bus 179 and the operation panel 180, the storage 182, the printer engine 127, and a data line for connecting the representative network printer 750 to the network 299 are connected to the I/F 178.

The storage 182 has the transmission destination list 410 stored therein.

The CPU 170 starts predetermined programs stored in predetermined areas of the ROM 172. The CPU 170 executes print request information reception processing shown in a flowchart in FIG. 34, in addition to the print control processing, the print state monitoring processing, and the status information reception processing shown in the flowcharts in FIGS. 30 to 32.

FIG. 34 is a flowchart showing the print request information reception processing.

When the print request information reception processing is executed in the CPU 170, as shown in FIG. 34, the CPU 170 shifts to step S500.

In step S500, the CPU 170 judges whether, print request information is received. When it is judged that print request information is received (Yes), the CPU 170 shifts to step S502. When it is judged otherwise (No), the CPU 170 waits in step S500 until print request information is received.

In step S502, the CPU 170 acquires a job ID, user information, and an IP address from the print request information received and registers a new record including the job ID, the user information, and the IP address acquired in the print job management table 440. At this point, the CPU 170 sets the number of processed pages as "0" and sets a progress state as "standby".

Subsequently, the CPU 170 shifts to step S504, refers to the transmission destination list 410, transmits the received print request information to a set transmission destination, and ends the series of processing to return the processing to the original processing.

Operations in this embodiment will be explained.

A user uses a document composition application or the like to request printing in the host terminal 600.

In the host terminal 600, when printing is requested, through steps S502 and S504, a job ID is issued, print data is generated, and user information of the user presently using the host terminal 600 is acquired. Subsequently, through step S506, the print data generated is saved in the storage 162 in association with the job ID. At the same time, a new record including the job ID and the user information is registered in the print job management table 430. Through steps S508 and S510, print request information including the job ID, an IP address of the host terminal 600, and the user information is generated and the print request information generated is transmitted to the representative network printer 750.

In the representative network printer 750, when the print request information is received, through step S502, the job ID, the user information, and the IP address are acquired from the print request information received. A new record including the job ID, the user information, and the IP address acquired is registered in the print job management table 440. Through step S504, the received print request information is transmitted to a set transmission destination.

In the network printer 700, when the print request information is received, through step S702, the job ID, the user information, and the IP address are acquired from the print request information received and a new record including the job ID, the user information, and the IP address acquired is registered in the print job management table 440.

When printing is performed in the network printer 700 and when printing is performed in the representative network printer 750, printing is performed in the same manner as the second embodiment.

In this way, in this embodiment, the host terminal 600 transmits the print request information including the IP address to the representative network printer 750 and provides the representative network printer 750 with the print data in the storage 162 in response to an acquisition request. When the print request information is received, the representative network printer 750 saves the received print request information in the storage 182 and transmits the print request information to the plural network printers 700. When the print request information is received, the network printer 700 saves the received print request information received in the storage 182. When authentication information is received together with a print request, the network printer 700 judges eligibility for using the print data on the basis of the authentication information received. When it is judged that a user is eligible to use the print data, the network printer 700 acquires print data from the host terminal 600 on the basis of the IP address included in the print request information and performs printing on the basis of the print data acquired.

This makes it possible to perform printing in an arbitrary network printer 700 even after the print request information is transmitted from the host terminal 600. Thus, it is possible to improve a degree of freedom of changing the network printer 700 serving as a print destination.

In the network printer 700, since print data is acquired on the basis of print request information at the time of printing, it is possible to reduce the likelihood that the print data is stolen from the network printer 700 because of illegal access or the like. Therefore, it is possible to improve security compared with that in the past.

In the host terminal 600, since print request information only has to be transmitted to the representative network printer 750, even if the user does not recognize the presence of the network printers 700, it is possible to use the network printers 700.

In this embodiment, the representative network printer 750 transmits print request information to the network printers 700 registered as transmission destinations in the transmission destination list 410.

Consequently, in the representative network printer 750, since the print request information is transmitted only to the network printers 700 registered in the transmission destination list 410, it is possible to reduce the likelihood that the print request information is transmitted to an unexpected network printer 700. Therefore, it is possible to further improve security.

In the third embodiment, the print data storing unit 110 and the storage 162 correspond to the output data storing means in the form 47, 66, 78, or 83. The print-request-information storing unit 120, the transmission-destination-list storing unit, and the storage 182 correspond to the output-request-information storing means in the form 47, 49, 50, 60, 61, 72, 73, 83, 85, or 86 or the transmission-destination-information storing means in the form 48 or 59. The representative network printer 750 corresponds to the representative network device in the form 47, 48, or 83. The print-request-information transferring unit 34, the I/F 178, and the step S504 correspond to the transmission request information transferring means in the form 47, 48, 58, or 59. The step S504 corresponds to the output-request-information transferring step in the form 70, 71, 83 or 84.

Note that, in the first embodiment, the network printer 200 is constituted to delete print request information after provision of the print request information or after completion of printing. However, it is also possible to constitute the network printer 200 to delete print request information in response to a deletion instruction from the host terminal 100.

Figure 13:
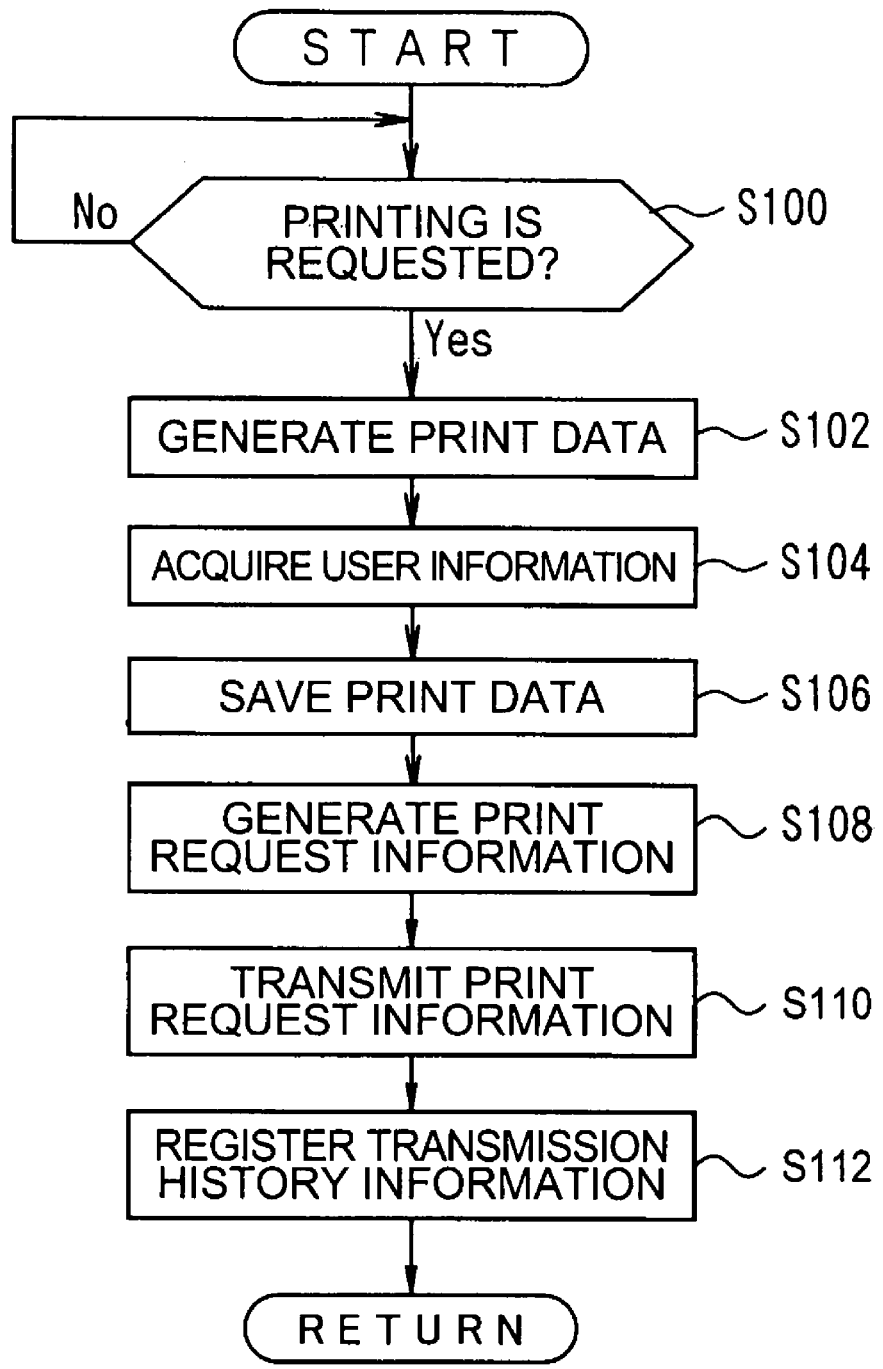
FIG. 13 is a flowchart showing print request information transmission processing.
Figure 14:
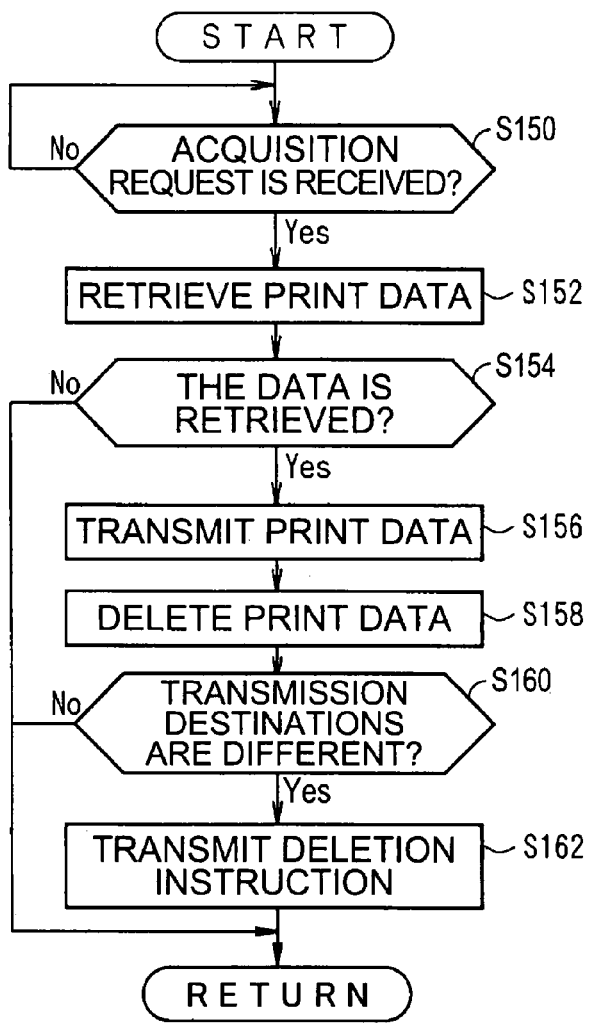
FIG. 14 is a flowchart showing print data provision processing.

The host terminal 100 executes, instead of the print request information transmission processing and the print data provision processing in FIGS. 3 and 5, the print request information transmission processing and the print data provision processing shown in the flowcharts in FIGS. 13 and 14 in a time division manner.

First, the print request information transmission processing will be explained in detail with reference to FIG. 13.

FIG. 13 is a flowchart showing the print request information transmission processing.

When the print request information transmission processing is executed in the CPU 50, as shown in FIG. 13, first, the CPU 50 shifts to step S100 and executes the processing in steps S100 to S110. Then, the CPU 50 shifts to step S112.

In step S112, the CPU 50 registers an identifier (e.g., a printer name or an IP address) of the network printer 200, which is a transmission destination of the print request information, and transmission history information including the user information acquired in step S104 in the storage 62 and ends the series of processing to return the processing to the original processing.

The print data provision processing will be explained in detail with reference to FIG. 14.

FIG. 14 is a flowchart showing the print data provision processing.

When the print data provision processing is executed in the CPU 50, as shown in FIG. 14, first, the CPU 50 shifts to step S150 and executes the processing in steps S150 to S158. Then, the CPU 50 shifts to step S160.

In step S160, the CPU 50 judges on the basis of the transmission history information in the storage 62 whether a transmission destination of the print request information and a transmission destination of the print data are different. When it is judged that the transmission destinations are different (Yes), the CPU 50 shifts to step S162. Specifically, first, the CPU 50 retrieves transmission history information including user information identical with the user information acquired in step S152 from the storage 82. When the transmission history information is retrieved, the CPU 50 acquires an identifier of the network printer 200 from the transmission history information retrieved and judges whether the identifier of the network printer 200 acquired and an identifier of the network printer 200, which has become the transmission destination of the print request information in step S156, are different. When it is judged that the identifiers are different, the CPU 50 judges that the transmission destination of the print request information and the transmission destination of the print data are different.

In step S162, the CPU 50 transmits a deletion instruction including the user information to the network printer 200 that has become the transmission destination of the print request information and ends the series of processing to return the processing to the original processing.

On the other hand, when it is judged in step S160 that the transmission destination of the print request information and the transmission destination of the print data are identical (No), the CPU 50 ends the series of processing to return the processing to the original processing.

Figure 15:
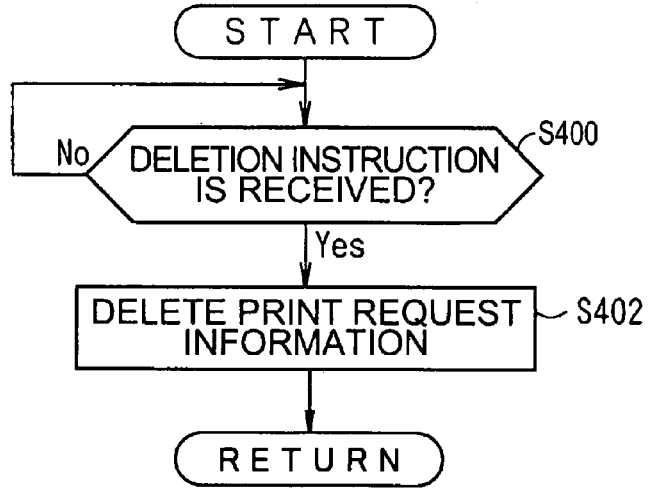
FIG. 15 is a flowchart showing print request information deletion processing.

The network printer 200 executes the print request information deletion processing shown in the flowchart in FIG. 15 in a time division manner in addition to the print request information provision processing, the print request reception processing, and the print control processing shown in FIGS. 9, 10, and 11.

FIG. 15 is a flowchart showing the print request information deletion processing.

When the print request information deletion processing is executed in the CPU 70, as shown in FIG. 15, first, the CPU 70 shifts to step S400.

In step S400, the CPU 70 judges whether a deletion instruction is received. When it is judged that a deletion instruction is received (Yes), the CPU 70 shifts to step S402, acquires user information from the deletion instruction, deletes print request information including the user information, which is acquired from the deletion instruction, from the storage 82, and ends the series of processing to return the processing to the original processing.

On the other hand, when it is judged in step S400 that a deletion instruction is not received (No), the CPU 70 waits in step S400 until a deletion instruction is received.

Consequently, even if printing is requested in the network printer A after printing is completed in the network printer B, since print request information is not present in the network printer A, it is possible to reduce the likelihood that the network printer A attempts acquisition of print data by mistake.

In this case, the I/F 58 and the step S162 correspond to the deletion instruction transmitting means in the form 7 or 22. The step S162 corresponds to the deletion instruction transmitting step in the form 36 or 43. The step S402 corresponds to the output-request-information deleting means in the form 7 or 14 or the output-request-information deleting step in the form 28 or 43.

The host terminal 100 not always transmits a deletion instruction. It is also possible to constitute the network printer 200 to transmit a deletion instruction. In this case, when it is judged in step S322 that print request information could be acquired (Yes), the CPU 70 shifts to step S324 and transmits a deletion instruction to the network printer 200 that has acquired the print request information. Then, the CPU 70 shifts to step S308.

In this case, the I/F 78 and the step S324 correspond to the deletion instruction transmitting means in the form 8 or 20. The step S324 corresponds to the deletion instruction transmitting step in the form 34 or 44. The step S402 corresponds to the output-request-information deleting means in the form 8 or 14 or the output-request-information deleting Step in the form 28 or 44.

Figures 16, 17:
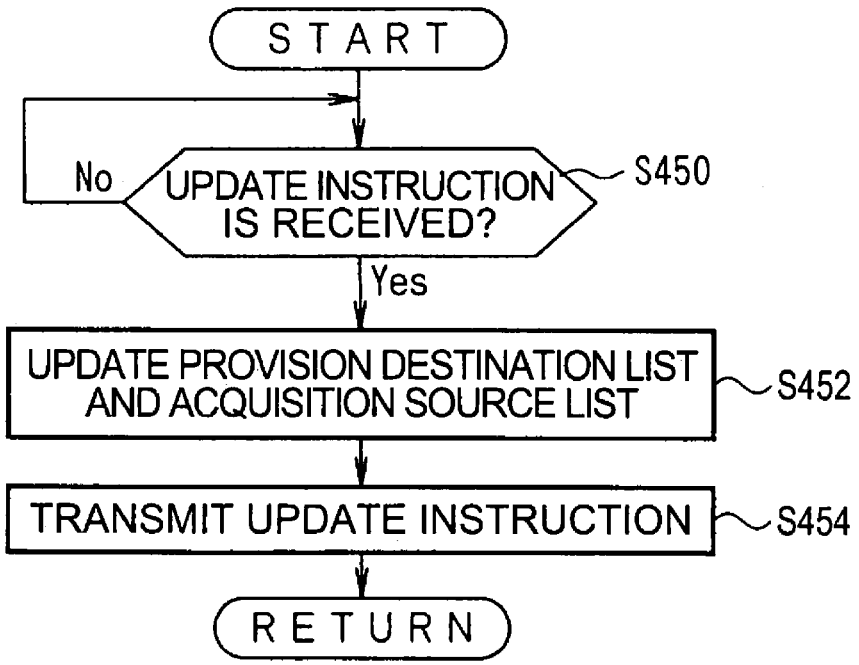
FIG. 16 is a diagram showing a data structure of an acquisition producing registration list.
FIG. 17 is a flowchart showing list update processing.

In the first embodiment, the network printer 200 is constituted to transmit and receive acquisition procedure information indicating a port number and a decryption key. However, the invention is not limited to this. As shown in FIG. 16, it is possible that an acquisition procedure registration list is held by the storage 82 of each of the network printers 200, in which identifiers and port numbers of acquisition procedures are registered in association with each other, and the network printer 200 transmits and receives acquisition procedure information indicating an identifier of an acquisition procedure.

FIG. 16 is a diagram showing a data structure of an acquisition procedure registration list.

In the first embodiment, communication using a port number and a decryption key as an acquisition procedure for print request information is adopted. However, the invention is not limited to this. It is also possible to adopt an acquisition procedure such as a In the first embodiment, an encryption system is not specifically explained. However, it is possible to use a common key encryption system, a public key encryption system, and other encryption systems.

In the first embodiment, it is not specifically explained that provision destinations and acquisition sources in the provision destination list 400 and the acquisition source list 420 are updated. However, it is also possible to update provision destinations and acquisition sources in the provision destination list 400 and the acquisition source list 420.

The network printer 200 executes list update processing shown in a flowchart in FIG. 17 in a time division manner in addition to the print request information provision processing, the print request reception processing, and the print control processing in FIGS. 9, 10, and 11.

FIG. 17 is a flowchart showing the list update processing.

When the list update processing is executed in, the CPU 70, as shown in FIG. 15, first, the CPU 70 shifts to step S450.

In step S450, it is judged whether a deletion instruction is received. When it is judged that a deletion instruction is received (Yes), the CPU 70 shifts to step S452. It is judged otherwise (No), the CPU 70 waits in step S450 until a deletion instruction is received.

FIG. 18 is a diagram showing a data structure of a deletion instruction.

As shown in FIG. 18, a deletion instruction includes an instruction for registering a new network printer 200 in the provision destination list 400 and the acquisition source list 420, a printer name, an IP address, a port number, and an encryption key (or a decryption key) of the network printer 200 to be registered.

In step S452, the CPU 70 acquires the printer name, the IP address, the port number, and the encryption key (or the decryption key) from the deletion instruction received and registers a new record in the provision destination list 400 and the acquisition source list 420 on the basis of the printer name, the IP address, the port number, and the encryption key (or the decryption key) acquired. Then, the CPU 70 shifts to step S454.

In step S454, the CPU 70 transmits a deletion instruction to the other network printers 200, which are registered as provision destinations and acquisition sources, on the basis of the provision destination list 400 and the acquisition source list 420 and ends the series of processing to return the processing to the original processing.

Note that the list update processing in FIG. 17 is processing for updating the provision destination list 400 and the acquisition source list 420 simultaneously. However, the invention is not limited to this. The list update processing may be processing for updating the provision destination list 400 and the acquisition source list 420 independently or may be processing for updating only one of the lists.

Note that, in the first embodiment, the provision destination list 400 and the acquisition source list 420 are formed separately. However, the invention is not limited to this. It is also possible to form the provision destination list 400 and the acquisition source list 420 as one list.

In the first embodiment, the network printer 200 is constituted to collate the user information included in the authentication information received with the user information included in the print request information and, when it is judged that the pieces of user information coincide with each other, judge that a user is eligible to use print data. However, the invention is not limited to this. It is also possible to adopt authentication methods described below.

First, an identifier (e.g., a host name or an IP address) of the host terminal 100 is included in print request information and authentication information. The network printer 200 collates an identifier included in authentication information received with the identifier included in the print request information and, when it is judged that the identifiers coincide with each other, judges that a user is eligible to use print data.

Second, a job ID allocated to print data is included in print request information and authentication information. The network printer 200 collates a job ID included in authentication information received with the job ID included in the print request information and, when it is judged that the job IDs coincide with each other, judges that a user is eligible to use print data.

Third, authentication information is held by the storage 82 of the network printer 200 in advance. The network printer 200 collates authentication information received with the authentication information and, when it is judged that the pieces of authentication information coincide with each other, judges that a user is eligible to use print data.

In the first embodiment, the network printer 200 is constituted not to respond when print request information that should be provided is not present in the storage 82. However, the invention is not limited to this. It is also possible to constitute the network printer 200 to respond with a notice indicating that print request information is not present. The same applies to a case in which the host terminal 100 does not hold print data that should be provided.

In the first embodiment, the network printer 200 is constituted to perform communication between the host terminal 100 and the network printer 200 without encrypting the communication. However, the invention is not limited to this. It is also possible to constitute the network printer 200 to encrypt and perform the communication between the host terminal 100 and the network printer 200 as in the case in which print request information is transmitted and received among the network printers 200.

In the second and the third embodiments, the network system is constituted without providing a print server. However, the invention is not limited to this. It is also possible to constitute a network system by providing a print-server. In this case, it is possible to propose, for example, the following four constitutions.

First, a first constitution will be explained.

Figure 35:
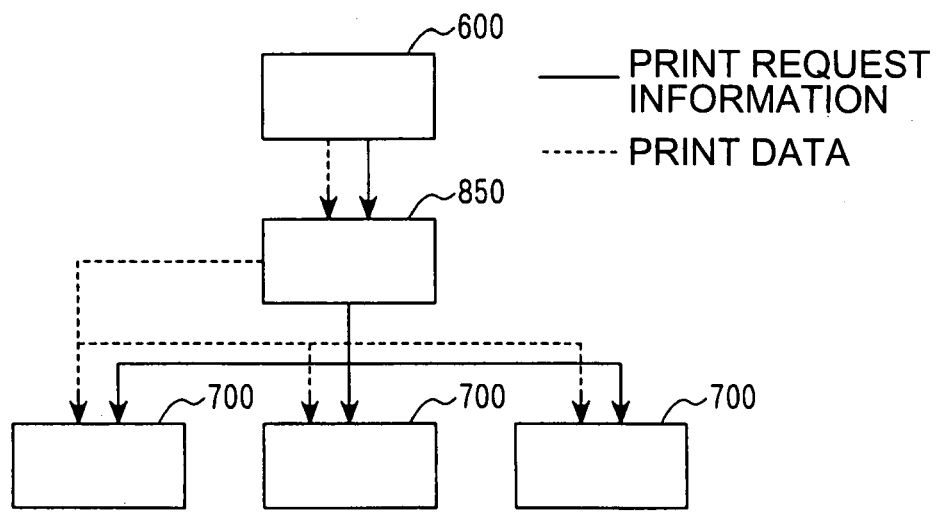
FIG. 35 is a block diagram showing a constitution of a network system in the case in which a print server 850 transmits print request information and acquires print data from the host terminal 600.

FIG. 35 is a block diagram showing a constitution of a network system in the case in which the print server 850 transmits print request information and acquires print data from the host terminal 600.

As shown in FIG. 35, the host terminal 600, the print server 850, and the plural network printer 700 are connected to the network 299.

The host terminal 600 saves print data in the storage 162, transmits print request information to the print server 850, and provides the network printer 700 with print data in the storage 162 in response to an acquisition request.

The print server 850 includes a print-request-information receiving unit that receives print request information and a print-request-information transferring unit that transmits the print request information received by the print-request-information, receiving unit to the plural network printers 700.

In this case, the print server 850 corresponds to the output request information relaying apparatus in the form 55 or 91. The print-request-information receiving unit corresponds to the second output-request-information receiving means in the form 55. The print-request-information transferring unit corresponds to the output-request-information transferring means in the form 55.

A second constitution will be explained.

Figure 36:
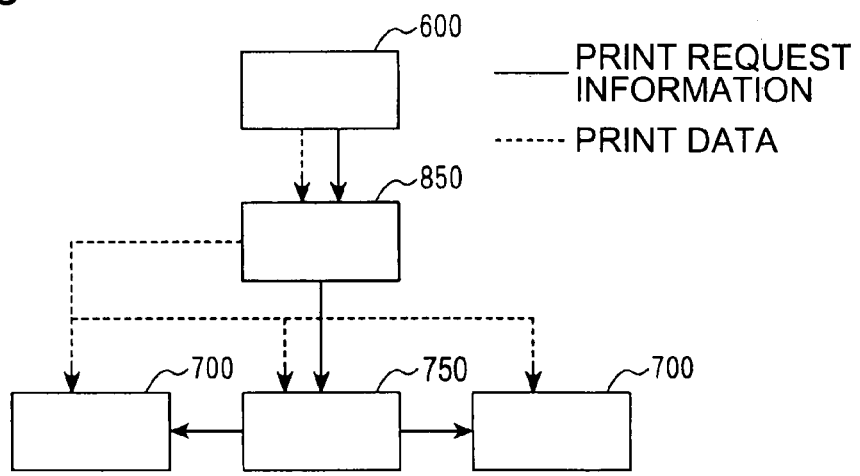
FIG. 36 is a block diagram showing a constitution of a network system in the case in which a representative network printer 750 transmits print request information and acquires print data from the host terminal 600.

FIG. 36 is a block diagram showing a constitution of a network system in the case in which the representative network printer 750 transmits print request information and acquires print data from the host terminal 600.

As shown in FIG. 36, the host terminal 600, the print server 850, the representative network printer 750, and the plural network printers 700 are connected to the network 299.

The host terminal 600 saves print data in the storage 162, transmits print request information to the print server 850, and provides the network printers 700 with the print data in the storage 162 in response to an acquisition request.

The print server 850 includes a print-request-information receiving unit that receives print request information and a print-request-information transferring unit that transmits the print request information received by the print-request-information receiving unit to the representative network printer 750.

In this case, the print server 850 corresponds to the output request information relaying apparatus in the form 56 or 92. The print-request-information receiving unit corresponds to the second output-request-information receiving means in the form 56. The print-request-information transferring unit corresponds to the second output-request-information transferring means in the form 56.

A third constitution will be explained.

Figure 37:
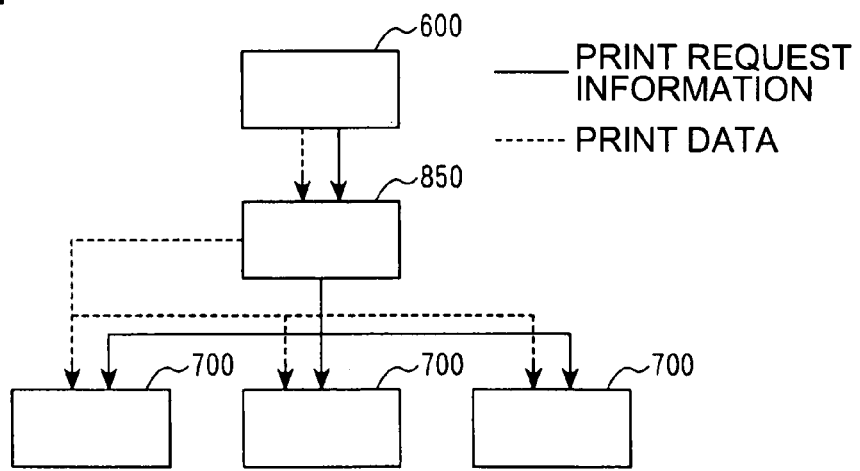
FIG. 37 is a block diagram showing a constitution of a network system in the case in which a print server 850 transmits print request information and acquires print data from the print server 850.

FIG. 37 is a block diagram showing a constitution of a network system in the case in which the print server 850 transmits print request information and acquires print data from the print server 850.

As shown in FIG. 37, the host terminal 600, the print server 850, and the plural network printer 700 are connected to the network 299.

The host terminal 600 transmits print request information and print data to the print server 850.

When the print request information and the print data are received, the print server 850 saves the print data received in a storage, transmits the print request information received to the plural network printers 700, and provides the network printers 700 with the print data in the storage in response to an acquisition request.

A fourth constitution will be explained.

Figure 38:
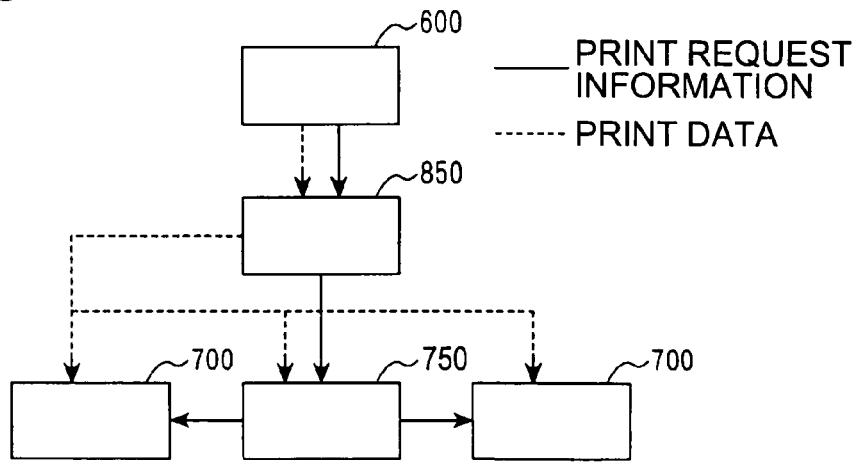
FIG. 38 is a block diagram showing a constitution of a network systems in the case in which the representative network printer 750 transmits print request information and acquires print data from the print server 850.

FIG. 38 is a block diagram showing a constitution of a network system in the case in which the representative network printer 750 transmits print request information and acquires print data from the print server 850.

As shown in FIG. 38, the host terminal 600, the print server 850, the representative network printer 750, and the plural network printers 700 are connected to the network 299.

The host terminal 600 transmits print request information and print data to the print server 850.

When the print request information and the print data are received, the print server 850 saves the received print data in a storage, transmits the print request information received to the network printer 750, and provides the network printers 700 with the print data in the storage in response to an acquisition request.

In the first and the third embodiments, the network printer 700 is constituted to monitor a progress state of print processing of the network printer 700 and, when it is judged on the basis of a result of the monitoring that print processing for one page is completed, delete a part, for which the print processing is completed, of print data corresponding to the print processing. However, the invention is not limited to this. It is also possible to constitute the host terminal 600 with a function similar to this. Specifically, the host terminal 600 receives status information indicating a progress state of print processing of the network printer 700 and, when it is judged on the basis of the status information received that the print processing for one page is completed in any one of the network printers 700, deletes a part, for which the print processing is completed, of print data corresponding to the print processing.

In the first and the third embodiments, the network printer 700 is constituted to collate user information included in authentication information received with user information included in print request information and, when it is judged that the pieces of user information coincide with each other, judge that a user is eligible to use print data. However, the invention is not limited to this. It is also possible to adopt an authentication method described below.

First, an identifier (e.g., a host name or an IP address) of the host terminal 600 is included in print request information and authentication information. The network printer 700 collates an identifier included in authentication information received with the identifier included in the print request information and, when it is judged that the identifiers coincide with each other, judges that a user is eligible to use print data.

Second, a job ID allocated to print data is included in print request information and authentication information. The network printer 700 collates a job ID included in authentication information received with the job ID included in the print request information and, when it is judged that the job IDs coincide with each other, judges that a user is eligible to use print data.

Third, authentication information is held by the storage 182 of the network printer 700. The network printer 700 collates authentication information received with the authentication information and, when it is judged that the pieces of authentication information coincide with each other, judges that a user is eligible to use print data.

In the first and the third embodiments, a job ID, user information, and an IP address are included in print request information and user information is included in authentication information. The invention is not limited to this. It is possible to propose the following eleven variations according to differences of constitutions. (1-1) In the second embodiment, in the case of a constitution in which the print server 850 is provided and print data is held in the print server 850, user information is included in print request information and authenticate on information. In this case, the host terminal 600 may transmit the print request information to the print server 850 and, when the print request information is received, the print server 850 may include a print data identifier (a job ID, etc.) and address information (an IP address, etc.) of the print server 850 in the print request information received and transmit the print request information to the network printer 700. (1-2) In the third embodiment, in the case of a constitution in which the print server 850 is provided and print data is held in the print server 850, a print data identifier, user information, and address information of the print server are included in print request information and the user information is included in authentication information. In this case, instead of the print server 850, the representative network printer 750 may transmit the print request information.

(2-1) In the second embodiment, a print data identifier and user information are included in print request information and the user information and address information of the host terminal 600 are included in authentication information. The network printer 700 includes an address information acquiring unit that acquires address information from authentication information received. The network printer 700 acquires print data on the basis of the address information acquired by the address information acquiring unit.

In this case, the address information acquiring unit corresponds to the acquisition-source-information confirming means in the form 52, 54, 63, or 65. The address information corresponds to the acquisition source information in the form 52, 54, 63, 65, 75, 77, 88, or 90.

(2-2) In the third embodiment, a print data identifier and user information are included in print request information and the user information and address information of the host terminal 600 are included in authentication information. The network printer 700 includes an address information acquiring unit that acquires address information from authentication information received. The network printer 700 acquires print data on the basis of the address information acquired by the address information acquiring unit. In this case, it is also possible that the print server 850 is provided and, instead of the representative network printer 750, the print server 850 transmits print request information.

In this case, the print server 850 corresponds to the representative network device in the invention 9 or 45. The address information acquiring unit corresponds to the acquisition-source-information confirming means in the form 53, 54, or 65. The address information corresponds to the acquisition source information in the form 53, 54, 65, 77, 89, or 90.

(3-1) In the second embodiment, when there is one host terminal 600 and address information of the host terminal 600 is set in each of the network printers 700, a print data identifier and user information are included in print request information and the user information is included in authentication information. The network printer 700 includes an address information referring unit that refers to the address information set in the network printer 700. The network printer 700 acquires print data on the basis of the address information referred to by the address information referring unit.

In this case, the address information referring unit corresponds to the acquisition-source-information confirming means in the form 52 or 63. The address information corresponds to the acquisition source information in the form 52, 63, 75, or 88. (3-2) In the third embodiment, when there is one host terminal 600 and address information of the host terminal 600 is set in each of the network printers 700, a print data identifier and user information are included in print request information and the user information is included in authentication information. The network printer 700 includes an address information referring unit that refers to the address information set in the network printer 700. The network printer 700 acquires print data on the basis of the address information referred to by the address information referring unit. In this case, it is also possible that the print server 850 is provided and, instead of the representative network printer 750, the print server 850 transmits print request information.

In this case, the print server 850 corresponds to the representative network device in the form 53 or 89. The address information referring unit corresponds to the acquisition-source-information confirming means in the form 53. The address information corresponds to the acquisition source information in the form 53 or 89.

(4-1) In the second embodiment, when each of the network printers 700 holds an address information registration table in which user information and address information of the host terminal 600 are registered in association with each other, a print data identifier and the user information are included in print request information and the user information is included in authentication information. The network printer 700 includes an address information retrieving unit that retrieves, on the basis of the user information included in the print request information or the authentication information, address information corresponding to the user information from the address information registration table. The network printer 700 acquires print data on the basis of the address information retrieved by the address information retrieving unit.

In this case, the address information retrieving unit corresponds to the acquisition-source-information confirming means in the form 52 or 63. The address information corresponds to the acquisition source information in the form 52, 63, 75, or 88. (4-2) In the third embodiment, when each of the network printers 700 holds an address information registration table in which user information and address information of the host terminal 600 are registered in association with each other, a print data identifier and the user information are included in print request information and the user information is included in authentication information. The network printer 700 includes an address information retrieving unit that retrieves, on the basis of the user information included in the print request information or the authentication information, address information corresponding to the user information from the address information registration table. The network printer 700 acquires print data on the basis of the address information retrieved by the address information retrieving unit. In this case, it is also possible that the print server 850 is provided and, instead of the representative network printer 750, the print server 850 transmits print request information.

In this case, the print server 850 corresponds to the representative network device in the form 53 or 89. The address information retrieving unit corresponds to the acquisition-source-information confirming means in the form 53. The address information corresponds to the acquisition source information in the form 53 or 89.

(5) In the second embodiment, a print data identifier and user information are included in print request information and the user information is included in authentication information. The network printer 700 has an address information analyzing unit that analyzes, when print request information is received according to a protocol (TCP/IP (Transmission Control Protocol/Internet Protocol), etc.) that is capable of specifying a transmission destination, communication information in the print request information to acquire address information of the host terminal 600. The network printer 700 acquires print data on the basis of the address information acquired by the address information analyzing unit.

In this case, the address information analyzing unit corresponds to the acquisition-source-information confirming means in the form 52 or 63. The address information corresponds to the acquisition source information in the form 52, 63, 75, or 88. (6-1) In the second embodiment, in the case of a constitution in which the print server 850 is provided and print data is held in the print server 850, user information is included in print request information and authentication information. The host terminal 600 transmits print request information to the network printer 700 via the print server 850. The network printer 700 includes an address information analyzing unit that analyzes, when print request information is received according to a protocol that is capable of specifying a transmission destination, communication information in the print request information to acquire address information of the print server 850. The network printer 700 acquires print data on the basis of the address information acquired by the address information analyzing unit. In this case, when the print request information is received, the print server 850 may include a print data identifier in the print request information received and transmit the print request information to the network printer 700.

In this case, the address information analyzing unit corresponds to the acquisition-source-information confirming means in the form 52 or 63. The address information corresponds to the acquisition source information in the form 52, 63, 75, or 88. (6-2) In the third embodiment, in the case of a constitution in which the print server 850 is provided and print data is held in the print server 850, user information is included in print request information and authentication information. The host terminal 600 transmits the print request information to the network printer 700 via the print server 850. The network printer 700 includes an address information analyzing unit that analyzes, when the print request information is received according to a protocol that is capable of specifying a transmission destination, communication information in the print request information to acquire address information of the print server 850. The network printer 700 acquires print data on the basis of the address information acquired by the address information analyzing unit. In this case, instead of the print server 850, the representative network printer 750 may transmit print request information.

In this case, the print server 850 corresponds to the representative network device in the form 53 or 89. The address information retrieving unit corresponds to the acquisition-source-information confirming means in the form 53. The address information corresponds to the acquisition source information in the form 53 or 89.

Note that, in the variations described above, it is not always necessary to include the print data identifier. When the print data identifier is included, it is also possible to use the print data identifier for authentication.

In the second and the third embodiments, the network printer 700 is constituted to acquire print data on the basis of an IP address included in print request information. However, the invention is not limited to this. For example, it is also possible to acquire print data according to the following three methods.

First, a login management server that holds login information of the host terminal 600 is provided. The network printer 700 refers to the login management server and specifies the host terminal 600 on the basis of user information included in print request information or authentication information. This makes it unnecessary for an administrator or the like to write by hand to set an address information registration table in which the user information and address information of the host terminal 600 are registered in association with each other. Even in an environment in which an IP address changes dynamically as in a DHCP, it is possible to specify the host terminal 600.

Second, address information of the host terminal 600 is changed according to a location of a user. In this case, the address information may be changed in association with management of entrance, into and exit from a building or a room.

Third, address information of the host terminal 600 is changed according to date and time. For example, it is assumed that the host terminal 600 set in a room A is used in the former half of a week and the host terminal 600 set in a room B is used in the latter half of a week.

In the second and the third embodiments, the network printer 700 is constituted to perform communication between the host terminal 600 and the network printer 700 without encrypting the communication. However, the invention is not limited to this. It is also possible to constitute the network printer 700 to encrypt and perform the communication between the host terminal 600 and the network printer 700 as in the case in which print request information is transmitted and received among the network printers 700.

In the second and the third embodiments, the network printer 700 is constituted to receive status information from the other network printers 700. However, the invention is not limited to this. It is also possible to constitute the network printer 700 to transmit an acquisition request to the other network printers 700 and actively acquire status information.

In the third embodiment, the representative network printer 750 is provided separately from the network printers 700. However, the invention is not limited to this. A function equivalent to that of the representative network printer 750 may be given to any one of the network printers 700.

In the first to the third embodiments, an authentication card is used to perform authentication. However, the invention is not limited to this. Fingerprint information of a user may be used to perform authentication. In this case, a fingerprint sensor only has to be provided instead of the card readers 40 and 140. It goes without saying that it is also possible to use other biological information concerning a vein of a finger, a retina, and the like for authentication.

In the first to the third embodiments, the network printers 200 and 700 and the user authentication apparatuses 300 and 800 are constituted separately. However, the invention is not limited to this. It is also possible to constitute the network printers 200 and 700 and the user authentication apparatuses 300 and 800 as an integrated apparatus.

In the explanations of the first to the third embodiments, in executing all the kinds of processing shown in the flowcharts in FIGS. 3, 5, 9 to 15, 17, 23, 25, 26, 29 to 32, and 34, the control programs stored in the ROMs 52, 72, 152, and 172 in advance are executed. However, the invention is not limited to this. Programs indicating procedures for the processing may be read into the RAMs 54, 74, 154, and 174 from storage media, in which the programs are stored, and executed.

The storage media are a semiconductor storage medium such as a RAM or a ROM, a storage medium of a magnetic storage type such as an FD or an HD, a storage medium of an optical reading type such as a CD, CDV, LD, or DVD, and, a storage medium of a magnetic storage type/an optical reading type such as an MO. Regardless of reading methods such as electronic reading, magnetic reading, and optical reading, the storage media include any storage medium as long as the storage medium is a computer readable storage medium.

In the first to the third embodiments, the output system, the network device, the device using apparatus, the output control program and the output request program, and the output method according to the invention are applied to the case in which an authentication card is used to perform printing in the network printers 200 and 700. However, the invention is not limited to this. It is also possible to apply the output system, the network device, the device using apparatus, the output control program and the output request program, and the output method according to the invention to other cases without departing from the spirit of the invention. It is possible to apply the output system, the network device, the device using apparatus, the output control program and the output request program, and the output method according to the invention to, instead of the network printers 200 and 700, for example, a projector, an electronic paper, a home gateway, a personal computer, a PDA (Personal Digital Assistant), a network storage, an audio apparatus, a cellular phone, a PHS (registered trademark) (Personal Handyphone System), watch type PDA an STB (Set Top Box), a POS (Point Of Sale) terminal, a facsimile machine, a telephone (including an IP telephone, etc.), and other output apparatuses.

The invention claimed is:

1. An output system in which a first network printer and a second network printer, which perform output on the basis of output data, and a device using apparatus, which uses the network printers, are connected to be capable of communicating with each other and the network printers obtain authentication to perform the output, the output system characterized in that
the device using apparatus includes:
output data storing means that stores the output data;
output-request-information transmitting means that transmits output request information, which includes acquisition source information concerning an acquisition source of the output data, to the first network printer; and
output data providing means that provides output data in the output data storing means,
the first network printer includes:
output-request-information storing means;
output-request-information receiving means that receives the output request information;
output-request-information saving means that saves the output request information received by the output-request-information receiving means in the output-request-information storing means;
first authentication information acquiring means that acquires authentication information;
first output data authenticating and acquiring means that acquires, when it is judged on the basis of the authentication information acquired by the first authentication information acquiring means that a user is eligible to use the output data, the output data from the device using apparatus on the basis of acquisition source information included in the output request information in the output-request-information storing means;
first output means that performs output on the basis of the output data acquired by the first output data authenticating and acquiring means; and
output-request-information providing means that provides output request information in the output-request-information storing means,
provision-destination-information storing means that stores provision destination information in which a provision destination of the output request information is registered, wherein the second network printer is registered as a provision destination of the first network device; and
the second network printer includes:
second authentication information acquiring means that acquires the authentication information;
output-request-information acquiring means that acquires the output request information from the first network printer;
second output data authenticating and acquiring means that acquires, when it is judged on the basis of the authentication information acquired by the second authentication information acquiring means that a user is eligible to use the output data, the output data from the device using apparatus on the basis of the acquisition source information included in the output request information acquired by the output-request-information acquiring means;
the second network printer has acquisition source information storing means that stores acquisition source information in which an acquisition source of the output request information is registered, wherein the first network printer is registered as an acquisition source of the output request information, and
the output-request-information acquiring means acquires the output request information from the first network printer registered in the acquisition source information as an acquisition source; and
second output means that performs output on the basis of the output data acquired by the second output data authenticating and acquiring means wherein when the user elects to have output performed at the second network printer instead of the first network printer which has already received authentication information,
a) the user provides the authentication information to the second authentication information acquiring means,
b) the second network printer determines whether the first network printer is registered as an acquisition source in the acquisition source information storing means, and transmits an acquisition request to the first network printer, the acquisition request including user information,
c) the first network printer receives the acquisition request from the second network device and determines whether the second network printer is registered as a provision destination in the provision-destination-information storing means, and the output-request-information providing means of the first network printer provides the output request information to second network printer upon determining that the second network printer is registered in the provision destination information as a provision destination,
d) the output-request-information receiving means of the second network receives the output request information from the first network device and the second output data authenticating and acquiring means compares the authentication information provided by the user and the output request information to determine if the user is eligible to use the output data, and if so transmits an acquisition request including the user information to the device using apparatus, and
e) the device using apparatus receives the acquisition request from the second network printer and compares the user information with stored user information stored on the device using apparatus, and transmits the output data to the second network printer upon determining that the user information and the stored user information match.

2. An output system according to claim 1, wherein
the output request information and the authentication information include at least one of identification information for identifying a user, identification information for identifying the device using apparatus, and identification information for identifying the output data,
the first output data authenticating and acquiring means judges eligibility for using the output data on the basis of the identification information included in the output request information in the output-request-information storing means and the identification information included in the authentication information acquired by the first authentication information acquiring means, and
the second output data authenticating and acquiring means judges eligibility for using the output data on the basis of the identification information included in the output request information acquired by the output-request-information acquiring means and the identification information included in the authentication information acquired by the second authentication information acquiring means.

3. An output system according to claim 1 wherein
in the acquisition source information, an acquisition source and an acquisition procedure for the output request information are registered in association with each other,
the output-request-information acquiring means acquires the output request information from the first network printer on the basis of the acquisition source information in accordance with an acquisition procedure corresponding to the first network printer, and
the output-request-information providing means provides the output request information in accordance with an acquisition procedure set in the first network printer.

4. An output system according to claim 3, wherein
the first network printer includes: acquisition-procedure-information storing means that stores acquisition procedure information indicating the acquisition procedure; acquisition procedure determining means that determines the acquisition procedure; and acquisition-procedure-information updating means that updates the acquisition procedure information in the acquisition-procedure-information storing means on the basis of the acquisition procedure determined by the acquisition procedure determining means,
the output-request-information providing means provides output request information, which includes acquisition procedure information indicating the acquisition procedure determined by the acquisition procedure determining means, on the basis of the acquisition procedure information in the acquisition-procedure-information storing means, and
the second network device printer includes acquisition-source-information updating means that updates an acquisition procedure for the acquisition source information on the basis of the acquisition procedure information included in the output request information acquired by the output-request-information acquiring means.

5. An output system according to claim 1, wherein
the device using apparatus includes deletion instruction transmitting means that transmits, when a transmission destination of the output request information and a provision destination of the output data are different, a deletion instruction to the first network printer that has become the transmission destination of the output request information, and
the first network printer includes output-request-information deleting means that deletes output request information in the output-request-information storing means in response to the deletion instruction.

6. An output system according to claim 1, wherein
the second network printer includes deletion instruction transmitting means that transmits a deletion instruction to the first network printer that has acquired the output request information, and
the first network printer includes output-request-information deleting means that deletes output request information in the output-request-information storing means in response to the deletion instruction.

* * * * *